US006825949B1

(12) United States Patent
Hirai

(10) Patent No.: US 6,825,949 B1
(45) Date of Patent: Nov. 30, 2004

(54) IMAGE PROCESSING APPARATUS

(75) Inventor: Tatsuhiko Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/464,078

(22) Filed: Dec. 16, 1999

(30) Foreign Application Priority Data

Dec. 18, 1998 (JP) ........................................... 10-360806
Mar. 12, 1999 (JP) ........................................... 11-065751
Mar. 12, 1999 (JP) ........................................... 11-065752

(51) Int. Cl.[7] ........................... G06K 15/02; G06K 3/12
(52) U.S. Cl. ...................... 358/1.18; 358/450; 358/451; 399/193; 399/204; 270/52.18; 283/64
(58) Field of Search ................................ 358/1.18, 450, 358/451; 399/193, 204; 270/52.14, 52.18; 283/64, 284, 298, 299

(56) References Cited

U.S. PATENT DOCUMENTS 5,187,536 A * 2/1993 Hasegawa et al. .......... 399/300
5,271,065 A * 12/1993 Rourke et al. .............. 382/112
5,735,659 A * 4/1998 Kosasa et al. ................. 412/9
5,774,232 A * 6/1998 Tabata et al. ............... 358/448
5,805,933 A * 9/1998 Takahashi ..................... 710/72
5,839,033 A * 11/1998 Takahashi et al. .......... 399/187
6,336,011 B1 * 1/2002 Sumio et al. ................. 399/82
6,417,931 B2 * 7/2002 Mori et al. ................ 358/1.15
2002/0097407 A1 * 7/2002 Ryan et al. .................. 358/1.1

* cited by examiner

*Primary Examiner*—Edward Coles
*Assistant Examiner*—Alan Rahimi
(74) *Attorney, Agent, or Firm*—Fitzpatrick, Cella, Harper & Scinto

(57) ABSTRACT

An image processing apparatus is provided to easily form a cover sheet for covering a sheaf of plural sheets without burdening a user. In the apparatus which can input plural images to be formed on an identical face of the cover sheet for covering the sheaf of the plural sheets by using the input unit, information concerning a thickness of the sheaf of the plural sheets is obtained, and it is controlled that the plural images input by the input unit are disposed at an interval based on the obtained information.

74 Claims, 27 Drawing Sheets

1000

320

237

125

125

125

2300

IMAGE PROCESSING APPARATUS

BACKGROUND OF THE INVENTION

1. Field of the Invention

The present invention relates to image processing apparatus and method for outputting input plural images as one image.

2. Related Background Art

According to speedup of an image processing apparatus such as a copying machine or the like in recent years, such the conventional image processing apparatus can print a large number of copies, easily form a small number of pamphlets or booklets, and perform simple bookbinding. When such the bound copies are formed, it has been proposed a method to form a sheet acting as cover or jacket of text originals (referred as "cover sheet" hereinafter), interpose or sandwich the output results of the text originals in the formed cover sheet, and bind the cover sheet and the output results of the text originals together.

When the cover sheet is formed, plural images, e.g., an image for a front cover (or a recto) and an image for a back cover (or a verso), are respectively input, and the input images are aligned and formed on an identical face of the cover sheet. For example, the image for the front cover is formed on the left part of the face of the cover sheet, while the image for the back cover is formed on the right part of the same face thereof. When the output results of the text originals are interposed in the cover sheet, the cover sheet is folded in half along its center part. As a result of such a series of bookbinding processing, bound copies as shown in FIG. 26A can be obtained.

However, for example, if the number of text originals to be interposed in the copy sheet is large, the thickness of an output sheaf is fat. In such a case, if the cover sheet is simply formed in the conventional method, as shown in FIG. 26B, there is some fear that the images for the front and back covers intrude into the area corresponding to a backbone cover, whereby externals of the bound copies worsen.

Therefore, in order to prevent such a disadvantage, when the cover sheet is formed, it is conceivable that a user (or an operator) himself sets the sheet (i.e., original) on which the image for the front cover has been printed and the sheet (i.e., original) on which the image for the back cover has been printed, onto an original mounting board (i.e., platen glass) of the image processing apparatus such that the former sheet and the latter sheet are disposed apart from each other by certain interval, and then the image processing apparatus reads the set and disposed originals as one data and forms the image corresponding to the read data.

However, when the cover sheet is formed, if it is assumed that the user himself manually disposes these original sheets, he must point by point worry about the thickness of the text originals. It is very difficult to accurately set the plural original sheets, whereby it takes unnecessary time and trouble.

SUMMARY OF THE INVENTION

An object of the present invention is to provide an image processing apparatus which solved the above- described problem.

Another object of the present invention is to provide an image processing apparatus which can easily form a sheet for covering a sheaf of plural sheets, without burdening a user.

Other objects and features of the present invention will become apparent from the following detailed description and the attached drawings.

DETAILED DESCRIPTION OF THE PREFERRED EMBODIMENTS

[First Embodiment]

(Explanation of Schematic of Apparatus)

Figure 1:
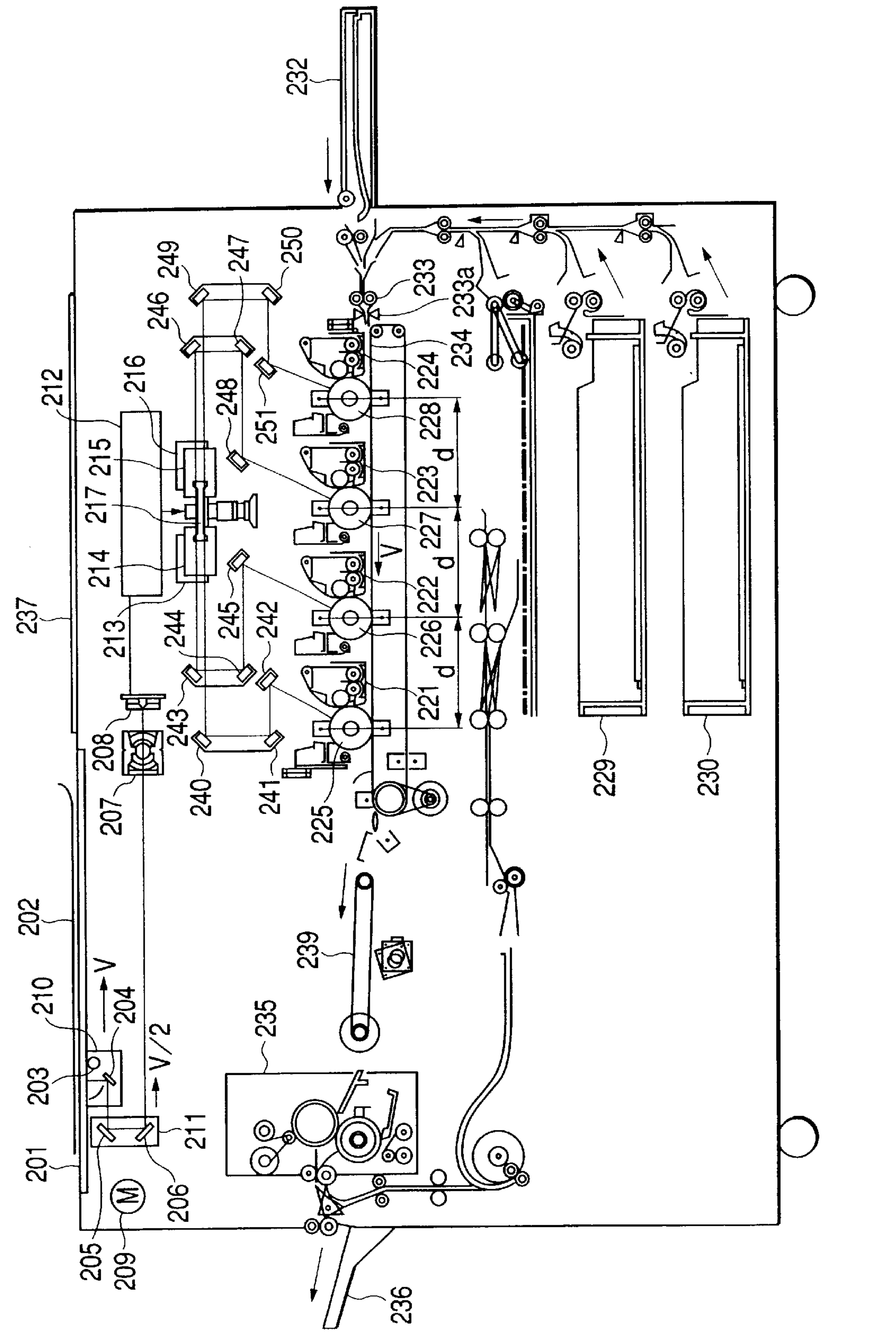
FIG. 1 is a sectional view for explaining the structure of an image processing apparatus.

FIG. 1 is a sectional view for explaining the structure of an image processing apparatus according to the first embodiment. Hereinafter, the structure and operation of the image processing apparatus will be explained.

In FIG. 1, numeral 1000 denotes the body of the image processing apparatus (e.g., a digital color copying machine). It should be noted that the numeral 1000 also denotes the image processing apparatus as a whole. Numeral 201 denotes an original mounting board glass (i.e., original mounting board) on which an original (or a manuscript) 202 to be read is put. Numeral 210 denotes a mirror unit which includes an illuminator 203, a mirror 204 and the like, and is mechanically driven by a motor 209 at predetermined speed V. Numeral 211 denotes a second mirror unit which includes mirrors 205 and 206 and the like, and is driven by the motor 209 at speed V/2 in the direction identical with the driving direction of the mirror unit 210.

Numeral 207 denotes an optical system which includes a lens and the like. Numeral 208 denotes a CCD which converts reflection light supplied from the original 202 through the mirror unit 210, the second mirror unit 211 and the optical system 207, into an electrical signal. It should be noted that a reader unit consists of the original mounting board glass 201, the mirror unit 210, the second mirror unit 211, and the like.

Numeral 212 denotes an image processing circuit unit which processes read image information as the electrical signal and outputs the processed signal as a print signal. Numerals 213, 214, 215 and 216 respectively denote semiconductor lasers (or semiconductor laser units) which are driven in response to the print signal output from the image processing circuit unit 212. Numerals 225, 226, 227 and 228 respectively denote photosensitive drums. Laser beams which were generated by the semiconductor lasers 213 to 216 are irradiated respectively onto the photosensitive drums 225 to 228 through a polygonal mirror 217 and mirrors 240, 241, 242, 243, 244, 245, 246, 247, 248, 249, 250 and 251, whereby latent images are formed on the respective drums.

Numerals 221, 222, 223 and 224 respectively denote development units. The development units 221 to 224 develop the latent images formed on the photosensitive drums 225 to 228 by using black (Bk or K), yellow (Y), cyan (C) and magenta (M) toners, respectively.

Numeral 234 denotes a transfer belt which adsorbs and carries a sheet fed from either of feeders (or sheet feeding units) through a pair of registration rollers (simply referred as "registration roller" hereinafter) 233. In the body 1000, sheet feeding cassettes 229 and 230 and a manual feeding tray 232 are disposed as the feeders. The transfer belt 234 carries the adsorbed sheet sequentially through the photosensitive drums 228, 227, 226 and 225 to transfer toner images on the respective drums onto the sheet. Numeral 235 denotes a fixing unit which fixes the toner image to the sheet separated from the transfer belt 234 and then carried by a carrying belt 239. Numeral 236 denotes a discharge tray onto which the sheet fixed with the toner image is discharged or delivered.

Numeral 237 denotes an operation unit or panel which is disposed on the body 1000. When a user performs a copying operation, he handles the operation unit 237 for various setting and instructions. The structure of the operation unit 237 will be described later.

In the body 1000 structured as above, for example, if a start key on the operation unit 237 is depressed, light is irradiated onto the original 202 by the illuminator 203, and the reflection light from the original 202 is guided into the optical system 207 through the mirrors 204 and 205, whereby the image is formed on the CCD 208.

Further, the mirror unit 210 including the mirror 204 and the illuminator 203 is mechanically driven by the motor 209 at the speed V, and also the second mirror unit 211 including the mirrors 205 and 206 is driven by the motor 209 at the speed V/2, whereby the entire face of the original 202 is scanned. It should be noted that, hereinafter, the direction in which the mirror unit 210 is driven is called a sub-scan direction (or a line direction) and the direction perpendicular to the sub-scan direction is called a main-scan direction (or a pixel direction).

The image of the original 202 read in such a manner as above is converted into the electrical signal by the CCD 208, and the obtained electrical signal is subjected to predetermined processing by the image processing circuit unit 212. Then the laser beams are irradiated onto the photosensitive drums 225 to 228 respectively by driving the semiconductor lasers 213 to 216 in synchronism with sheet carrying, to form the latent images on the respective drums 225 to 228. Then the formed latent images are developed respectively by the development units 221 to 224 with respective color toners.

As described above, the toners of the respective colors have been previously developed on the photosensitive drums 225 to 228 in synchronism with the sheet carrying. Thus, the toners formed on the drums 225 to 228 are transferred onto the sheet carried by the transfer belt 234. The sheet onto which the toners of the respective colors have been transferred is separated and carried, the toners are fixed to the sheet by the fixing unit 235, and then the sheet is discharged onto the discharge tray 236. Therefore, the developed toners of the respective colors on the photosensitive drums 225 to 228 are all transferred to the sheet, thereby performing full-color printing.

(Structure of Image Processing Circuit Unit)

Figures 2, 2A:
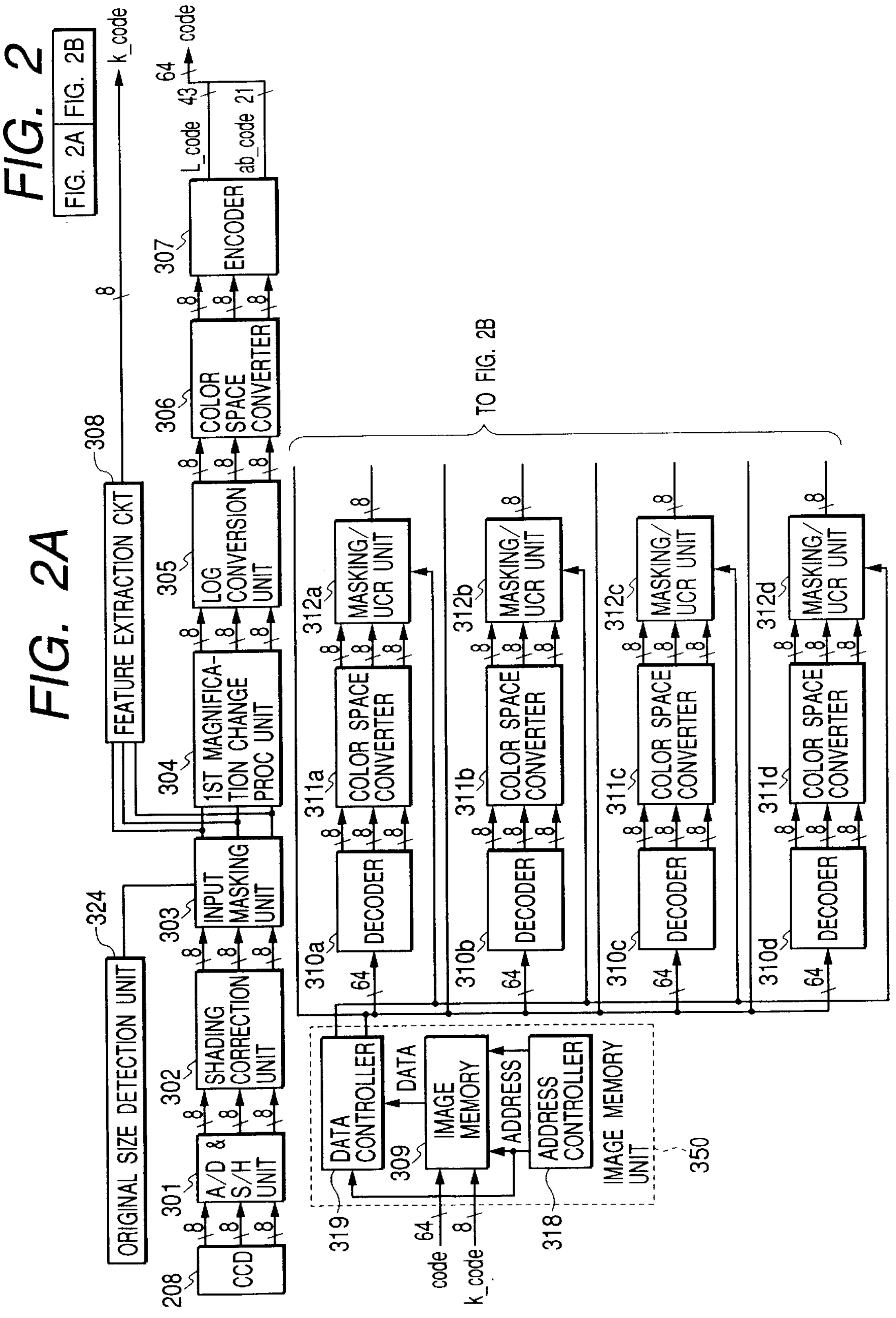
FIG. 2 which is composed of FIGS. 2A and 2B is a block diagram for explaining the structure of an image processing circuit unit.
Figure 2B:
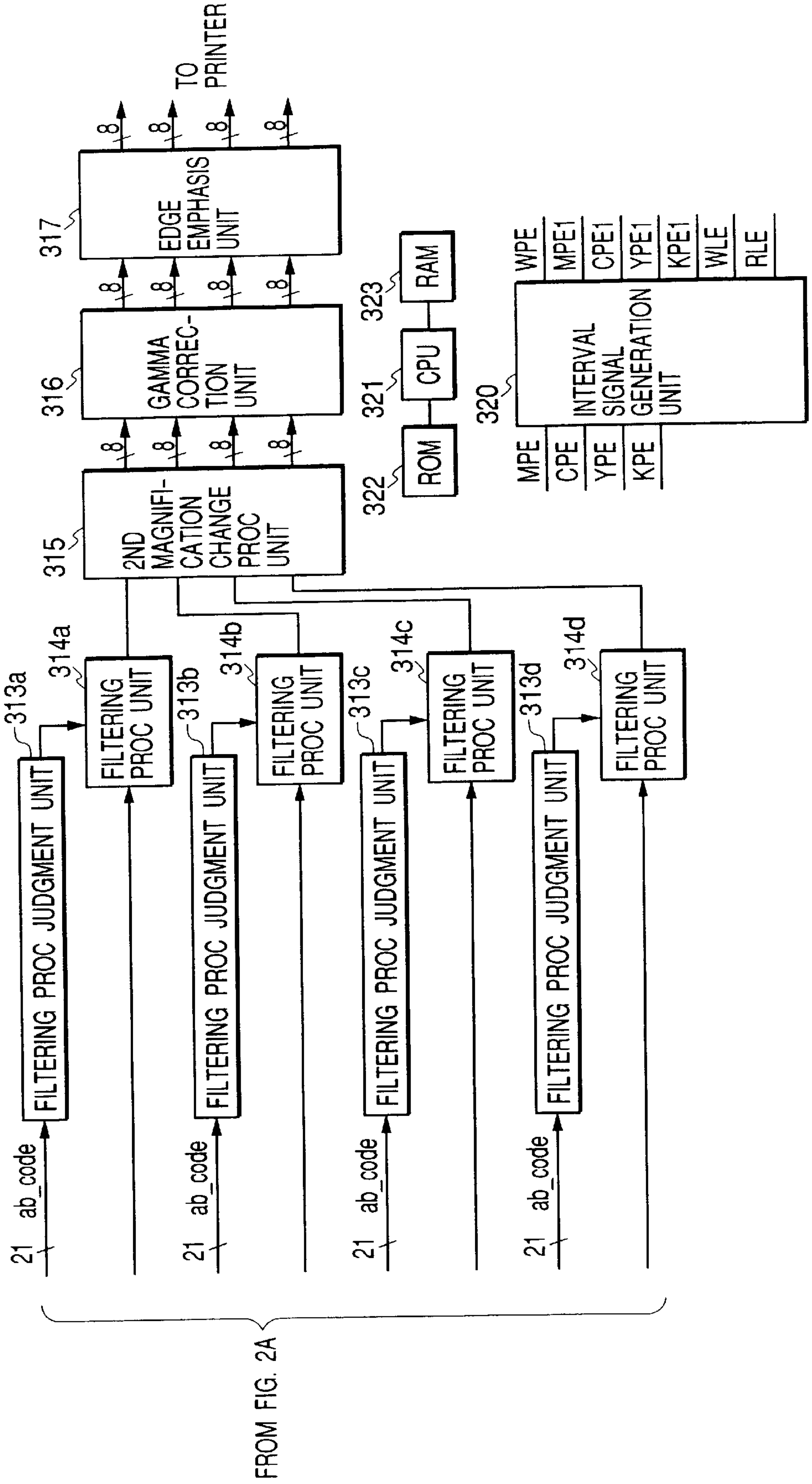

FIGS. 2A and 2B are block diagrams for explaining the structure of the image processing circuit unit 212 shown in FIG. 1.

In FIGS. 2A and 2B, numeral 208 denotes a CCD sensor which includes R (red), G (green) and B (blue) CCD's. Numeral 301 denotes an A/D and S/H (analog-to-digital and sample-and-hold) unit which amplifies R, G and B signals from the CCD sensor 208 by a not-shown amplifier, converts the amplified signals into digital signals by a not-shown A/D converter, and outputs the obtained digital signals. In the A/D and S/H unit 301, the R and G signals are respectively delayed by a delay memory to correct spatial deviation of the three CCD's in the CCD sensor 208, and the corrected signals are output.

Numeral 302 denotes a shading correction unit which performs shading correction to the signals output from the A/D and S/H unit 301. Numeral 303 denotes an input masking unit which converts the signals output from the shading correction unit 302 into R, G and B signals of the NTSC (National Television System Committee) format.

Numeral 304 denotes a first magnification change processing unit which performs magnification change to the image signal in the main-scan direction especially when the image is size-enlarged. It should be noted that magnification change to the image signal in the sub-scan direction is performed by controlling the driving speed of the mirror units 210 and 211 shown in FIG. 1. Numeral 305 denotes an LOG (logarithmic) conversion unit 305 which converts the image signals output from the first magnification change processing unit 304 into C (cyan), M (magenta) and Y (yellow) signals. Numeral 306 denotes a color space converter which converts the C, M and Y signals output from the LOG conversion unit 305 into a lightness signal L (or L signal) and chromaticity signals a and b (or a and b signals). It should be noted that the L signal and the a and b signals may be called together as an Lab signal. Further, it should be noted that the Lab signal represents chromaticity components defied as an Lab space being an international standard of CIE (International Commission Illumination). The Lab signal is calculated by the equation (1).

$$\begin{pmatrix} L \\ a \\ b \end{pmatrix} = \begin{pmatrix} 0 & \alpha 12 & 0 \\ \alpha 21 & \alpha 22 & 0 \\ 0 & \alpha 31 & \alpha 33 \end{pmatrix} \begin{pmatrix} (X/X0)1/3 \\ (Y/Y0)1/3 \\ (Z/Z0)1/3 \end{pmatrix} + \begin{pmatrix} \alpha 14 \\ 0 \\ 0 \end{pmatrix} \tag{1}$$

In the equation (1), symbols αij, X0, Y0 and ZO are constants, symbols X, Y and Z represents the signals generated from the R, G and B signals. The X, Y and Z signals are obtained by the equation (2)

$$\begin{pmatrix} X \\ Y \\ Z \end{pmatrix} = \begin{pmatrix} \beta 11 & \beta 21 & \beta 31 \\ \beta 21 & \beta 22 & \beta 32 \\ \beta 31 & \beta 23 & \beta 33 \end{pmatrix} \begin{pmatrix} R \\ G \\ B \end{pmatrix} \tag{2}$$

In the equation (2), symbol βij is a constant.

Numeral 307 denotes an encoder which encodes the L signal (i.e., lightness information) by the 4×4 pixel block to output a code L__code, and also encodes the a and b signals (i.e., chromaticity information) by the 4×4 pixel block to output a code ab__code. Numeral 308 denotes a feature extraction circuit (or black pixel character area detection circuit) which includes a not-shown black pixel detection circuit, a not-shown character area detection circuit and the like. The feature extraction circuit 308 judges whether or not a target pixel corresponds to a black signal, i.e., judges by the black pixel detection circuit whether or not the pixel area within the 4×4 pixel block is the black pixel area. If the pixel area is the black pixel area, the character area detection circuit outputs a black judgment signal "1". In other cases, the circuit outputs the black judgment signal "0".

Numeral 309 denotes an image memory which stores therein an L__code signal being the code of the lightness information, an ab__code signal being the code of the chromaticity information, and a k__code signal being a black judgement signal obtained as a result of the feature extraction. Data reading/writing from/to the image memory 309 is controlled by an address controller 318 and a data controller 319.

Numeral 310a (similarly, 310b, 310c, 310d) denotes a decoder which decodes the L signal (i.e., the lightness information) from the L__code signal read from the image memory 309, and also decodes the a and b signals (i.e., the chromaticity information) from the ab__code signal. Numeral 311a (similarly, 311b, 311c, 311d) denotes a color space converter which is the unit for converting the decoded Lab signal into M (magenta), C (cyan), Y (yellow) and Bk (black) components respectively being toner development colors.

Numeral 312a (similarly, 312b, 312c, 312d) denotes a masking/UCR (under color removal) unit which includes a not-shown masking unit, a not-shown UCR unit and the like. In the masking/UCR unit 312a, a black extraction circuit generates a black signal Bk by the equation (3).

$$Bk=\min(M,C,Y) \tag{3}$$

Further, if the black judgment signal is not "0", i.e., if the pixel area does not correspond to the black signal, the masking unit multiplies the C, M, Y and Bk signals by predetermined coefficients a1, a2, a3 and a4 respectively, and sum and product calculation is performed by the equation (4).

$$(\text{output } C, M, Y \text{ or Bk}) = a1M + a2C + a3Y + a4\text{Bk} \tag{4}$$

Conversely, if the black judgment signal is "1", i.e., if the pixel area corresponds to the black signal, the masking unit multiplies the C, M, Y and Bk signals by different predetermined coefficients b1, b2, b3 and b4 respectively, and the sum and product calculation is performed by the equation (5).

$$(\text{output } C, M, Y \text{ or Bk}) = b1M + b2C + b3Y + b4\text{Bk} \tag{5}$$

Numeral 313a (similarly, 313b, 313c, 313d) denotes a filtering processing judgment unit (or a filtering ON/OFF judgment unit) which determines filtering processing of the image block based on the encoded image code and transfers a judgment signal to a spatial filtering processing unit 314a (similarly, 314b, 314c, 314d). The filtering processing unit 314a is the unit for performing image correction by selectively performing spatial filtering to the decoded Lab signal on the basis of the judged result of the filtering processing judgment unit 313a.

Numeral 315 denotes a second magnification change processing unit which performs magnification change to the image signal in the main-scan direction especially when the image is size-reduced. It should be noted that magnification change to the image signal in the sub-scan direction is performed by controlling the driving speed of the mirror units 210 and 211. It is possible to use the same circuit for both the first and second magnification change processing units 304 and 315. When the same circuit is used, the CPU 321 controls the gate from which the data is output in a magnification change mode, by using a tristate gate circuit.

Numeral 316 denotes a gamma correction unit which corrects the C, M, Y and K (Bk) data on the basis of an image output characteristic of a printer unit (a printer or an output device structured by the units 213 to 236 and the like shown in FIG. 1). Numeral 317 denotes an edge emphasis unit which performs smoothing filtering or edge emphasis filtering to the C, M, Y and K data, and outputs the processed data as output image data to the printer unit.

Numeral 320 denotes an interval signal generation unit which generates main-scan interval signals WLE and RLE and a sub-scan interval signal WPE, and processes sub-scan interval signals MPE, CPE, YPE and KPE (BPE) respectively to output signals MPE1, CPE1, YPE1 and KPE1. The respective image processing units shown in FIGS. 2A and 2B are output-controlled by these interval signals.

Numeral 324 denotes an original size detection unit which detects the size of the original image read by the CCD 208 and notifies the CPU 321 of the detected size.

Numeral 350 denotes an image memory unit which includes the image memory 309, the address controller 318, the data controller 319 and the like. Numeral 321 denotes a CPU which controls each part of the image processing circuit unit 212, and also controls the body 1000 of the digital color (laser) copying machine entirely. Numeral 323 denotes a RAM which functions as a main memory, a working area or the like of the CPU 321. Numeral 322 denotes a ROM which stores therein control programs (including programs for executing processing shown in later-described flow charts) and the like for the CPU 321.

(Timing Chart)

Figure 3:
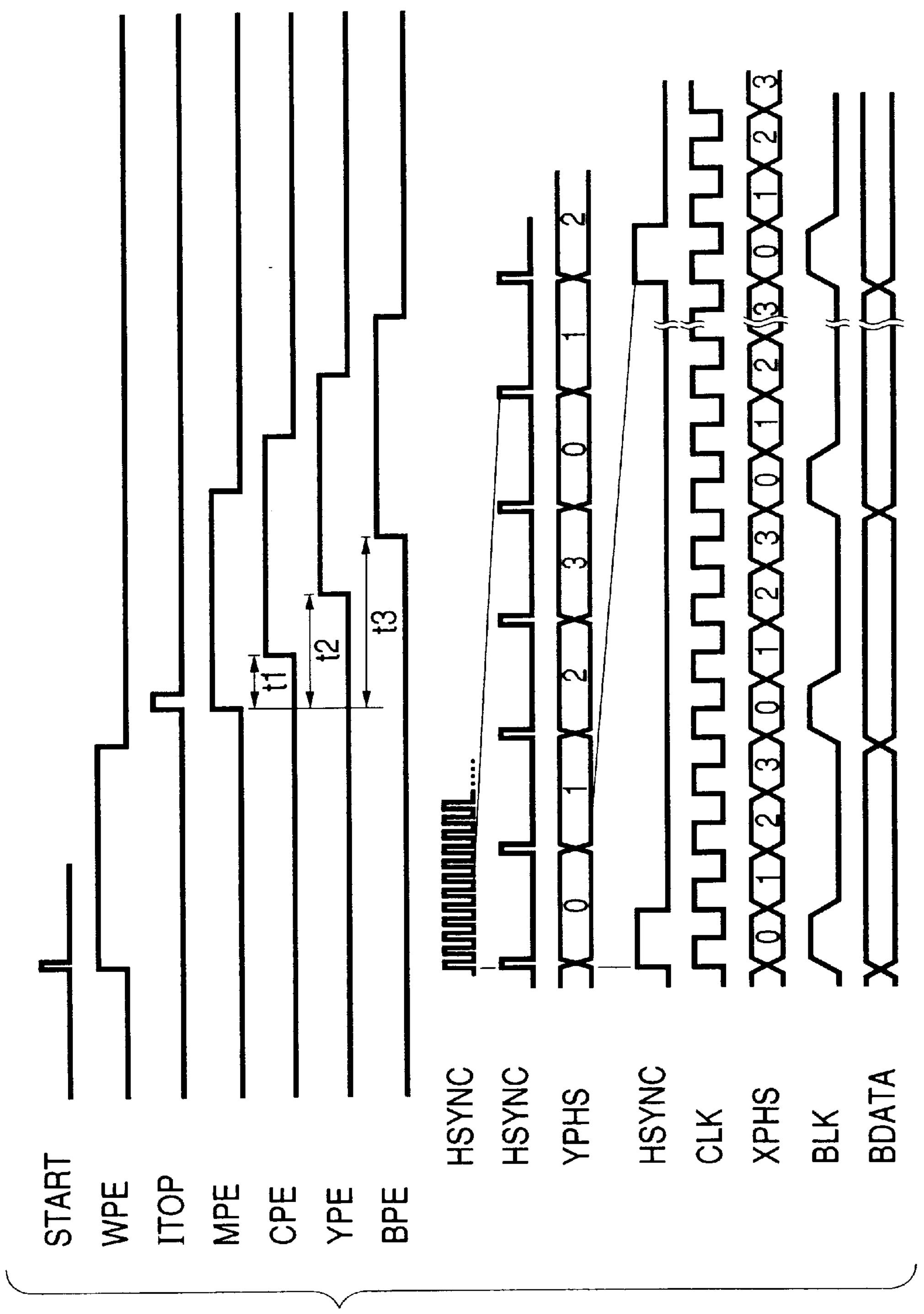
FIG. 3 is a timing chart for explaining control signals in the image processing apparatus.

FIG. 3 is a timing chart for explaining the control signals in the image processing apparatus 1000.

In FIG. 3, a signal START is the signal representing start of the original reading operation in the present embodiment. The signal WPE represents the interval during which the image scanner (i.e., the reader unit) reads the original, and the image processing circuit unit 212 encodes the read data and writes the processed data into the image memory 309 (called "memory writing").

A signal ITOP is the signal representing start of the printing operation. The signal MPE is the interval signal for driving the magenta semiconductor laser 216 shown in FIG. 1, the signal CPE is the interval signal for driving the cyan semiconductor laser 215, the signal YPE is the interval signal for driving the yellow semiconductor laser 214, and the signal BPE is the interval signal for driving the black semiconductor laser 213.

As shown in FIG. 3, the signals CPE, YPE and BPE are delayed from the signal MPE by delay times t1, t2 and t3, respectively. The delay times t1, t2 and t3 are controlled to satisfy "t1=d/V", "t2=2d/V" and "t3=3d/V" (d is a constant, and V is the sheet feeding speed), respectively.

A signal HSYNC is the main-scan sync signal, and a signal CLK is the pixel sync signal. Each of the signals WLE and RLE (not shown in FIG. 3) is the interval signal representing the effective image interval during which the image signal is input from the image scanner within one HSYNC signal interval.

A signal YPHS represents the count value of the two-bit sub-scan counter, and a signal XPHS represents the count value of the two-bit main-scan counter. The signals YPHS and XPHS are generated by the circuit which is structured by an inverter 901, two-bit counters 902 and 903 and the like shown in later-described FIG. 4. A signal BLK is the signal representing start of the image block, and a signal BDATA is the pixel block data.

Figure 4:
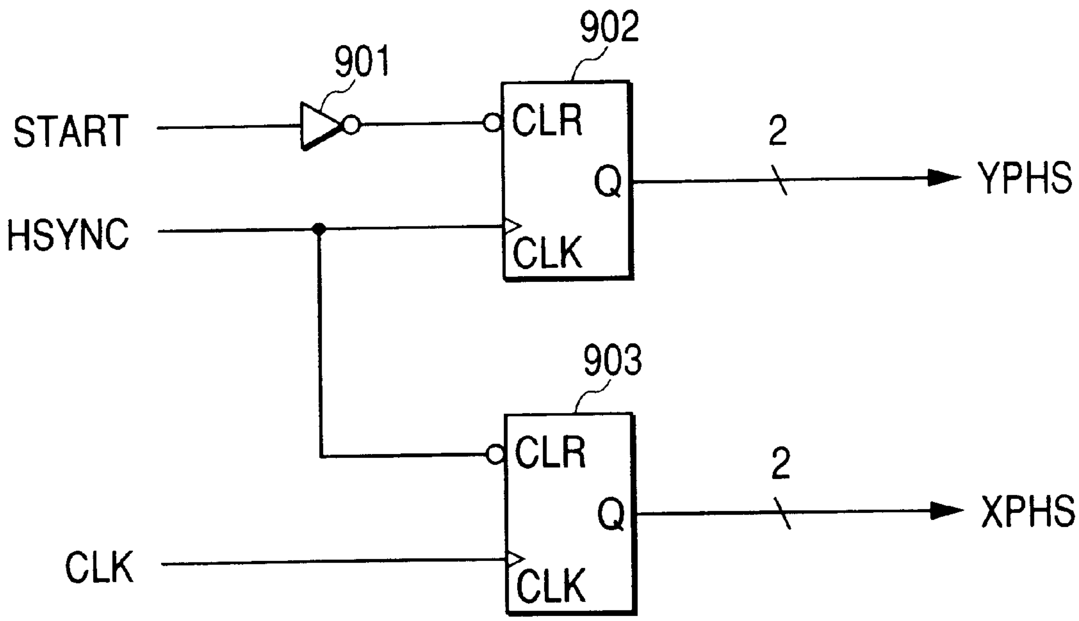
FIG. 4 is a block diagram showing the structure of a main-scan counter for generating a signal XPHS and the structure of a sub-scan counter for generating a signal YPHS.

FIG. 4 is a block diagram showing the structure of the main-scan counter for generating the signal XPHS and the structure of the sub-scan counter for generating the signal YPHS.

In FIG. 4, numeral 902 denotes the two-bit counter. The signal START is input to the CLR terminal of the counter 902 through the inverter 901, the signal HSYNC is input to the CLK terminal thereof, and the signal YPHS is output from the Q terminal thereof.

Numeral 902 denotes the two-bit counter. The signal HSYNC is input to the CLR terminal of the counter 903, the signal CLK is input to the CLK terminal thereof, and the signal XPHS is output from the Q terminal thereof. It should be noted that, by the signals YPHS and XPHS respectively output from the counters 902 and 903, the image processing circuit unit 212 shown in FIG. 1 can process the input image by the 4×4 pixel block.

(Structure of Image Memory Unit)

Hereinafter, the image memory unit 350 shown in FIGS. 2A and 2B which includes the image memory 309, the address controller 318 and the data controller 319 will be explained.

The image memory 309 used in the present embodiment is the DRAM (dynamic random-access memory). Accessing of the DRAM is controlled by ROW and COLUMN addresses, their-respective strobe signals RAS and CAS, and an enable signal WE.

Hereinafter, the internal structure and operation of the address controller 318 will be explained with reference to FIGS. 5A, 5B, 6, 7 and 8.

Figures 5, 5A:
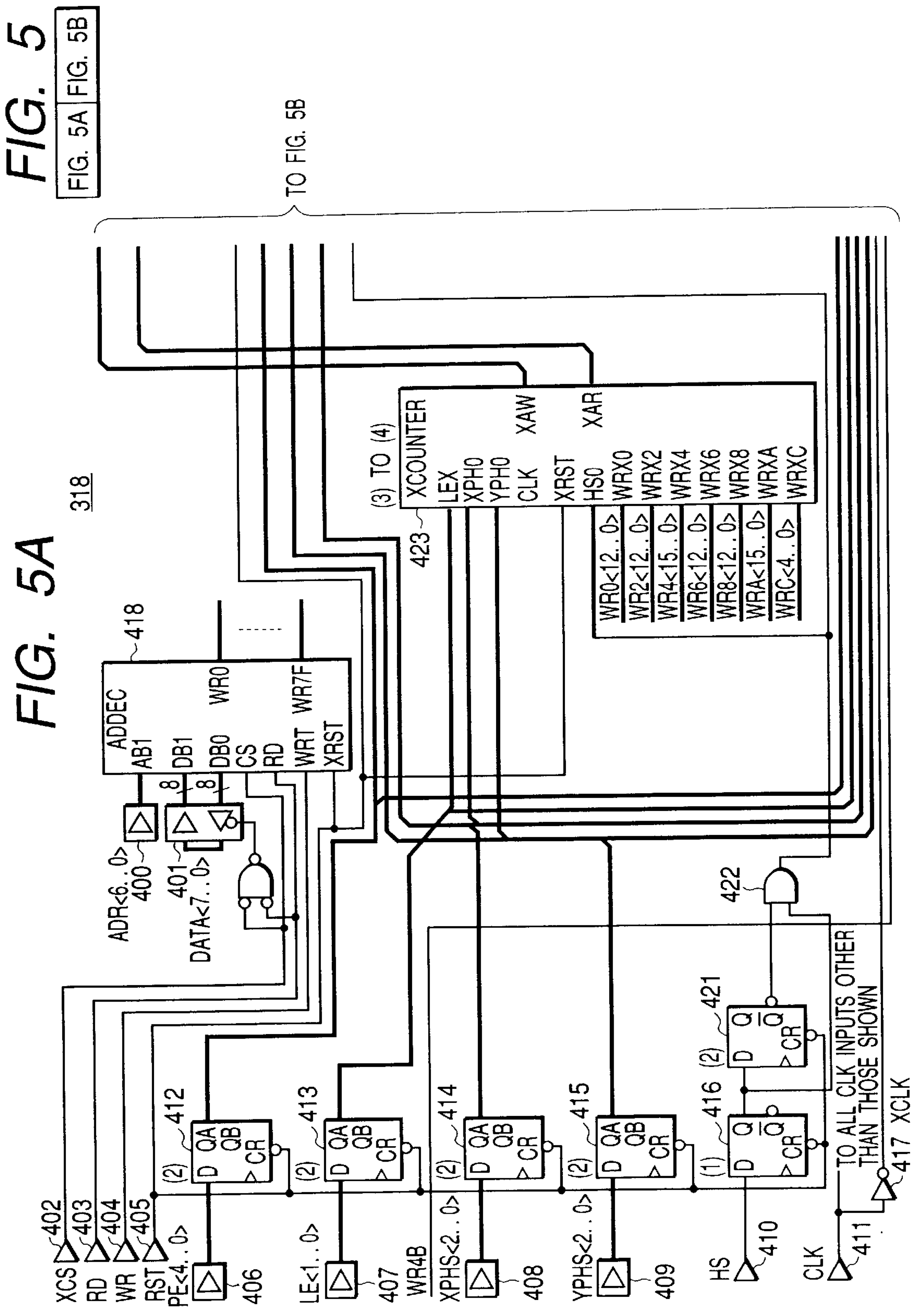
FIG. 5 which is composed of FIGS. 5A and 5B is a block diagram for explaining the structure of an address controller shown in FIGS. 2A and 2B.
Figure 5B:
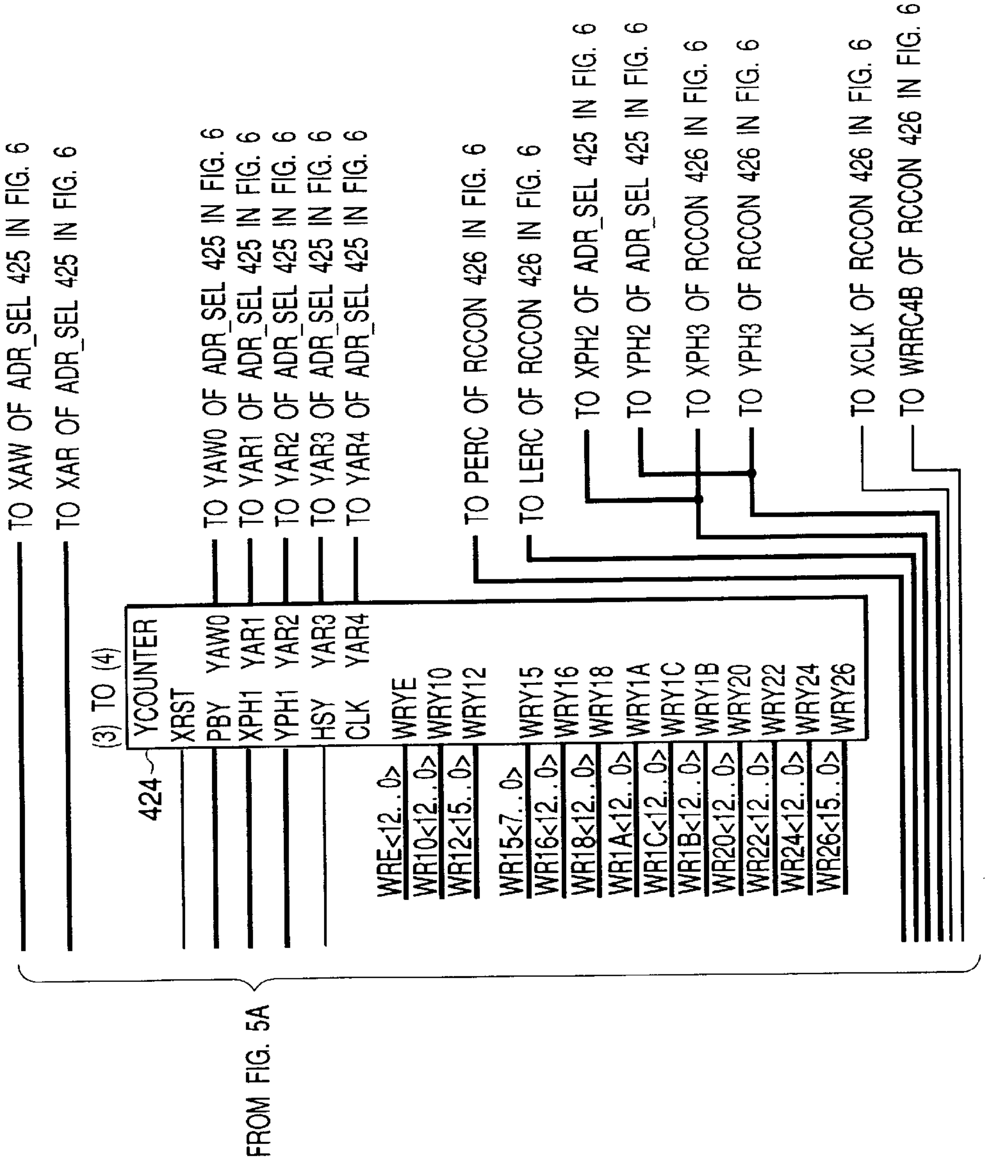
Figure 6:
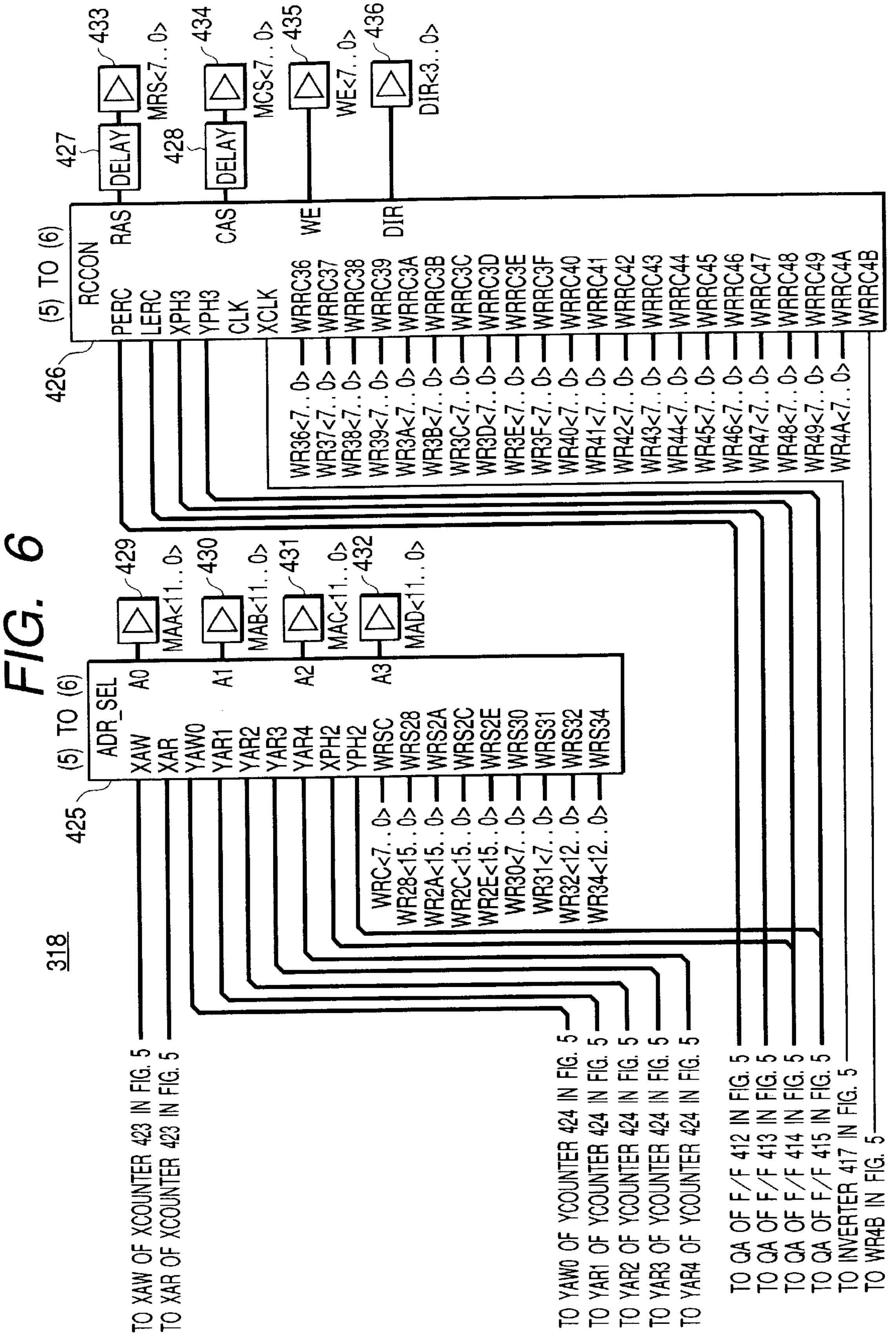
FIG. 6 is a block diagram for explaining the structure of the address controller shown in FIGS. 2A and 2B.

FIGS. 5A, 5B and 6 are the block diagrams for explaining the internal structure of the address controller 318 shown in FIGS. 2A and 2B.

In FIGS. 5A, 5B and 6, numerals 400, 401, 402, 403, 404, 405, 406, 407, 408, 409, 410 and 411 denote buffers to which later-described various signals are input. Numerals 412, 413, 414, 415, 416 and 421 denote F/F (flip-flop) circuits, numeral 417 denotes an inverter, numeral 422 denotes an AND gate, and numeral 418 denotes an ADDEC.

Numeral 423 denotes a main-scan address generation unit (XCOUNTER: main-scan counter) which includes a writing main-scan address control unit for designating and controlling the main-scan direction address when the image data is written into the image memory 309, and a reading main-scan address control unit for designating and controlling the main-scan direction address when the image information is read from the image memory 309. Numeral 424 denotes a sub-scan address generation unit (YCOUNTER: sub-scan counter). Numeral 425 denotes an address selection unit (ADR_SEL) which generates a writing address or a reading address to the image memory 309. Numeral 426 denotes a memory control signal generation unit (RCCON) which generates various timing signals to the image memory 309.

Numerals 427 and 428 denotes delay circuits which delay the output timing of the ROW address strobe signal RAS and the COLUMN address strobe signal CAS output from the RCCON 426 to the image memory 309. Numerals 429, 430, 431, 432, 433, 434, 435 and 436 denote output buffers. Incidentally, the inversion output of the F/F 421 and the non-inversion output of the F/F 416 is AND calculated, and the AND result signal is output to the XCOUNTER 423 and the YCOUNTER 424.

The address controller 318 is roughly composed of the main-scan address generation unit (XCOUNTER) 423, the sub-scan address generation unit (YCOUNTER) 424, the address selection unit (ADR_SEL) 425 and the memory control signal generation unit (RCCON) 426.

The image processing apparatus 1000 in the present embodiment can cause the image memory 309 to store an image of 297 mm maximumly in the main-scan direction and 432 mm maximumly in the sub-scan direction at resolution 400 dpi. Therefore, each of the XCOUNTER 423 and the YCOUNTER 424 is structured by the 13-bit address counter to be able to access the memory space corresponding to the image of 297 mm×432 mm.

It is needless to say that the present embodiment is applicable even in a case where the data quantity capable of being stored in the image memory 309 has a value other than the above.

Hereinafter, the operation of the address controller 318 will be explained. Each of signals WLE and RLE being the main-scan interval signal transferred from the interval signal generation unit 320 through the buffer 407 is one-clock delayed by the F/F 413, and then input to the XCOUNTER 423.

Similarly, each of the signals WPE, MPE, CPE and YPE being the sub-scan interval signal transferred from the buffer 406 is one-clock delayed by the F/F 412, and then input to the YCOUNTER 424. If the interval signal is "H" (high level), it represents the effective image interval.

The ADDEC 418 receives signals ADR, DATA, XCS, RD, WR and RST from the CPU 321 respectively through the buffers 400, 401, 402, 403, 404 and 405 to perform data writing/reading to respective registers.

In addition to the interval signals, the signal XPHS representing a main-scan phase and signals WR0, WR4, WR6, WRA and WRC for various setting to the counter are input to the main-scan address generation unit (XCOUNTER) 423. The main-scan writing address (signal XAW) to the DRAM and the main-scan reading address (signal XAR) from the DRAM are output from the XCOUNTER 423.

The sub-scan writing address (signal YAW0) and the sub-scan reading addresses (signals YAR1, YAR2, YAR3 and YAR4) are output from the YCOUNTER 424 and then input to the ADR_SEL 425. The ADR_SEL 425 performs change-controlling of Y counters 502, 503, 504, 505 and 506 (FIG. 7) in the YCOUNTER 424 in synchronism with the main-scan and sub-scan phases, and externally outputs four address signals A0, A1, A2 and A3 respectively through the output buffers 429, 430, 431 and 432. Incidentally, the structure and operation of the sub-scan address generation unit (YCOUNTER) 424 will be explained later in FIG. 7.

On the other hand, the RCCON 426 generates the signals WE, RAS and CAS necessary for accessing the DRAM and a signal DIR for controlling the I/O port of the data controller.

The signals RAS, CAS and WE generated by the RCCON 426 are output to the image memory 309 of FIGS. 2A and 2B appropriately through the delay lines 427 and 428 and the output buffers 433, 434 and 435. The delay lines 427 and 428 adjust timing for satisfactory data accessing in accordance with characteristics of the memories to be controlled. The signal DIR is output to the data controller 319 through the output buffer 436.

In accordance with the address and memory control signals output from the address controller 318, the image data is transferred between the data controller 319 and the image memory 309. The data controller 319 controls the data accessing order when change of data writing and data reading, increment processing of the image data necessary for decoding, and editing processing such as image rotation or the like are performed, and then the processed data is output to the decoder 310 (i.e., 310*a,* 310*b,* 310*c* and 310*d*).

Figure 7:
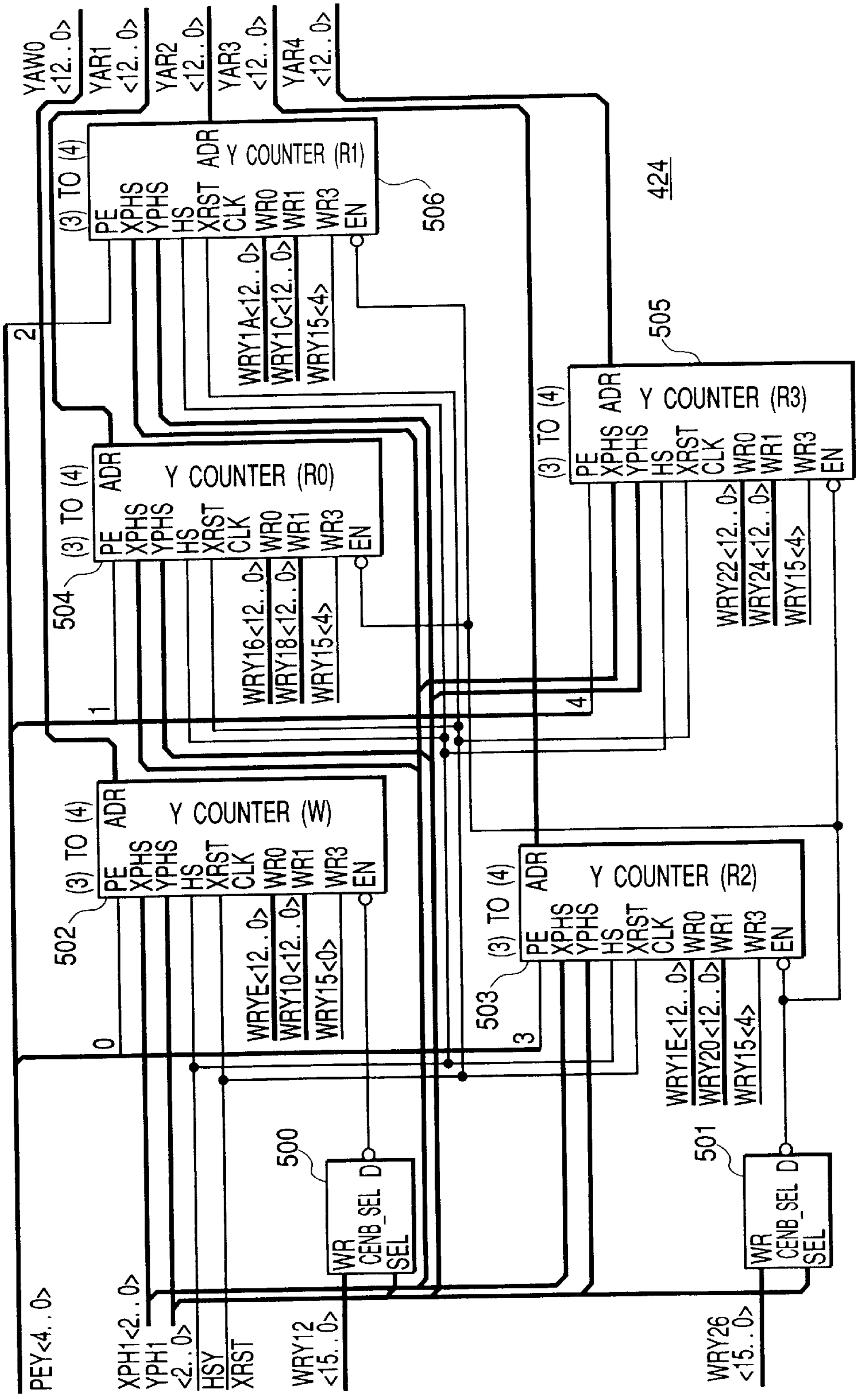
FIG. 7 is a block diagram for explaining the structure of a sub-scan counter shown in FIGS. 5A and 5B.

FIG. 7 is a block diagram for explaining the structure of the sub-scan counter (YCOUNTER) 424 shown in FIGS. 5A and 5B.

In FIG. 7, numerals 500, 501 denote enable selection units (CENB_SEL) which perform enable-controlling to the counters 502 to 506 on the basis of the values set by the two registers WRY12 and WRY26. Numeral 502 denotes the counter (Y counter) being the writing counter, and numerals 503 to 506 denote the counters (Y counter) being the reading counter for reading M, C, Y and K color data.

As described above, the sub-scan counter 424 of FIGS. 5A and 5B includes the five counters 502 to 506 being the writing and reading counters, and the like. Each of the counters 502 to 506 has the structure shown in FIG. 8. Incidentally, the Y counter outputs of the five counters 502, 503, 504, 505 and 506 of FIG. 7 correspond to the signals YAW0, YAR1, YAR2, YAR3 and YAR4, respectively.

Figure 8:
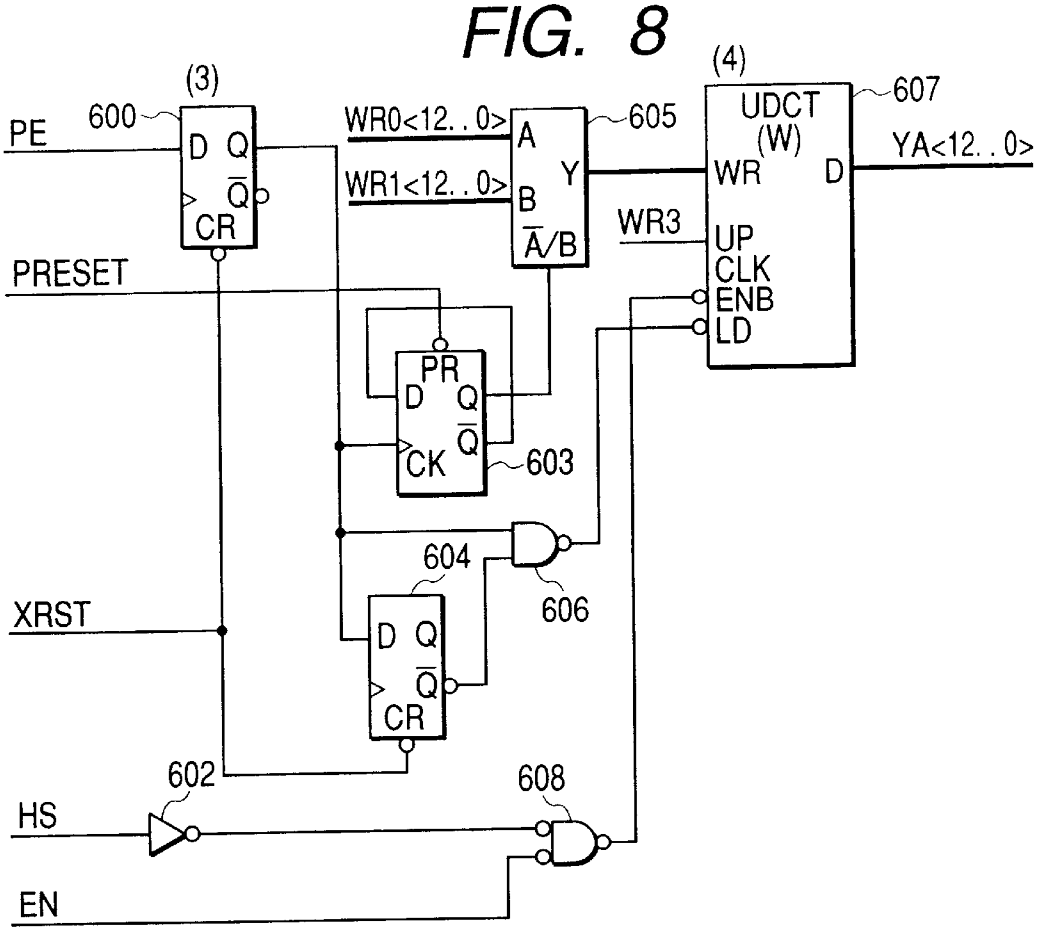
FIG. 8 is a block diagram for explaining the structure of a counter shown in FIG. 7.

FIG. 8 is a block diagram for explaining the structure of each of the counters 502 to 506 shown in FIG. 7.

In FIG. 8, a signal PE which is the sub-scan interval signal is input to each of the counters 502 to 506 of FIG. 7. Numeral 600 denotes an F/F which delays the input signal PE by six clocks and inputs the delayed signal PE to the CK terminal of an F/F 603 and the D terminal of an F/F 604. When the output from the F/F 600 changes from "L" (low level) to "H" (high level), inverted data of the internal state is input to the F/F 603. Incidentally, since a signal PRSET being the port signal from the CPU 321 is input to the PR terminal of the F/F 603, the CPU 321 can arbitrarily preset the F/F 603.

The output signal from the F/F 603 is input as a selection signal to a two-into-one selector 605. The register outputs WR0 and WR1 are set respectively to the A and B inputs of the selector 605, and the output signal from the selector 605 is input to the load value terminal WR of a 13-bit counter (UDCT (W)) 607. In the ordinary copying operation, the register outputs WR0 and WR1 have the same set value. Conversely, during the copying operation in a later-described backbone cover mode, the register outputs WR0 and WR1 respectively have different set values.

The inverted output from the F/F 604 and the output from the F/F 600 are input to a NAND gate 606, and the output from the NAND gate 606 is input to the LD signal terminal of the 13-bit counter 607. Thus, loading to the 13-bit counter 607 is performed at the instant that the interval signal PE becomes enable.

The signal which is obtained by inverting a signal HS generated from the main-scan sync signal with an inverter 602 and a signal EN are input to an OR circuit 608, and the output signal from the OR circuit 608 is input to the ENB signal terminal of the 13-bit counter 607. The counter 607 performs counting plural times according to the signal EN during one main-scan interval synchronous with the signal HS.

A signal WR3 is the counter up-and-down change control signal which is input to the UP terminal of the 13-bit counter 607. If the signal WR3 is "L", the counter 607 performs up-counting, while if the signal WR3 is "H", the counter 607 performs down-counting.

(Structure of Interval Signal Generation Unit)

Hereinafter, the circuit structure for generating a signal MPE1 from the signal MPE of the interval signal generation unit 320 shown in FIGS. 2A and 2B will be explained with reference to FIG. 9.

Figure 9:
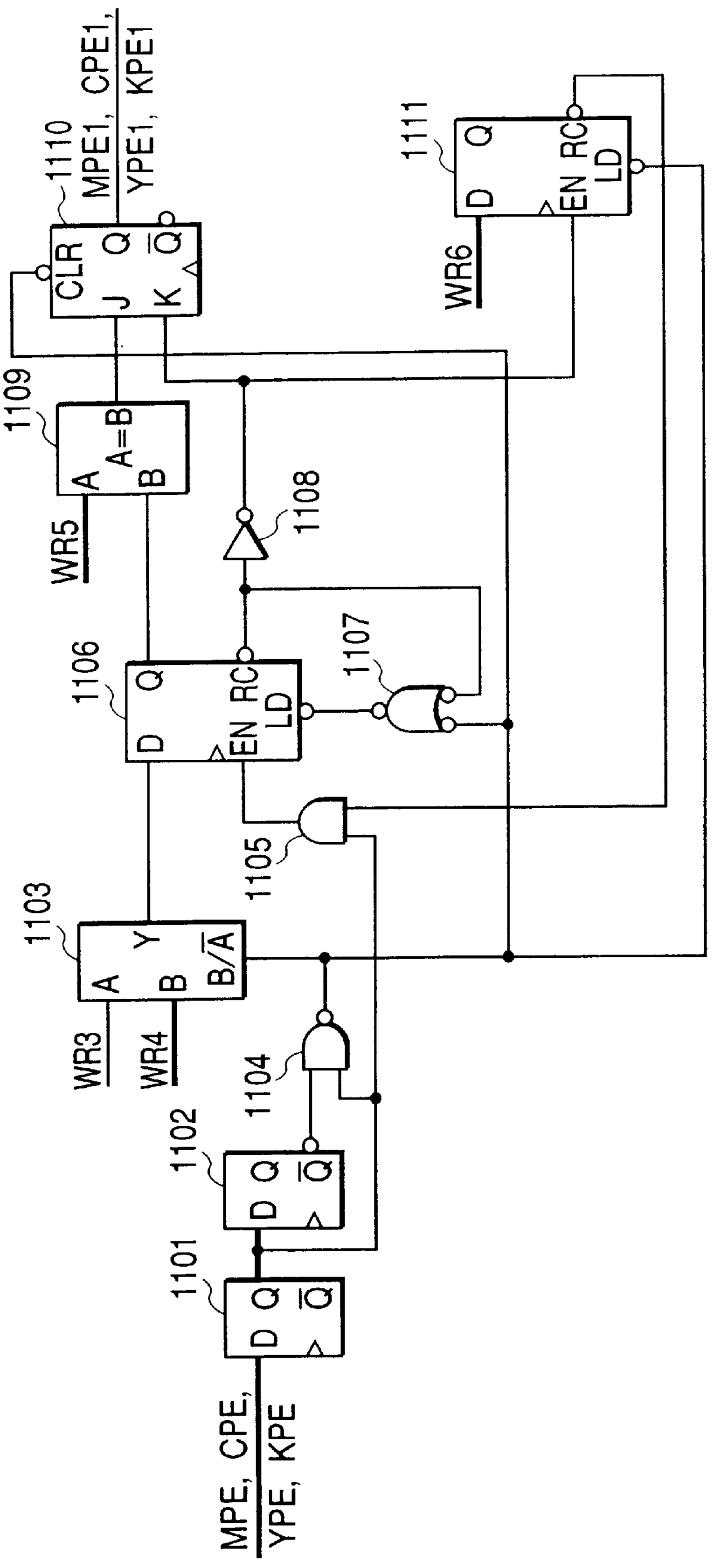
FIG. 9 is a block diagram for explaining a part of the circuit structure of an interval signal generation unit shown in FIGS. 2A and 2B.

FIG. 9 is a block diagram for explaining a part of the circuit structure of the interval signal generation unit 320 shown in FIGS. 2A and 2B. More concretely, FIG. 9 shows the circuit which is caused by the interval signal generation unit 320 to generate the various signals shown in FIG. 3 at predetermined timing.

In FIG. 9, numeral 1101 denotes an F/F (flip-flop) circuit to which any one of the signals MPE, CPE, YPE and KPE is input, and from which the non-inversion output is output to an F/F 1102. Numeral 1104 denotes a NAND gate to which the inversion output from the F/F 1102 is input. Numeral 1103 denotes a selector to which the non-inversion output from the F/F 1101 and the output from the NAND gate 1104 are input. The selector 1103 outputs either of the value obtained by inverting the a register value WR3 or a register value WR4 to an F/F 1106 having the enable terminal, on the basis of the input values.

The non-inversion output from the F/F 1101 and the output from the RC terminal of an F/F 1111 having the enable terminal are input to an AND gate 1105. The output from the AND gate 1105 is input to the enable terminal of the F/F 1106. The output from the RC terminal of the F/F 1106 and the output from the NAND gate 1104 are input to an AND gate 1107. The output from the AND gate 1107 is input to the LD terminal of the F/F 1106.

Numeral 1109 denotes a comparator. The register value WR5 is input to the A terminal of the comparator 1109, and the output from the F/F 1106 having the enable terminal is input to the B terminal thereof. Numeral 1110 denotes a J-K F/F. The output from the comparator 1109 is input to the J terminal of the J-K F/F 1110, the output from the RC terminal of the F/F 1106 having the enable terminal is input to the K terminal thereof through an inverter 1108, and the output from the NAND gate 1104 is input to the CLR terminal thereof.

The non-inversion output from the J-K F/F 1110 acts as the signals MPE1, CPE1, YPE1 and KPE1. The register value WR6 is input to the F/F 1111 having the enable terminal, and the output from the NAND gate 1104 is input to the LD terminal. The signal HSYNC is all input to the CLK terminal shown in FIG. 9.

In the circuit structured as above, the signals MPE, CPE, YPE and KPE are input to the D terminal of the F/F 1101, and the output from the Q terminal of the F/F 1101 is input to the D terminal of the F/F 1102, the NAND gate 1104 and the AND gate 1105. The inversion output from the F/F 1102 is input to the NAND gate 1104.

The output from the NAND gate 1104 is input to the selection terminal of the selector 1103 and the AND gate 1107. Further, the output from the NAND gate 1104 is inverted and then input to the CLR terminal of the J-K F/F 1110 and the LD terminal of the F/F 1111 having the enable terminal. The register value WR3 is input to the A terminal of the selector 1103, and the register value WR4 is input to the B terminal thereof. The output from the Y terminal of the selector 1103 is input to the D terminal of the F/F 1106 having the enable terminal.

The output from the RC terminal of the F/F 1106 having the enable terminal is input to the AND gate 1107, and the output from the AND gate 1107 is inverted and then input to the LD terminal of the F/F 1106. The output from the RC terminal of the F/F 1106 is input to the K terminal of the J-K F/F 1110 and the EN terminal of the F/F 1111 having the enable terminal through the inverter 1108.

The output from the Q terminal of the F/F 1106 having the enable terminal is input to the B terminal of the selector 1109. Further, the register value WR5 is input to the A terminal of the selector 1109. The output from the selector 1109 in case of A=B is input to the J terminal of the J-K F/F 1110, and the signals MPE1, CPE1, YPE1 and KPE1 are output from the Q terminal of the J-K F/F 1106.

Thus, it is possible to generate the signals MPE1, CPE1, YPE1 and KPE1 respectively obtained by internally delaying the signals MPE, CPE, YPE and KPE sent from the printer unit.

(Signal Generated in Interval Signal Generation Unit)

Figure 10:
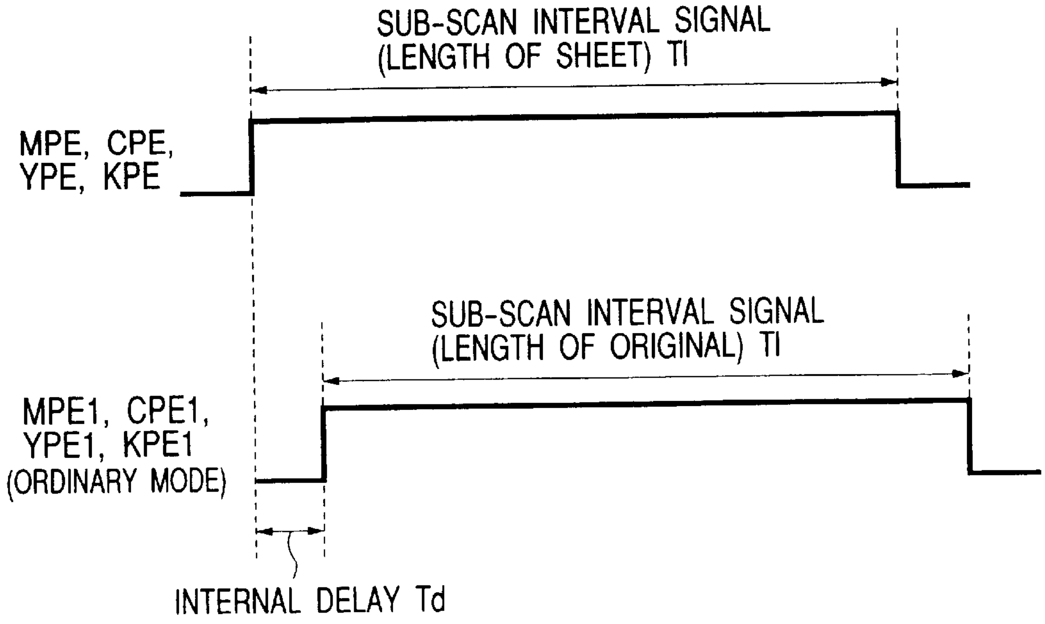
FIG. 10 is a timing chart for explaining reading interval signals generated by the interval signal generation unit shown in FIGS. 2A and 2B.

FIG. 10 is a timing chart for explaining reading interval signals (MPE1, CPE1, YPE1 and KPE1) generated by the interval signal generation unit 320 shown in FIGS. 2A and 2B. It should be noted that in FIG. 10 the signals same as those in FIG. 3 are added with the same symbols, respectively.

In FIG. 10, each of the signals MPE, CPE, YPE and KPE is the sub-scan interval signal which is transferred from the printer unit and is "H" during a time Tl corresponding to the length of the sheet.

The signals MPE1, CPE1, YPE1 and KPE1 are the signals output from the circuit of FIG. 9 in the interval signal generation unit 320. The signals MPE1, CPE1, YPE1 and KPE1 are delayed by an internal delay time Td and come to be "H". Then the signals MPE1, CPE1, YPE1 and KPE1 are "H" during the time Tl corresponding to the length of the sheet.

(Configuration of Operation Unit (Panel))

Figure 11:
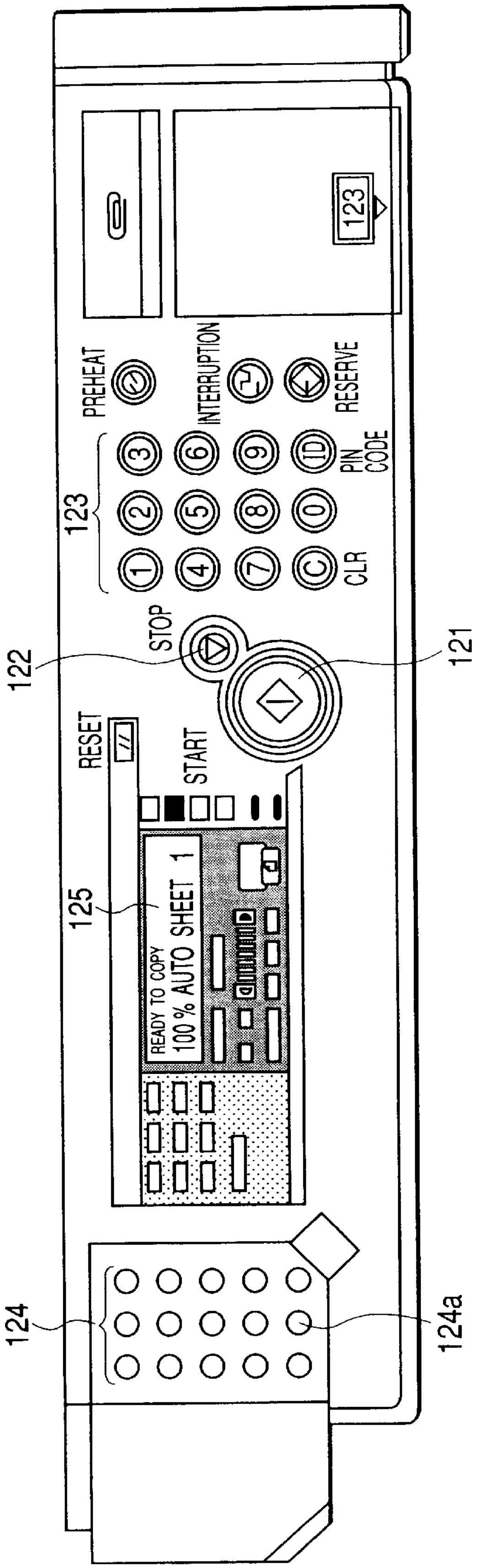
FIG. 11 is a view for explaining an operation unit.

FIG. 11 is a plan view for explaining the configuration of the operation unit 237 shown in FIG. 1.

In FIG. 11, numeral 121 denotes a start key which is depressed to start the image reading (including the copying operation). Numeral 122 denotes a stop key which is depressed to stop the copying operation being executing. Numeral 123 denotes numeric keys which are depressed to input numerals such as the number of copies and the like.

Numeral 124 denotes mode setting keys which are depressed to select the respective image formation modes, and numeral 124*a* denotes a cover sheet formation mode key which is depressed to perform the image formation in the cover sheet formation mode. Numeral 125 denotes a display unit which includes touch keys, displays the operation and setting states of the image processing apparatus, and displays the later-described screens shown in FIGS. 12, 13 and the like. In the present embodiment, it is assumed that the display unit 125 consists of a liquid crystal display having the touch keys.

Hereinafter, the setting screen displayed on the display unit 125 when the cover sheet formation mode key 124*a* of FIG. 11 is depressed will be explained with reference to FIGS. 12, 13 and the like.

Figure 12:
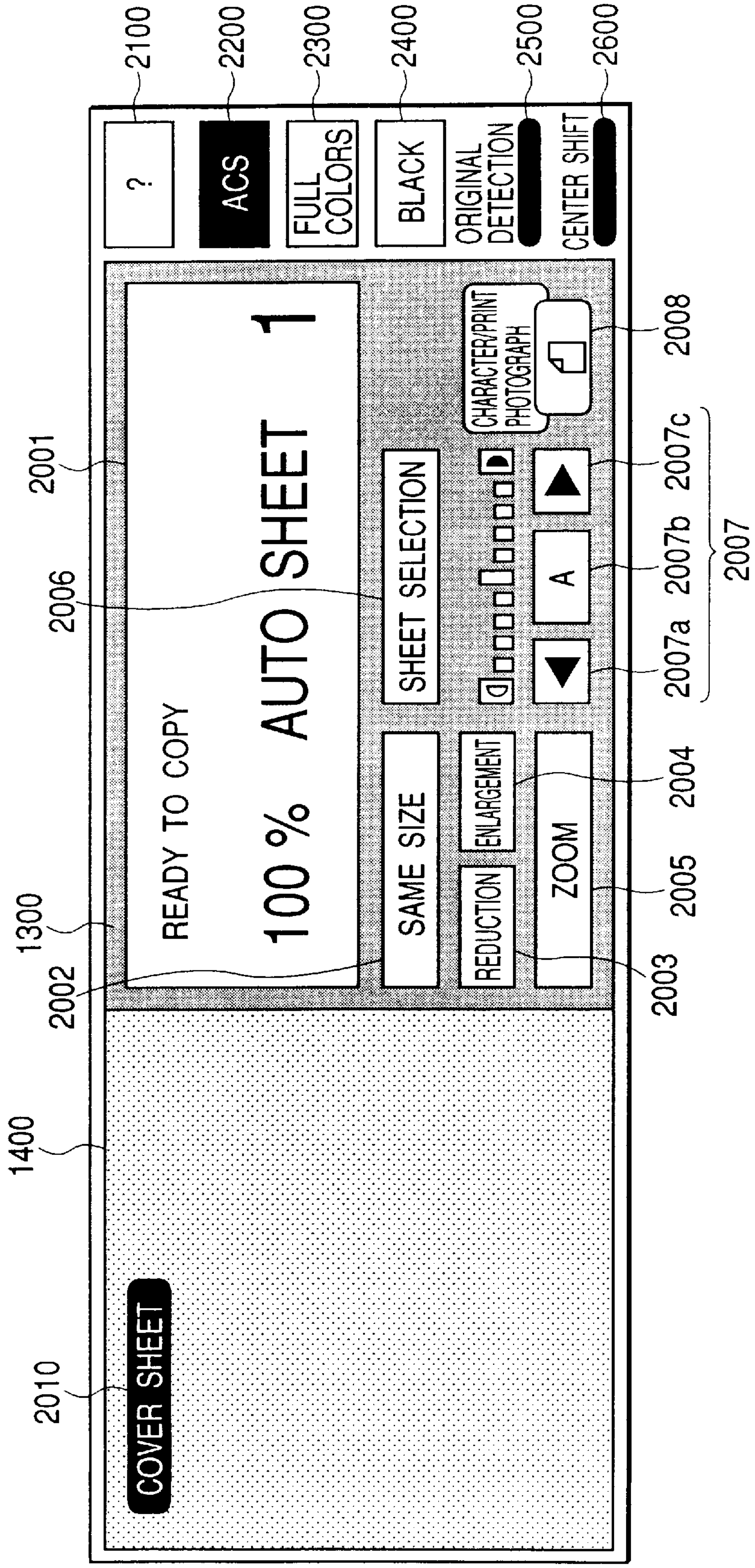
FIG. 12 is a view for explaining a screen displayed on a display unit.

FIG. 12 shows a cover sheet formation mode standby screen which is displayed on the display unit 125 when the cover sheet formation mode key 124*a* of FIG. 11 is depressed.

In FIG. 12, numeral 2001 denotes a situation display box which displays the situation of the image processing apparatus. Concretely, an operation situation, an error situation, copy magnifying power, a selected sheet size, the number of prints and the like are displayed on the situation display box 2001. Numeral 2002 denotes a same-size (or one-to-one) copying key which is depressed to copy the read original by same-size magnification.

Numeral 2003 denotes a reduction key which is depressed to reduce and copy the read original image, numeral 2004 denotes an enlargement key which is depressed to enlarge and copy the read original image. Numeral 2005 denotes a zoom key which is depressed to enlarge or reduce the read original image by arbitrary magnification, and numeral 2006 denotes a sheet selection key which is depressed to select the sheet onto which the printing is to be performed.

Numeral 2007 denotes a density selection key. Every time a key 2007*a* is depressed, the printing density gradually deepens, while every time a key 2007*c* is depressed, the printing density gradually heightens. Further, if a key 2007*b* is depressed, the printing density is automatically set. Numeral 2008 denotes a character/print photograph selection key which is depressed to select the kind of the original image to be read. If either of a document such as a text or an image such as a photograph is selected by depressing the key 2008, the printing is performed in a processing mode suitable for the selected original.

Numeral 2100 denotes a help key. If the user depresses the key 2100 when he can not know an operation procedure or the like, the situation display box 2001 displays the operation procedure, an operation method or the like. Numeral 2200 denotes an ACS (automatic color selection) key. If the key 2200 is depressed, the contents of the original are automatically discriminated, and thus a printing mode is automatically set to either of a full-color printing mode or a monochrome printing mode. Numeral 2300 denotes a full-color printing key which is depressed to perform the full-color printing, and numeral 2400 denotes a black printing key which is depressed to perform the monochrome printing.

Numeral 2500 denotes an original detection key which is depressed to detect the size of the original put on the original mounting board glass 201, or to detect the original put on a not-shown original feeder. Numeral 2600 denotes a center shift key which is depressed to print the original on the glass 201 to the center of the fed sheet.

Numeral 2010 denotes a mode display section which displays that the cover sheet formation mode is being set.

Figure 13:
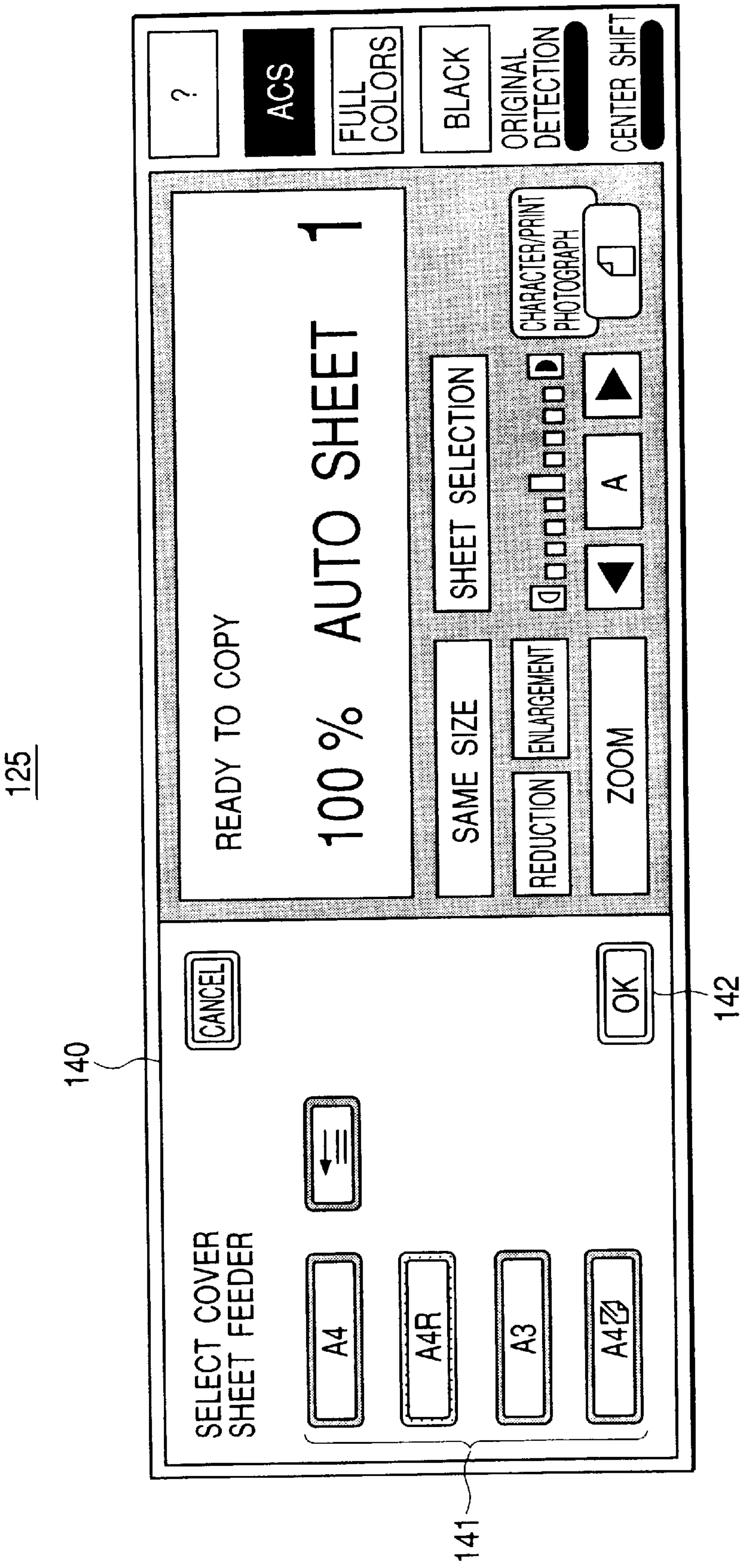
FIG. 13 is a view for explaining a screen displayed on the display unit.

FIG. 13 is a view for explaining an example of a feeder selection screen displayed on the display unit 125 of FIG. 11.

In FIG. 13, numeral 140 denotes the feeder selection screen for selecting the sheet to be used as the cover sheet. Numeral 141 denotes feeder selection keys which include an “A4” key, an “A4R” key, an “A3” key, an “OHP” key, a “manual feeder” key and the like. If any of the keys is touched or depressed, it is possible to select the feeder which holds therein the sheets the of which corresponds to the touched key. Numeral 142 denotes an OK key which is depressed to end the feeder selection. If there is no sheet in the displayed feeder, the key corresponding such the feeder is displayed thinly (i.e., low density) to set this feeder ineffective (e.g., the “A4R” key in FIG. 13).

Figure 14A:
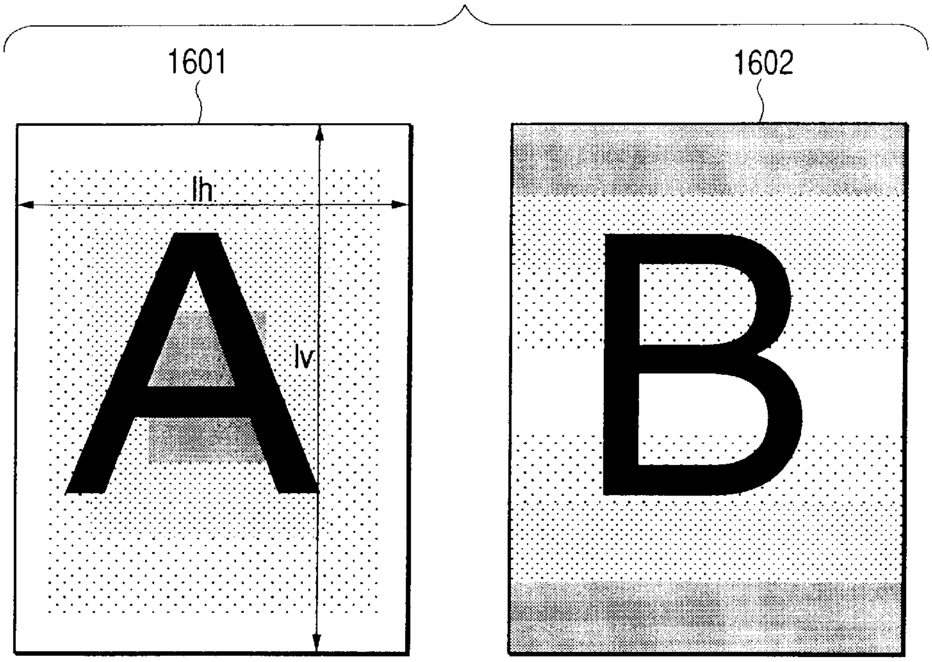
FIGS. 14A and 14B are views for explaining an example of a cover sheet formation mode in the embodiment.
Figure 14B:
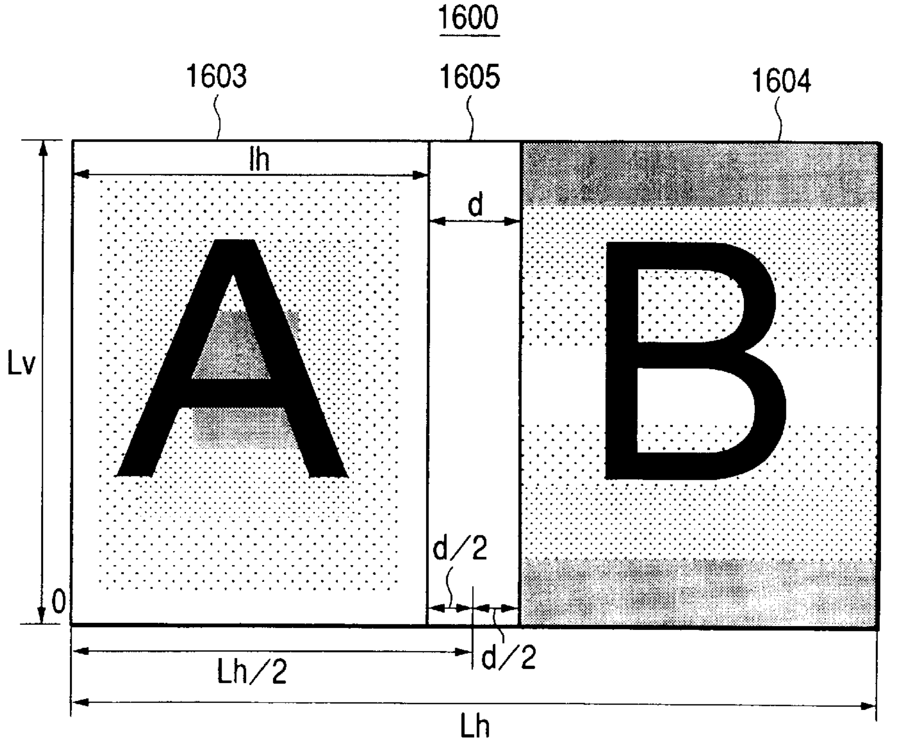

FIGS. 14A and 14B are views for explaining an example of the output result of the image processing apparatus 1000 in the present embodiment.

In FIG. 14A, numeral 1601 denotes an original for a front cover. The image to be formed in the front cover area of the formed cover sheet has been printed on the original 1601, and its size is “lh×lv”. Numeral 1602 denotes an original for a back cover. The image to be formed in the back cover area of the formed cover sheet has been printed on the original 1602, and its size is “lh×lv”.

FIG. 14B shows a cover sheet 1600 which is formed according to the flow chart (FIG. 15) of the processing in the cover sheet formation mode. The entire size of the cover sheet 1600 is “Lh×Lv”. Numeral 1603 denotes an area (i.e., front cover area) to which the image of the original 1601 for the front cover read based on the later-described processing is to be formed, and numeral 1604 denotes an area (i.e., back cover area) to which the image of the original 1602 for the back cover read based on the later-described processing is to be formed. Numeral 1605 denotes a backbone cover area which is secured based on a width d being the information obtained in the later-described processing. The backbone cover area 1605 isolates the front cover area 1603 and the back cover area 1604 from each other.

It should be noted that the sheet to be used as the cover sheet is manually or automatically selected in the later-described processing.

(Operation in Cover Sheet Formation Mode)

Hereinafter, the operation in the cover sheet formation mode in the present embodiment will be explained with reference to the flow chart shown in FIG. 15.

Figure 15:
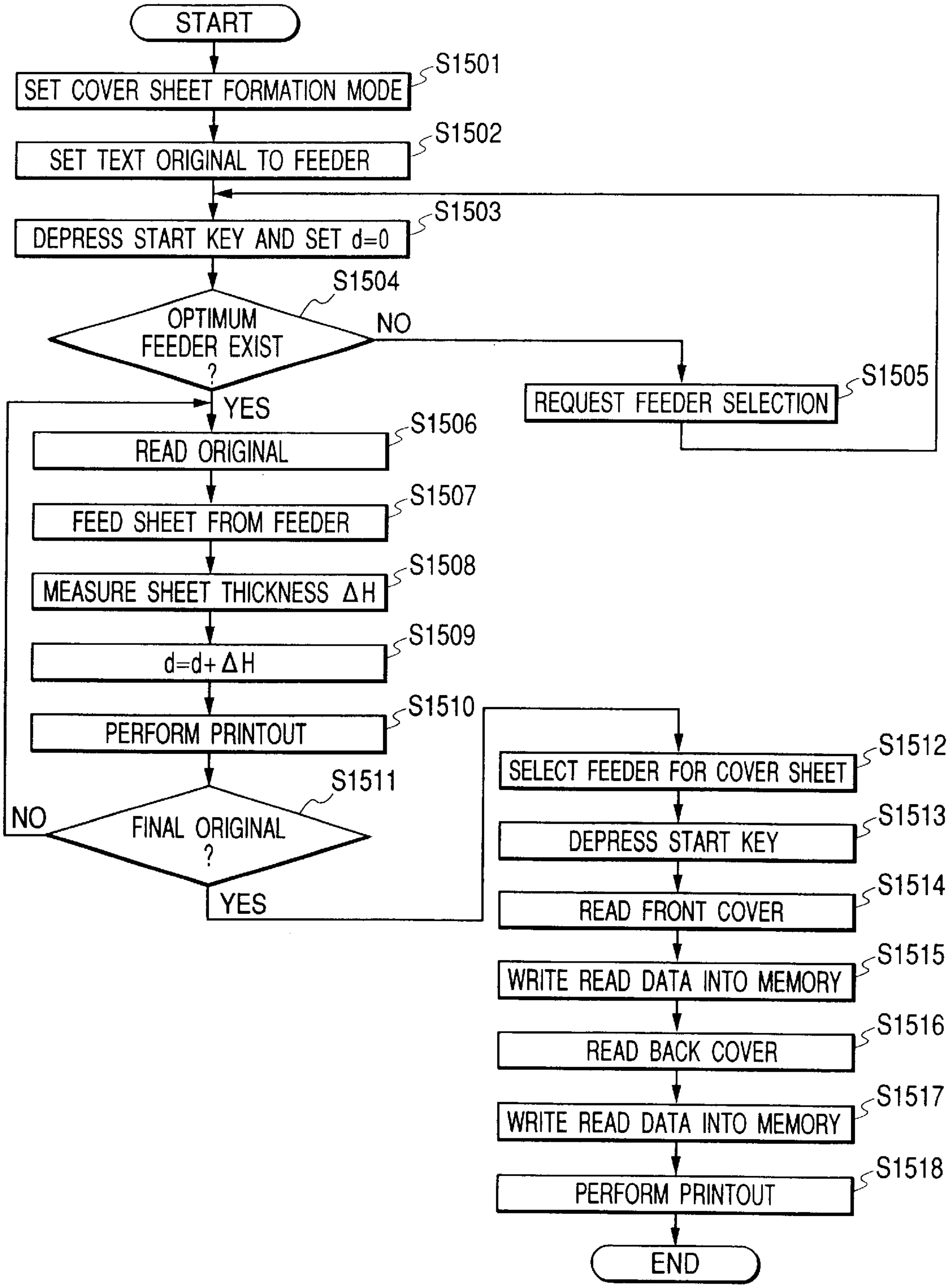
FIG. 15 is a flow chart for explaining an example of a first data processing procedure in the embodiment.

FIG. 15 is the flow chart for explaining an example of a first data processing procedure in the image processing apparatus of the present embodiment. It should be noted that this operation is performed by the CPU 321 on the basis of the control program stored in the ROM 322, and that numerals S1501, S1502, S1503, S1504, S1505, S1506, S1507, S1508, S1509, S1510, S1511, S1512, S1513, S1514, S1515, S1516, S1517 and S1518 denote respective steps.

First, an operator sets an image formation operation mode by using the operation unit 237 shown in FIG. 11 (S1501). In this case, the cover sheet formation mode key 124*a* is selected from among the mode setting keys 124. If the cover sheet setting mode is set, the screen of the display unit 125 is changed to the cover sheet formation mode standby screen shown in FIG. 12. The screen of FIG. 12 represents that the cover sheet formation mode has been set.

Next, the operator sets the originals (i.e., a sheaf of the plural originals) being the text (i.e., contents) to a not-shown feeder (i.e., automatic original feeder) (S1502). If the start key 121 is depressed by the operator, the image processing apparatus 1000 leads there one of the originals set in the feeder, disposes it at the reading position on the original mounting board glass 201, and set the value of the information d concerning the backbone cover width (corresponding to the thickness of the text original) to “d=0” (S1503). The obtained information is set into the memory 309.

Next, when the original is fed from the feeder, its size is detected. If the user does not previously select the feeder by the operation unit 237, the optimum feeder to form the images of the text original is automatically selected from among the cassettes 229, 230 and the like on the basis of the detected original size. Then it is judged whether or not the feeder suitable for the detected original size exist (S1504). If judged that the optimum feeder does not exist, the operator is requested through the screen 125 to select the feeder (S1505), and the flow returns to the step S1503 to wait for the operator’s instruction.

If judged in the step S1504 by the operator’s instruction or the automatic selection that the optimum feeder exists, the original disposed at the predetermined position on the original mounting board glass 201 is scanned (S1506), and sheet feeding from the designated feeder starts (S1507). At this time, the thickness ΔH of the sheet fed from the feeder is measured by a sheet thickness sensor 233*a* shown in FIG. 1 (S1508). The value of the information concerning the backbone cover width, i.e., the value of the information d concerning the thickness of the sheaf of the plural sheets (text original), is set to “d=d+ΔH” (S1509), the original image read in the step S1506 is output, and the output image is subjected to the image formation processing by the printer unit (S1510). Then it is judged whether or not the original image output in the step S1510 corresponds to the final original in one job (S1511). If judged that the output image does not correspond to the final original, the flow returns to the step S1506. Conversely, if judged that the output original corresponds to the final original, the flow advances to the S1512.

If the image processing apparatus 1000 forms the image onto the sheet and discharges outside the sheet onto the discharge tray 236, then the apparatus 1000 leads there the subsequent original from the feeder onto the original mounting board glass 201 and performs the image data reading processing to the led original. Then, the apparatus 1000 starts feeding the sheet onto which the read image is to be formed. At this time, similarly, the thickness ΔH of the sheet is detected by the sheet thickness sensor 233*a,* and the detected value ΔH is added to the result of the previous detection. The sum of the detected values is given as d and again set to the memory. This operation is repeated until the original in the feeder is exhausted, and the sum of the detected sheet thickness values is stored as the backbone cover width d into the memory 309.

Next, if the reading processing to the text original ends, the screen of the display unit 125 is changed to the feeder selection screen shown in FIG. 13. Thus, by using the feeder selection keys 141 on the feeder selection screen, the operator designates the feeder (e.g., the manual feeding tray 232) which holds therein the sheet to be used as the cover sheet (S1512).

Then the operator sets the original (e.g., the original 1601 of FIG. 14A) for the front cover and the original (e.g., the original 1602 of FIG. 14A) for the back cover to the not-shown feeder and depresses the start key 121 (S1513). Thus, the image processing apparatus 1000 leads the original for the front cover from the feeder onto the original mounting board glass 201 and detects the size of the led original. Further, the CPU 321 of FIGS. 2A and 2B sets the start value of the writing address to the two registers WR0 and WR1 of the writing counter 502 in the address controller 318.

Here, it will be explained such the case as shown in FIGS. 14A and 14B where the detected original size for the front cover is "lh×lv", the sheet size for the cover sheet held in the feeder designated by the operator is "Lh×Lv", and the data corresponding to the backbone cover width calculated based on the result of the sheet thickness detection is d.

In the present embodiment, since the image data input/output to/from the image memory 309 is performed in the unit of 4×4 pixels, the value of ¼ of the pixel corresponding to "Lh/2−d/2−lh" is set to the register WR0 as the writing address start value of the image of the original 1601 for the front cover. Further, the value of ¼ of the pixel corresponding to "Lh/2+d/2" is set to the register WR1 as the writing address start value of the image of the original 1602 for the back cover. Similarly, the headmost address "0000h" of the image memory 309 is set to the registers WR0 and WR1 of the Y (reading) counters 503, 504, 505 and 506 of the sub-scan address generation unit (YCOUNTER) 424.

Next, the signal of level "L" is transferred from the CPU 321 to the F/F 603 in the address controller 318 to preset the F/F 603. Thus, the output of the F/F 603 is "L", and the image on the original 1601 for the front cover is read (S1514). At the instant that the writing sub-scan interval signal WPE becomes "H", the value of register output WR0 is loaded to the address counter 607, and the original image for the front cover is written at the predetermined position on the image memory 309 (S1515).

After the image of the original 1601 for the front cover is read, the original 1602 for the back cover is led onto the original mounting board glass 201, and the image reading processing to the original 1602 starts (S1516). At the instant that F/F 603 becomes "H", the value of the register output WR1 is loaded to the 13-bit counter 607. Thus, the image of the original 1602 for the back cover is written at the predetermined position on the image memory 309 (S1517).

If the reading of the images of the originals for the front and back covers ends, the reading interval signal is set to be output to the printer unit. The sub-scan interval signal for each color transferred from the printer unit is the signal which is "H" during the length of the sheet size as shown in FIG. 10.

If the setting of the interval signal ends, the CPU 321 notifies the printer unit of the printable state, the printing to the recording sheet starts (S1518), and the processing ends.

By such the controlling as above, as shown in FIG. 14B, the image for the front cover and the image for the back cover are arranged on the image memory 309 at the interval corresponding to the width d of the backbone cover (i.e., corresponding to the thickness of the text original). Then the images arranged in such a manner are output as one image to the printer unit, and subjected to the image formation, thereby forming the cover sheet.

As described above, in the present embodiment, in order to easily form the cover sheet for interposing the text original, the thickness ΔH of the sheet onto which the image of the fed text original is formed is detected when the text original is copied, and the value ΔH is accumulated until the image formation processing of one job ends, whereby the total thickness d of the text original is automatically calculated. Then the calculated value d is stored into the image memory 309. The original 1601 for the front cover and the original 1602 for the back cover are sequentially read by the image input device (i.e., the image scanner), and the read originals 1601 and 1602 are arranged on the image memory 309. At this time, these originals (i.e., images) are arranged and stored in the image memory 309 at the interval corresponding to the calculated width d of the text original. Then the stored images are output as one image data to the printer unit. The printer unit forms the image based on the data output from the image processing circuit unit 212, onto the sheet.

Figure 26A:
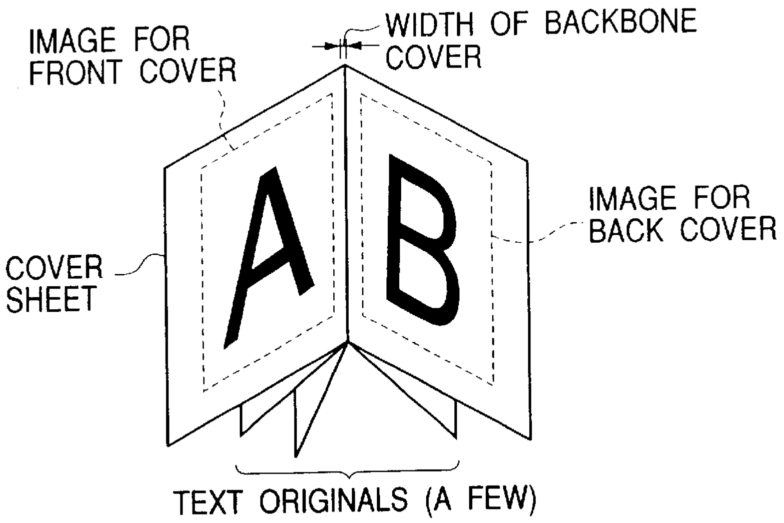
FIGS. 26A, 26B and 26C are views for explaining an example of states that text originals are interposed or sandwiched in a cover sheet.
Figure 26B:
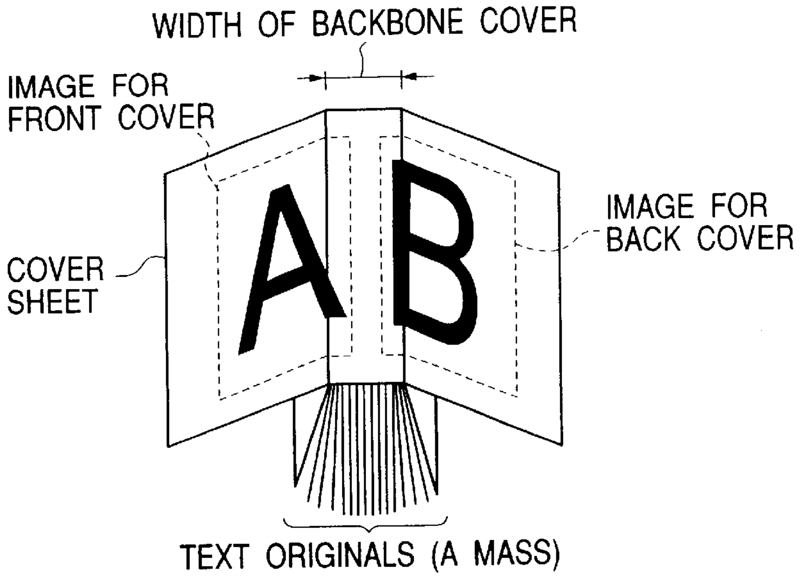
Figure 26C:
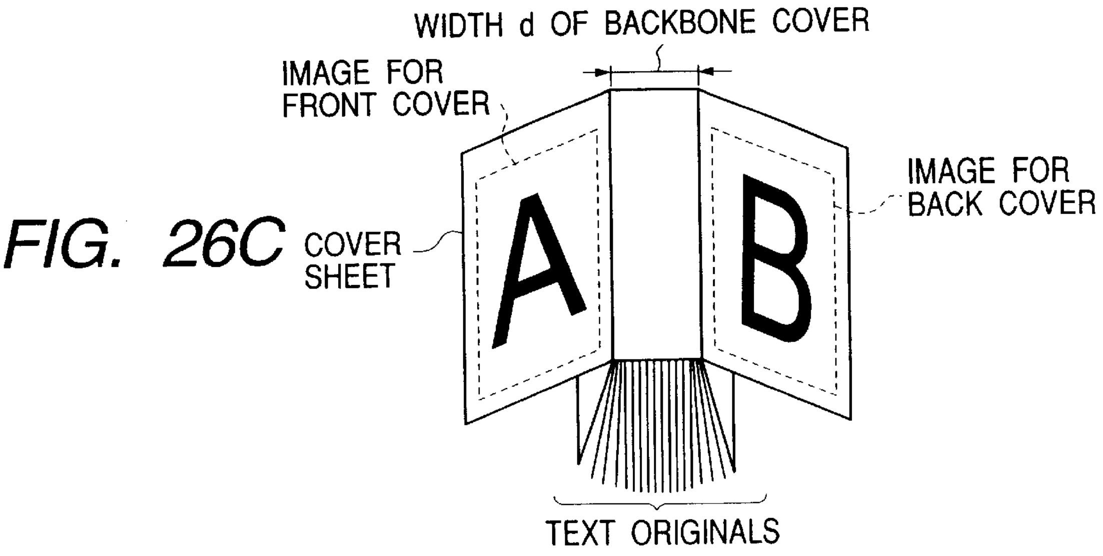

FIG. 26C shows a state that the output result of the text original is interposed in the cover sheet subjected to the image formation based on the cover sheet formation mode in the present embodiment.

As described above, according to the present embodiment, when bookbinding processing is performed, it is possible to eliminate the conventional drawback that the images for the cover sheet intrude into the backbone area which is essentially used as a binding/sizing part, whereby it is possible to quickly and accurately secure the part corresponding to the backbone cover. Thus, it is possible to easily form the cover sheet without burdening the user.

[Second Embodiment]

Next, the second embodiment will be explained. In the first embodiment which was explained with reference to the flow chart of the first data processing procedure shown in FIG. 15, the value d corresponding to the text original thickness (i.e., backbone cover width) is automatically calculated by the image processing apparatus 1000. However, such the value d may be set by the user in such a manner as explained later. It should be noted that, although FIGS. 1 to 11 are used for the explanation of the second embodiment, the explanation of FIGS. 1 to 11 themselves will be omitted to eliminate redundancies.

Figure 16:
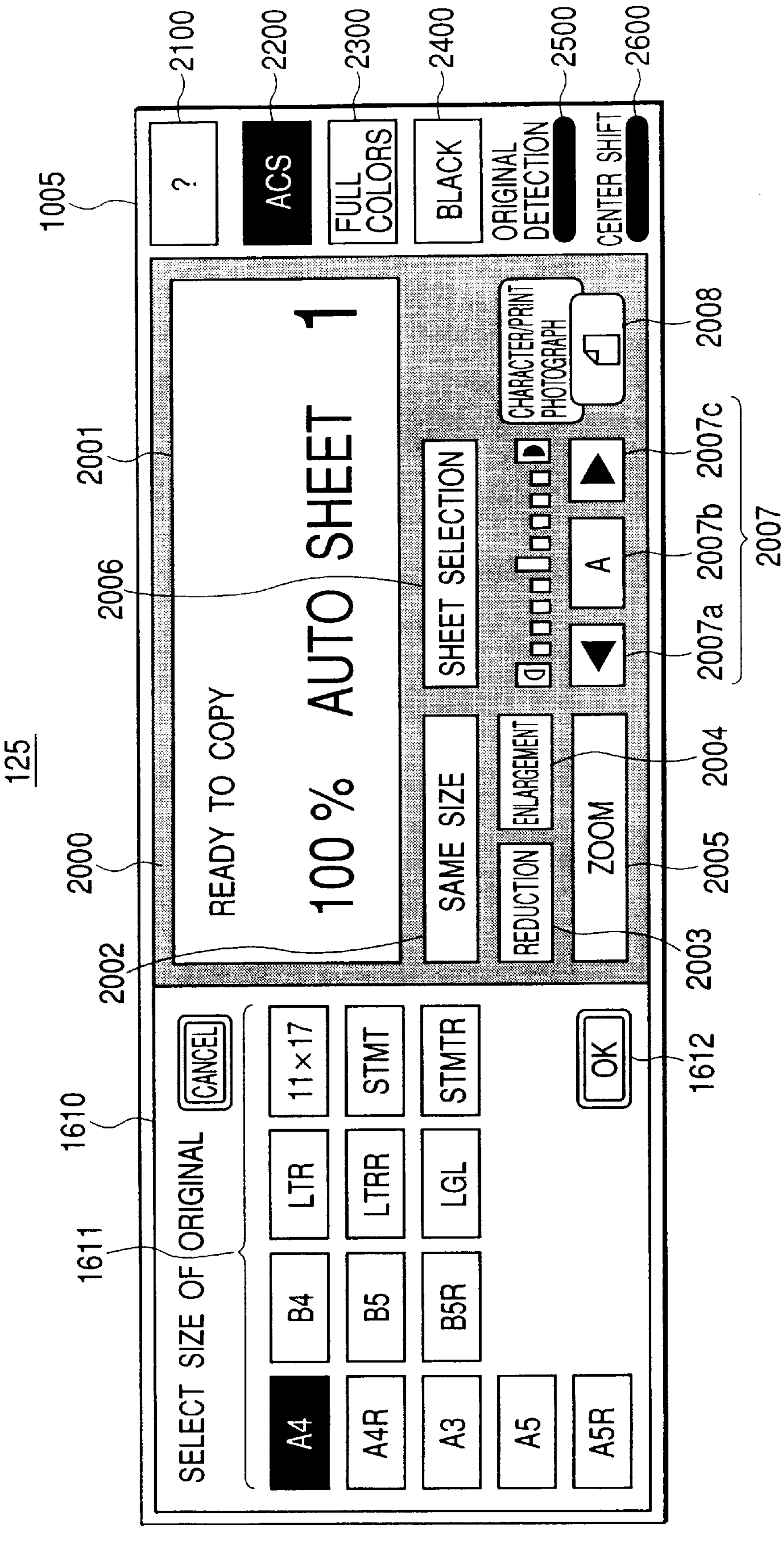
FIG. 16 is a view for explaining a screen displayed on the display unit.

FIG. 16 shows an original size setting screen 1610 to be displayed on the display unit 125. If the user selects and depresses the cover sheet formation mode key 124*a* from among the mode setting keys 124 displayed on the operation unit 237 of FIG. 11, the original size setting screen 1610 is displayed.

The original size setting screen 1610 is used when the user inputs the size of the original to be read. In FIG. 16, numeral 1611 denotes original size selection keys which include an "A4" key, an "A4R" key, an "A3" key, an "A5" key, an "A5R" key, a "B4" key, a "B5" key, a "B5R" key, an "LTR" key, an "LTRR" size, an "LGL" key, a "11×17" key, a "STMT" key, a "STMTR" key and the like. If any of the keys is touched or depressed, the selected key is inversely displayed. In FIG. 16, the "A4" key is selected and thus inversely displayed. Numeral 1612 denotes an OK key which is depressed to end the original size selection. It should be noted that, since other keys on the screen 1610 are respectively the same as those shown in FIG. 12, the explanation thereof will be omitted. Incidentally, it may be structured to be able to select an arbitrary size (a longitudinal size or a lateral size) with use of the numeric keys 123 instead of the original size selection keys 1611.

Unlike the first embodiment, when the OK key 1612 on the screen 1610 is depressed by the user, the feeder selection screen 140 shown in FIG. 13 is displayed on the operation unit 125 in the present embodiment.

Figure 17:
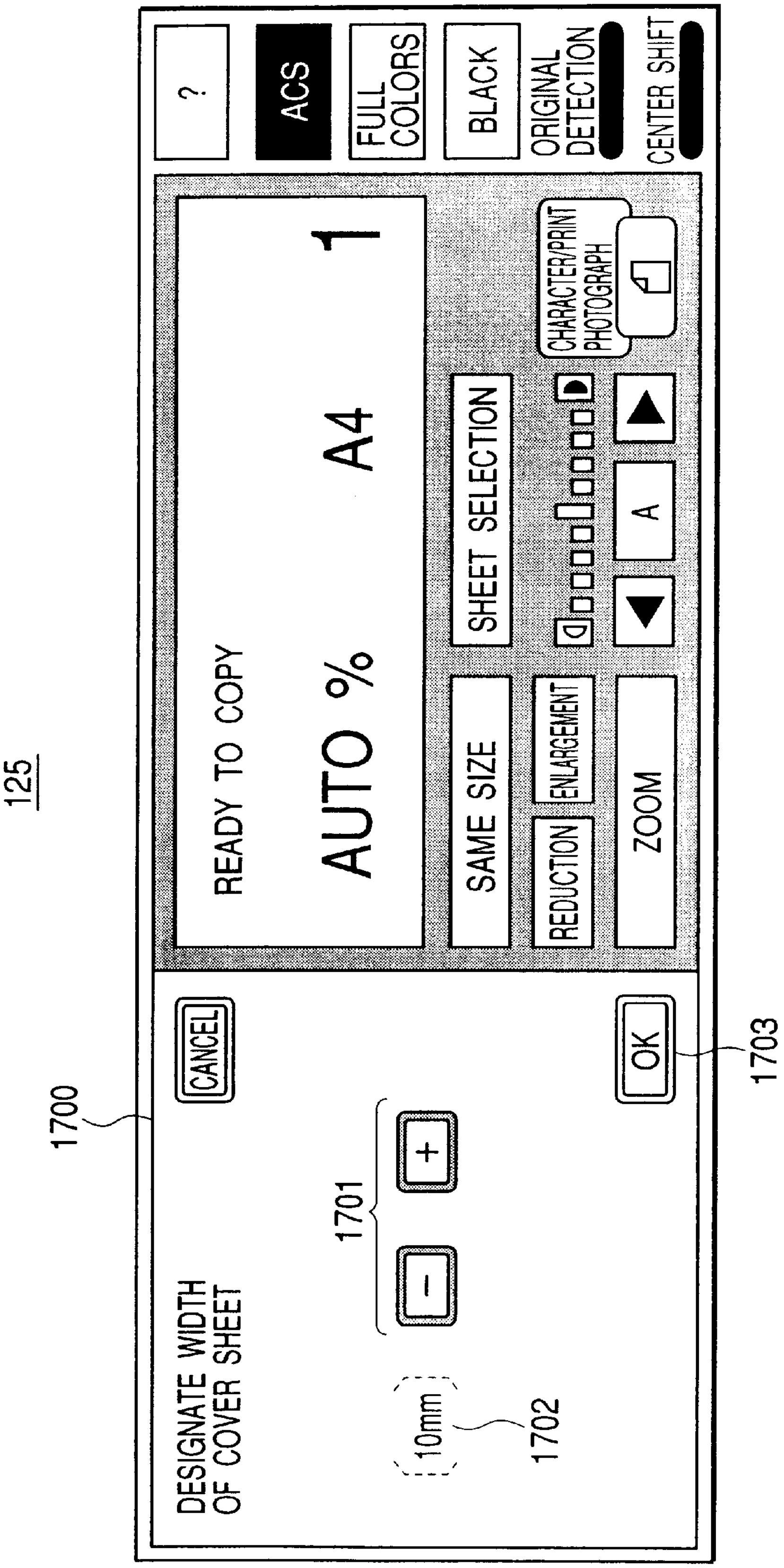
FIG. 17 is a view for explaining a screen displayed on the display unit.

FIG. 17 shows a backbone cover width input screen 1700 displayed on the display unit 125. When either of the feeder selection keys 141 is selected on the feeder selection screen 140 of FIG. 13 and then the OK key 142 is depressed by the user, the backbone cover width input screen 1700 is displayed. In the present embodiment, it is assumed that the "A4" key is selected by the user on the screen 140.

In the present embodiment, as described above, the contents to be displayed on the display unit 125 are changed from the screen 1610 of FIG. 16, the screen 140 of FIG. 13 and the screen 1700 of FIG. 17 in that order by depressing the cover sheet formation mode key 124*a* of FIG. 11.

In FIG. 17, numeral 1700 denotes the backbone cover width input screen. Numerals 1701 denote backbone cover width input keys which are used by the user to input the value d corresponding to the text original thickness (i.e., backbone cover width). Concretely, if the "−" key is depressed, the value d corresponding to the backbone cover width displayed on a backbone cover width display section 1702 decreases by a predetermined quantity, while if the "+" key is depressed, the value d increases by a predetermined quantity. In the backbone cover width display section 1702, an initial value which is based on data stored in the ROM 322, the image memory 309 or an NVRAM (nonvolatile RAM) is displayed as a default value. Incidentally, the initial value may be freely set by the operation unit 237. Numeral 1703 denotes an OK key which is depressed by the user to end the input of the value d corresponding to the backbone cover width.

Figure 18:
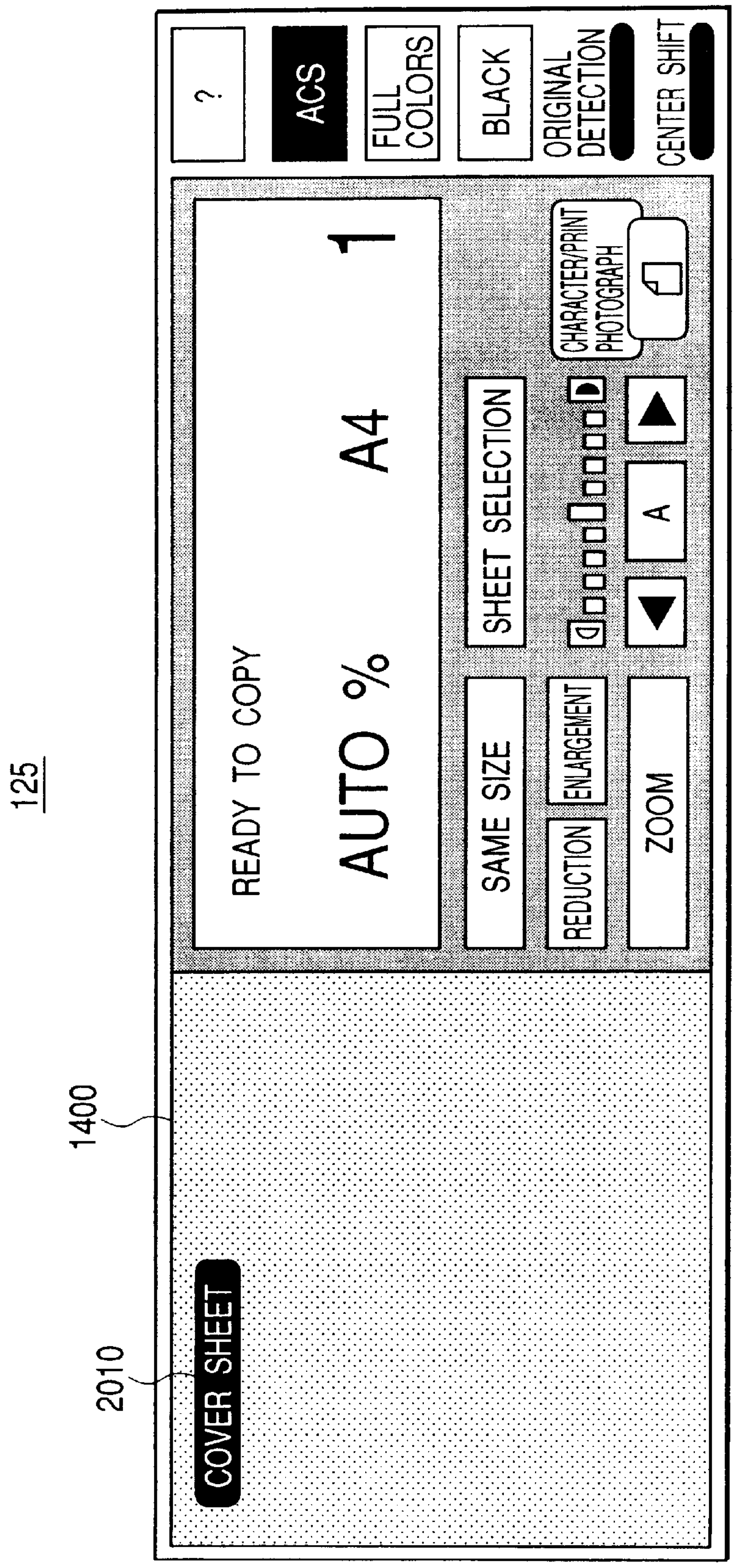
FIG. 18 is a view for explaining a screen displayed on the display unit.

FIG. 18 shows the cover sheet formation mode standby screen displayed on the display unit 125. In the present embodiment, when the OK key 1703 on the screen 1700 shown in FIG. 17 is depressed by the user, if at least the two or more originals are set in the not-shown feeder (the automatic original feeder) at that time, the cover sheet formation mode standby screen is displayed. In this case, it is assumed that the number of originals in the feeder is detected by a not-shown sensor.

In FIG. 18, numeral 1400 denotes a cover sheet formation mode standby screen, and numeral 2010 denotes a mode display section. In this case, the mode display section 2010 displays that the cover sheet formation mode is being set. While the screen 1400 is displayed on the display unit 125, if the start key 121 is depressed by the user, the image formation processing in the cover sheet formation mode is performed by the image processing apparatus 1000 on the basis of the values set by the user on the screens 1610, 140 and 1700.

Figure 19:
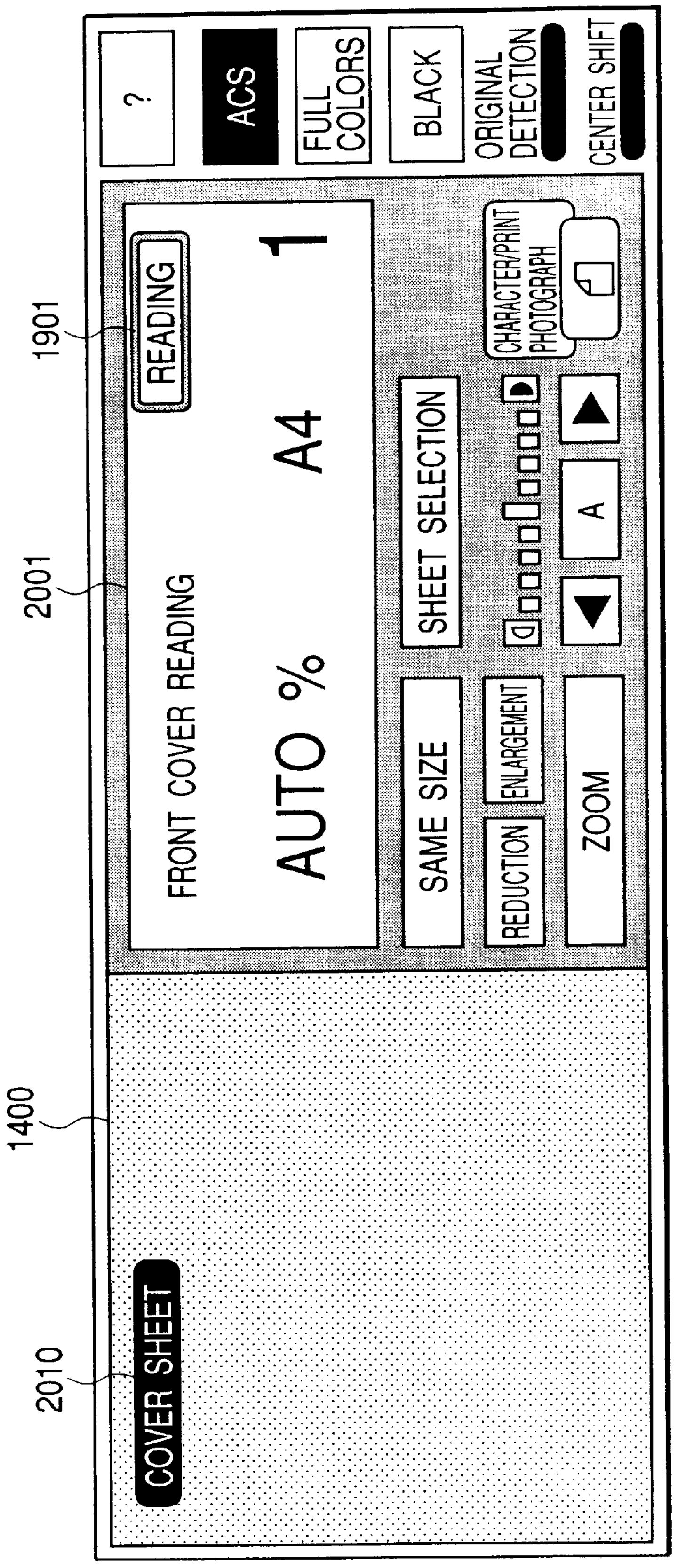
FIG. 19 is a view for explaining a screen displayed on the display unit.

Conversely, when the OK key 1703 on the screen 1700 of FIG. 17 is depressed by the user, if any original is not set to the not-shown feeder (the automatic original feeder) or on the original mounting board glass 201, the screen shown in FIG. 18 is not displayed, but the screen shown in FIG. 19 is displayed as the cover sheet formation mode standby screen. Incidentally, in FIG. 18, the elements which are the same as those shown in FIG. 12 are added with the same names, symbols and numerals, respectively.

In FIG. 19, numeral 1901 denotes a reading key which is depressed by the user after the original is set onto the original mounting board glass 201 or the not-shown feeder. If the reading key 1901 is depressed by the user, the image reading processing to the set original for the front cover (e.g., the original 1601 shown in FIG. 14A) starts. Incidentally, in FIG. 19, the message "front cover reading" being the current operation situation is displayed within the situation display box 2001.

Figure 20:
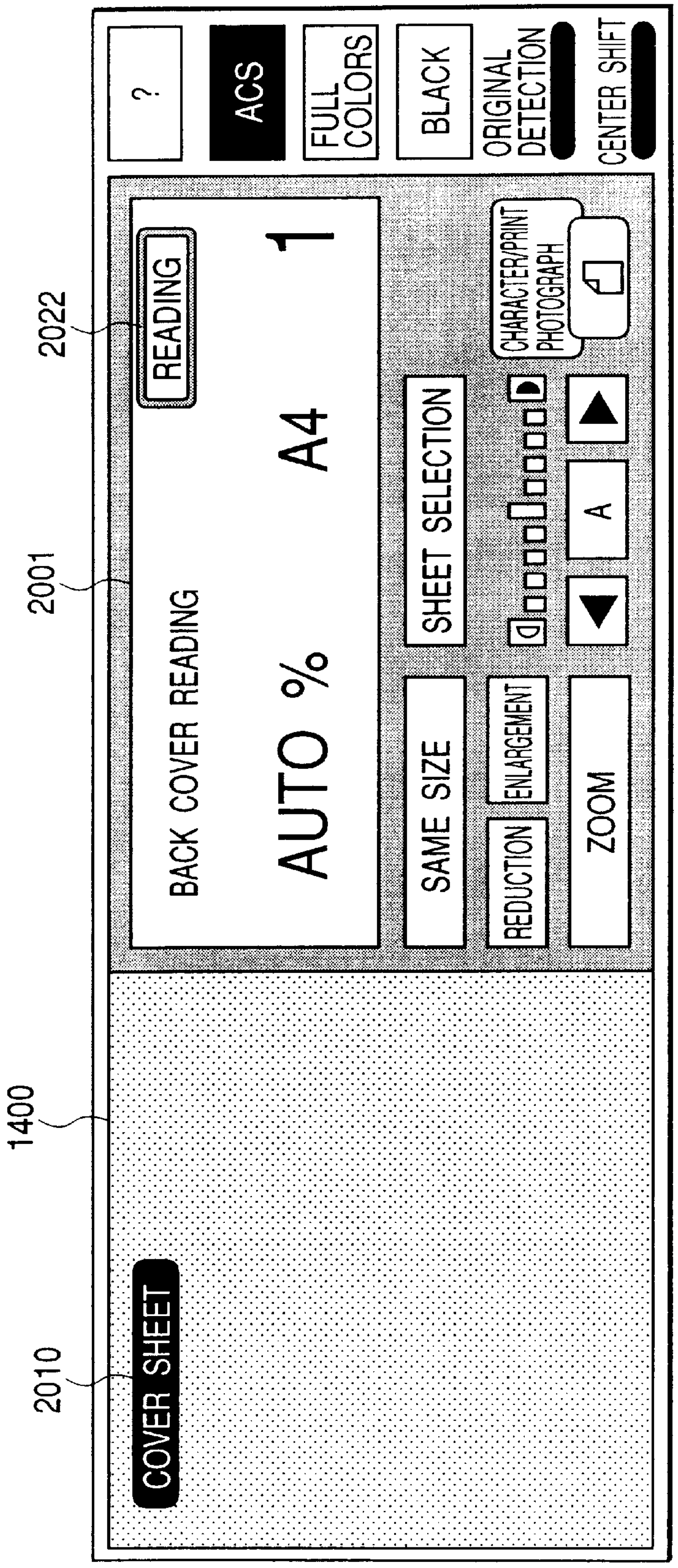
FIG. 20 is a view for explaining a screen displayed on the display unit.

FIG. 20 shows one of the cover sheet formation mode standby screens to be displayed on the display unit 125. If the reading key 1901 is depressed by the user and the image of the original for the front cover (e.g., the original 1601 shown in FIG. 14A) is stored into the image memory 309, the cover sheet formation mode standby screen is displayed. Incidentally, in FIG. 20, the elements which are the same as those shown in FIGS. 12, 18 and 19 are added with the same names, symbols and numerals, respectively.

In FIG. 20, numeral 2202 denotes a reading key which is depressed by the user after the original is set onto the original mounting board glass 201 or the not-shown feeder. If the reading key 2202 is depressed by the user, the image reading processing to the set original for the back cover (e.g., the original 1602 shown in FIG. 14A) starts. Incidentally, in FIG. 20, the message "back cover reading" being the current operation situation is displayed within the situation display box 2001.

Next, an example of the image output result in the cover sheet formation mode according to the present embodiment will be explained with reference to FIG. 14B. In this example, it is assumed that the setting is performed to print the images of the two originals (i.e., the original 1601 for the front cover and the original 1602 for the back cover) each having the size "lh×lv" onto the sheet (i.e., the cover sheet) having the size "Lh×Lv" at the interval corresponding to the backbone cover width "d". Especially, the case where "lv=Lv" and "lh×2+d=Lh" are established will be explained.

In FIG. 14B, numeral 1600 denotes the cover sheet. Numeral 1603 denotes the area to which the image of the original 1601 for the front cover is to be formed. The image of the original 1601 for the front cover has been printed at the area 1603 with the size "lh×Lv". Numeral 1604 denotes the area to which the image of the original 1602 for the back cover is to be formed. The image of the original 1602 for the back cover has been printed at the area 1602 with the size "lh×Lv". Since "lv=Lv" and "lh×2+d=Lh" are established in this case, these two images have been printed within the cover sheet without overreaching the respective areas.

Numeral 1605 denotes the backbone cover area which is secured based on the width d being the information obtained by the input operation of the key 1701 with the user. The backbone cover area 1605 isolates the front cover area 1603 and the back cover area 1604 from each other, whereby any image is not formed in the area 1605. The backbone cover area 1605 is secured within the range of ±d/2 from the center part (rightward from the point O of FIG. 14B by "Lh/2") of the cover sheet 1600. As above, if the image formation processing is performed in the cover sheet formation mode according to the present embodiment, the backbone cover area 1605 corresponding to the width d designated by the user is secured at the center part of the cover sheet 1600, and the original image for the front cover and the original image for the back cover are arranged astride the backbone cover area 1605.

As above, only by designating the width (i.e., the image interval) of the backbone cover, it is possible to form the cover sheet on which the backbone cover area corresponding to the designated width is secured at the center part of the output result, without burdening the user.

(Operation of Cover Sheet Formation Mode)

Hereinafter, the processing procedure of the cover sheet formation mode in the present embodiment will be explained with reference to the flow chart shown in FIG. 21.

Figure 21:
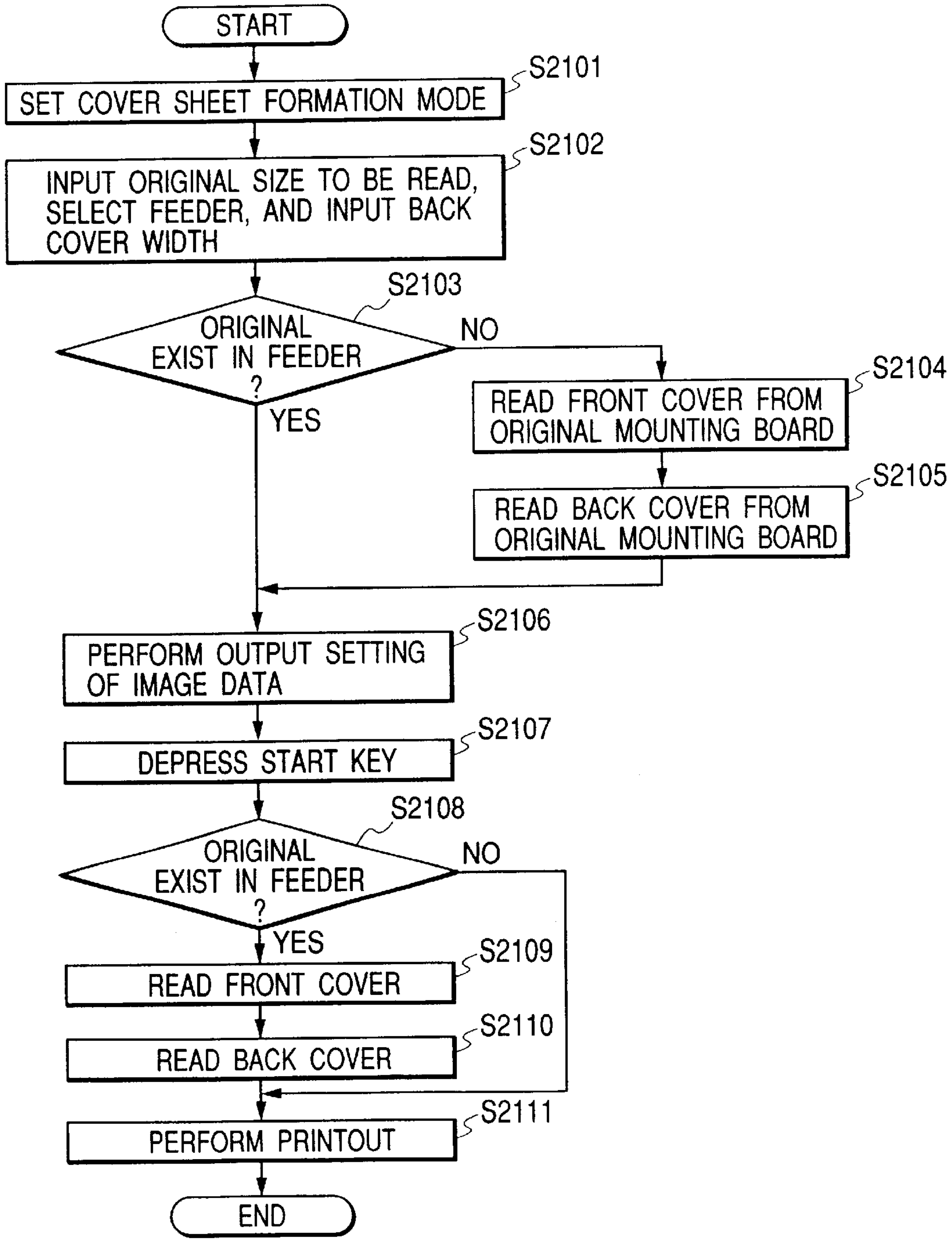
FIG. 21 is a flow chart for explaining an example of a second data processing procedure in the embodiment.

FIG. 21 is the flow chart for explaining an example of a second data processing procedure in the image processing apparatus 1000 of the present embodiment. It should be noted that this operation is performed by the CPU 321 of FIGS. 2A and 2B on the basis of the control program stored in the ROM 322, and that numerals S2101, S2102, S2103, S2104, S2105, S2106, S2107, S2108, S2109, S2110 and S2111 denote respective steps.

First, the operator sets the image formation operation mode by using the operation unit 237 shown in FIG. 11 (S2101). In this case, the cover sheet formation mode key 124*a* is selected from among the mode setting keys 124.

If the cover sheet formation mode is selected in the step S2101, the screen on the display unit 125 is changed to the original size setting screen 1610 shown in FIG. 16 to request the operator to input the size of the original (i.e., the original 1601 for the front cover and the original 1602 for the back cover shown in FIG. 14A) on which the image to be formed onto the cover sheet has been printed. On the screen 1610, if the key corresponding to the size of the original for the front cover (or the size of the original for the back cover) is selected by the operator from among the original size selection keys 1611 and then the OK key 1612 is depressed, the screen on the display unit 125 is changed to the feeder selection screen 140 shown in FIG. 13. On the screen 140, if the feeder (e.g., the manual feeding tray 232) which holds therein the sheet to be used as the cover sheet is selected and designated by the operator with use of the feeder selection keys 141 and then the OK key 142 is depressed, the screen on the display unit 125 is changed to the backbone cover width input screen 1700. If the backbone cover width input keys 1701 are handled by the operator on the screen 1700 to set the backbone cover width (corresponding to the thickness of the text original, i.e., interval between the image for the front cover and the image for the back cover) and the OK key 1703 is depressed (S2102), it is judged whether or not the original has been set to the not-shown feeder (S2103).

The operator can select one of two methods to read the originals for the front cover and back cover, i.e., one to read the originals from the not-shown feeder and the other to read the originals from the original mounting board glass 201. If at least the two or more originals for the front and back covers have been set to the feeder by the operator, the screen on the display unit 125 is changed from the screen 1700 to the cover sheet formation mode standby screen shown in FIG. 18 to set the standby state. Namely, if it is judged in the step S2103 that the original exists in the feeder, the flow advances to the step S2106.

Conversely, if it is judged in the step S2103 that the original is not set in the feeder, the image processing apparatus 1000 considers that the original is read from the original mounting board glass 201, and the flow advances to the step S2104. Thus, the screen on the display unit 125 is changed from the screen 1700 to the front cover original reading screen shown in FIG. 19. On the front cover original reading screen, the cover sheet formation mode standby state is displayed, and the message "front cover reading" and the reading key 1901 are displayed within the situation display box 2001. If the original for the front cover is set onto the original mounting board glass 201 and the reading key 1901 is depressed by the operator, the CPU 321 sets the start value of the writing address to the registers WR0 and WR1 of the writing counter (Y counter) 502 in the address controller 318.

Hereinafter, in the step S2102, it will be explained the case where the size of each of the two originals (i.e., the original for the front cover and the original for the back cover) set by the user on the original size setting screen 1610 of FIG. 16 is assumed "lh×lv", the size of the cover sheet set by the user with the feeder selection key 141 on the feeder selection screen 140 of FIG. 13 is assumed "Lh×Lv", and the backbone cover width set by the user with the backbone cover width input keys 1701 on the screen 1700 of FIG. 17 is assumed "d", by way of example.

In the present embodiment, the image data input/output to/from the image memory 309 is performed in the unit of 4×4 pixels. The value of ¼ of the pixel corresponding to "Lh/2−d/2−lh" is set to the register WR0 as the writing address start value of the image of the original 1601 for the front cover. Further, the value of ¼ of the pixel corresponding to "Lh/2+d/2" is set to the register WR1 as the writing address start value of the image of the original 1602 for the back cover. Similarly, the headmost address "0000h" of the image memory 309 is set to the registers WR0 and WR1 of the Y (reading) counters 503, 504, 505 and 506 of the sub-scan address generation unit (YCOUNTER) 424.

Next, the signal of level "L" is transferred from the CPU 321 to the F/F 603 in the address controller 318 to preset the F/F 603. Thus, the output of the F/F 603 is "L", and the image on the original 1601 for the front cover is read. At the instant that the writing sub-scan interval signal WPE becomes "H", the value of register output WR0 is loaded to the address counter 607, and the original image for the front cover is written at the predetermined position on the image memory 309 (S2104).

If the image reading processing to the original 1601 for the front cover ends, the screen on the display unit 125 is changed from the front cover original reading screen shown in FIG. 19 to the back cover original reading screen shown in FIG. 20. On the back cover original reading screen, the cover sheet formation mode standby state is displayed, and the message "back cover reading" and the reading key 2022 are displayed within the situation display box 2001. If the original 1602 for the back cover is set onto the original mounting board glass 201 and the reading key 2022 is depressed by the operator, the image reading processing to the original 1602 starts. At the instant that F/F 603 becomes "H", the value of the register output WR1 is loaded to the 13-bit counter 607. Thus, the image of the original 1602 for the back cover is written at the predetermined position on the image memory 309 (S2105).

If it is judged in the step S2103 that the original has been set in the not-shown feeder, the original image for the front cover and the original image for the back cover are stored into the image memory 309 in the same manner as above according as the start key 121 is depressed by the user. This processing will be later explained in detail in the steps S2109 and S2110.

If the original image reading ends in the steps S2104 and S2105, or if judged in the step S2103 that the original has been set in the not-shown feeder, then the signals MPE1, CPE1, YPE1 and KPE1 being the reading interval signals to control the output (i.e., reading) of the image data stored in the image memory 309 are set to the printer unit (S2106), and the flow waits for the depression of the start key 121 by the operator on the operation unit 237 (S2107).

Then it is judged whether or not the original has been set in the not-shown feeder (S2108). If judged that the original is not set, the flow advances to the step S2111, while if judged that the original has been set, the original for the front cover is fed from the feeder to the original mounting board glass 201. Like the step S2104, the image of the original for the front cover is read, the read image data is stored into the image memory 309, and the original for the front cover is discharged from the original mounting board glass 201 (S2109). Next, the original for the back cover is fed from the not-shown feeder onto the original mounting board glass 201. Like the step S2105, the image of the original for the back cover is read, the read image data is stored into the image memory 309, and the original for the back cover is discharged from the original mounting board glass 201 (S2110).

If the setting of the interval signals, the original image reading processing and the original image storing processing end, the CPU 321 notifies the printer unit of the printable state, the printer unit performs the image printing to the sheet acting as the cover sheet onto which the images are to be formed (S2111), and the processing ends.

By such the controlling as above, when the plural images to be formed on the cover sheet are stored into the image memory 309 on the basis of the data obtained by the operator's setting, i.e., the data concerning the size of the original to be input (i.e., the size of the image to be stored into the image memory 309), the data concerning the size of the sheet onto which the image is to be formed, and the data concerning the backbone cover width, it is possible to determined how these images are to be disposed onto the memory 309, and also it is possible to perform the controlling such that any image is not printed to the area corresponding to the backbone cover.

FIG. 26C shows the state that the output result of the text original is interposed in the cover sheet subjected to the image formation based on the cover sheet formation mode in the present embodiment.

As described above, according to the present embodiment, when the bookbinding processing is performed, it is possible to eliminate the conventional drawback that the images for the cover sheet intrude into the backbone area which is essentially used as the binding/sizing part, whereby it is possible to quickly and accurately secure the part corresponding to the backbone cover. Thus, it is possible to easily form the cover sheet without burdening the user. Further, even if the user wishes to change either one of the images for the front and back covers, it is possible to easily and simply reform the cover sheet.

In addition, since the user performs the setting for the backbone cover width (corresponding to the thickness of the text original), even if it is necessary to change the interval between the plural images to be formed onto the cover sheet because, e.g., the thickness of the text original to be covered by the cover sheet changes (i.e., the number of pages of the text original changes), he can easily change such the interval.

[Third Embodiment]

Next, the third embodiment will be explained. In the present embodiment, for example, it will be explained the cover sheet formation processing in a case where the size of the original 1601 for the front cover or the size of the original 1602 for the back cover is larger than the secured area 1603 or 1604 (i.e., a case where at least one of "2×lh+d>Lh" and "lv>Lv" is established), with reference to FIGS. 14A and 14B.

In FIG. 14A, numeral 1601 denotes the original for the front cover. The image to be formed in the front cover area of the formed cover sheet has been printed on the original 1601, and its size is "lh×lv". Numeral 1602 denotes the original for the back cover. The image to be formed in the back cover area of the formed cover sheet has been printed on the original 1602, and its size is "lh×lv".

Figure 22:
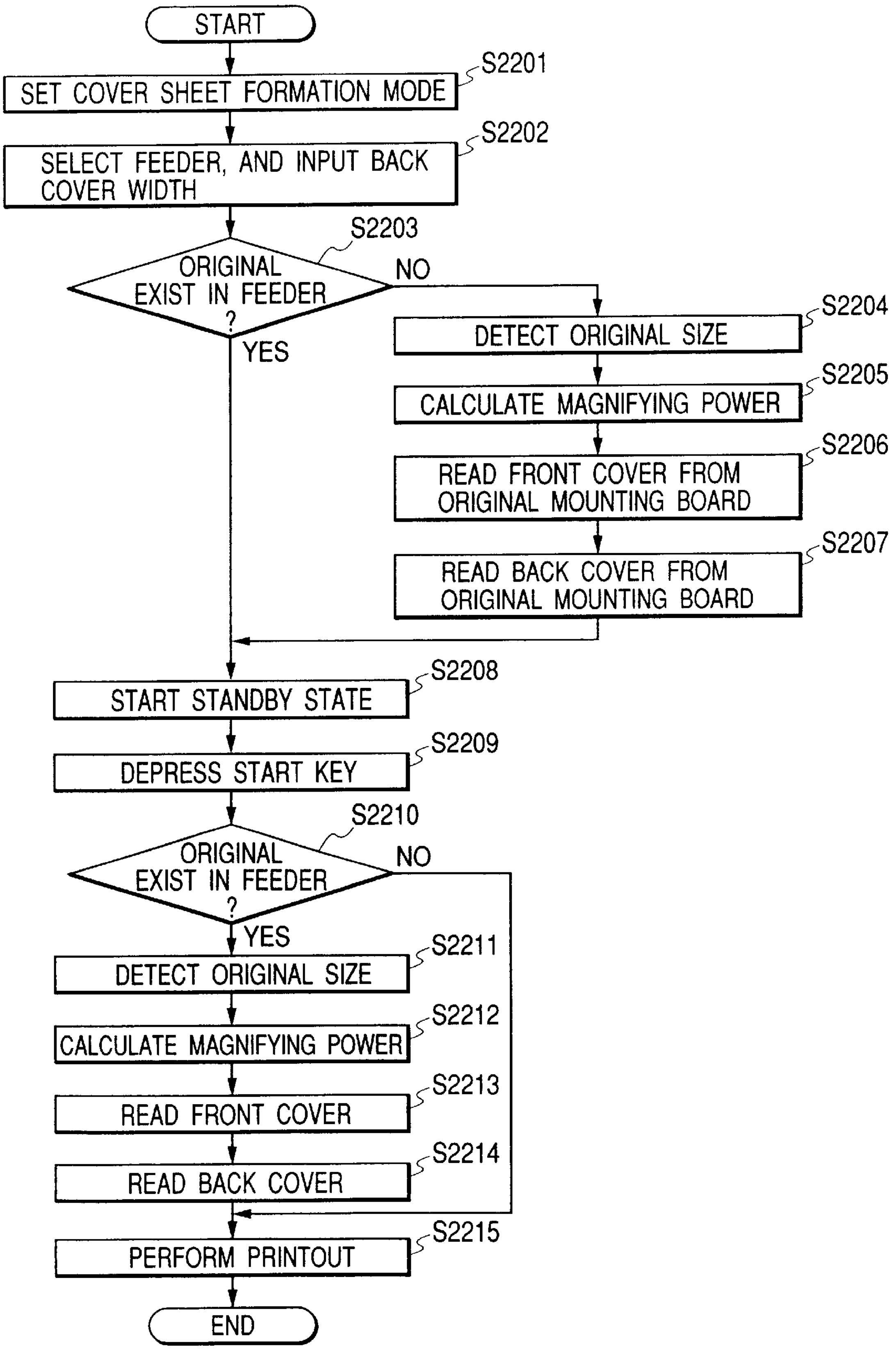
FIG. 22 is a flow chart for explaining an example of a third data processing procedure in the embodiment.

FIG. 14B shows the cover sheet 1600 which is formed according to a flow chart (FIG. 22) of the processing in the cover sheet formation mode. The entire size of the cover sheet 1600 is "Lh×Lv". Numeral 1603 denotes the area (i.e., the front cover area) to which the image of the original 1601 for the front cover subjected to magnification change processing based on the flow chart of FIG. 22 is to be formed, and numeral 1604 denotes the area (i.e., the back cover area) to which the image of the original 1602 for the back cover subjected to the magnification change processing based on the flow chart of FIG. 22 is to be formed. Numeral 1605 denotes the backbone cover area which is secured based on the width d being the information obtained in the later-described processing. The backbone cover area 1605 isolates the front cover area 1603 and the back cover area 1604 from each other, and it is so controlled that the image for the front or back cover is not formed in the area 1605.

(Operation of Cover Sheet Formation Mode)

Hereinafter, the processing procedure of the cover sheet formation mode in the present embodiment will be explained with reference to the flow chart shown in FIG. 22.

FIG. 22 is the flow chart for explaining an example of a third data processing procedure in the image processing apparatus 1000 of the present embodiment. It should be noted that this operation is performed by the CPU 321 of FIGS. 2A and 2B on the basis of the control program stored in the ROM 322, and that numerals S2201, S2202, S2203, S2204, S2205, S2206, S2207, S2208, S2209, S2210, S2211, S2212, S2213, S2214 and S2215 denote respective steps.

In the present embodiment, it is assumed that the images of the two originals (i.e., the original 1601 for the front cover and the original 1602 for the back cover) each having the size "lh×lv" are formed onto the sheet (i.e., the cover sheet) having the size "Lh×Lv" at the interval corresponding to the backbone cover width "d". Especially, the case where "lv=Lv" and "lh×2+d=Lh" are not established will be explained by way of example. In the flow chart, the steps S2211 to S2214 correspond to the case where the cover sheet is formed by feeding the original for the front cover from the not-shown feeder, and the steps S2204 to S2207 correspond to the case where the cover sheet is formed according as the original for the front cover is directly set onto the original mounting board glass 201 by the user, i.e., without setting the original to the feeder. It should be noted that the processing in the former case is substantially the same as that in the latter case.

First, the operator sets the image formation operation mode by using the operation unit 237 shown in FIG. 11 (S2201). In this case, the cover sheet formation mode key 124*a* is selected from among the mode setting keys 124.

If the cover sheet formation mode is selected in the step S2201, the screen on the display unit 125 is changed to the feeder selection screen 140 of FIG. 13. On the screen 140, if the feeder (e.g., the manual feeding tray 232) which holds therein the sheet to be used as the cover sheet is selected and designated with use of the feeder selection keys 141 and then the OK key 142 is depressed by the operator, the screen on the display unit 125 is changed to the backbone cover width input screen 1700 of FIG. 17. If the backbone cover width input keys 1701 are handled by the operator on the screen 1700 to set the backbone cover width (corresponding to the thickness of the text original, i.e., the interval between the image for the front cover and the image for the back cover) and the OK key 1703 is depressed (S2202), it is judged whether or not the original has been set to the not-shown feeder (S2203). The operator can select one of two methods to read the originals for the front and back covers, i.e., one to read the originals from the not-shown feeder and the other to read the originals from the original mounting board glass 201.

If judged in the step S2203 that at least the two or more originals for the front and back covers have been set to the feeder, the image processing apparatus 1000 considers that the original is fed from the feeder, and the flow advances to the step S2208. Conversely, if it is judged in the step S2203 that the original is not set in the feeder, the image processing apparatus 1000 considers that the original is read from the original mounting board glass 201, and the flow advances to the step S2204.

In the present embodiment, if at least the two originals for the front and back covers are set to the feeder, these originals are fed and read. However, it is possible to use a circular feeder. In this case, even if one original is set to the circular feeder, the feeder sequentially reads the circularly fed original.

In the step S2204, the screen on the display unit 125 is changed from the screen 1700 to the front cover original reading screen shown in FIG. 19. If the original for the front cover is set onto the original mounting board glass 201 and the reading key 1901 is depressed by the operator, the original for the front cover is scanned to detect the original size. Then the CPU 321 of FIGS. 2A and 2B sets the start value of the writing address to the registers WR0 and WR1 of the writing counter (Y counter) 502 in the address controller 318.

In the present embodiment, the image data input/output to/from the image memory 309 is performed in the unit of 4×4 pixels. The value "0000h" is set to the register WR0 as the writing address start value of the image of the original 1601 for the front cover, and value of ¼ of the pixel corresponding to "Lh/2+d/2" is set to the register WR1 as the writing address start value of the image of the original 1602 for the back cover. Similarly, the headmost address "0000h" of the image memory 309 is set to the registers WR0 and WR1 of the Y (reading) counters 503, 504, 505 and 506 of the sub-scan address generation unit (YCOUNTER) 424.

Next, an optimum magnifying power is calculated by the CPU 321 on the basis of the size of the sheet held in the feeder selected on the screen 140 and the backbone cover width set on the screen 1700 in the step S2202 and the original size detected in the step S2204 (S2205). The calculated optimum magnifying power is used to output the image such that the image for the front cover can be fallen into the area to which the image for the front cover is to be formed (e.g., the area 1603 of FIG. 14B) without defectiveness. Also, the calculated magnifying power is used to output the image such that the image for the back cover can be fallen into the area to which the image for the front cover is to be formed (e.g., the area 1604 of FIG. 14B) without defectiveness.

In the step S2205, the magnifying power in the sub-scan direction is calculated as "(Lh−d)/(2×lh)×100(%)" on the basis of the cover sheet length data in the sub-scan direction and the original length data in the sub-scan direction, and the magnifying power in the main-scan direction is calculated as "Lv/lv×100(%)" on the basis of the cover sheet length data in the main-scan direction and the original length data in the main-scan direction. Then the magnifying power in the main-scan direction is compared with the magnifying power in the sub-scan direction, the magnifying power having the larger value is adopted.

If the setting of the address and the calculation of the magnifying power end, the flow advances to the step S2206. In the step S2206, the original for the front cover is again scanned at the magnifying power calculated in the step S2205 to read the image on the original for the front cover. Before the original for the front cover is scanned, the signal "L" is transferred from the CPU 321 to the F/F 603 (FIG. 8) in the address controller 318, whereby the F/F 603 is preset.

By presetting the F/F 603, its output is "L", the original for the front cover is read. At the instant that the writing sub-scan interval signal WPE becomes "H", the value of register output WR0 is loaded to the address counter 607, and the original image for the front cover is written at the predetermined position on the image memory 309.

If the image reading processing to the original for the front cover ends in the step S2206, the flow advances to the step S2207. In the step S2207, the screen on the display unit 125 is changed from the front cover original reading screen of FIG. 19 to the back cover original reading screen of FIG. 20. Then, if the original 1602 for the back cover is set on the original mounting board glass 201 and the reading key 2022 is depressed, the original for the back cover is scanned at the magnifying power calculated in the step S2205 to read the image on the original for the back cover. At the instant that the F/F 603 of FIG. 8 becomes "H", the value of register output WR1 is loaded to the address counter 607. Thus, the original image for the back cover is written at the predetermined position on the image memory 309.

Next, the cover sheet formation mode standby screen 1400 of FIG. 12 is displayed on the display unit 125, and the cover sheet formation mode standby state is displayed (S2208). If the start key 121 of the operation unit 237 is depressed by the operator (S2209), it is judged whether or not the original has been set in the not-shown feeder (S2210). If judged that the original is not set, the flow advances to the step S2215.

Conversely, if judged in the step S2210 that the original has been set in the feeder, the processing same as in the steps S2204 to S2207 is performed. Concretely, the feeder is driven to feed the original for the front cover to the original mounting board glass 201, whereby the size of the original for the front cover is detected (S2211). Then, like the step S2205, an optimum magnifying power is calculated by the CPU 321 on the basis of the size of the sheet held in the feeder selected on the screen 140 and the backbone cover width set on the screen 1700 in the step S2202 and the original size detected in the step S2211. The calculated optimum magnifying power is used to output the image such that the image can be fallen into the area to which the image is to be formed without defectiveness. Then the original for the front cover is again scanned at the magnifying power calculated in the step S2205 to read the image on the original for the front cover (S2213). If the image reading processing to the original for the front cover ends, the not-shown feeder is driven to discharge the original for the front cover from the original mounting board glass 201 and also feed the original for the back cover onto the glass 201. If the original for the back cover is set onto the original mounting board glass 201, the original for the back cover is scanned at the magnifying power calculated in the step S2205 to read the image on the original for the back cover (S2214). As above, while the originals are being set in the not-shown feeder, the original image for the front cover and the original image for the back cover are sequentially stored into the image memory 309 according to the above-described procedure.

Next, in the step S2215, the CPU 321 sets the reading interval signal to be output to the printer unit. It should be noted that the sub-scan interval signal for each color transferred from the printer unit is "H" during the time Tl corresponding to the length of the sheet onto which the image is to be formed (FIG. 10).

In FIG. 10, each of the signals MPE, CPE, YPE and KPE is the sub-scan interval signal which is transferred from the printer unit and is "H" during the time Tl corresponding to the length of sheet onto which the image is to be formed. The signals MPE1, CPE1, YPE1 and KPE1 are the signals which are output from the circuit 1110 of FIG. 9 in the interval signal generation unit 320. The signals MPE1, CPE1, YPE1 and KPE1 are delayed by the internal delay time Td and come to be "H". Then the signals MPE1, CPE1, YPE1 and KPE1 are "H" during the time Tl corresponding to the original length.

If the setting of the interval signal ends, the CPU 321 notifies the printer unit of the printable state, whereby the printer unit starts the image printing. If the printing ends, the processing ends.

By such the controlling as above, the backbone cover area corresponding to the designated width is secured. Thus, it is possible to form the cover sheet on which the image for the front cover and the image for the back cover are adequately isolated from each other as shown in FIG. 14B.

As explained above, according to the present embodiment, when the input plural images are arranged on the sheet at the interval corresponding to the obtained backbone cover width, the magnifying power is automatically calculated and the magnification change processing is performed to the input image on the basis of the calculated magnifying power in order to prevent the defectiveness of the image and an unnecessary blank. Although reduction processing is performed to the input image in the present embodiment, enlargement processing is performed if the size of the input image is smaller than that of the sheet.

Thus, when the cover sheet the size of which is desired by the user is formed, it is possible by the third data processing procedure shown in FIG. 22 to prevent the conventional drawback that the user troublesomely produces and prepares the originals for the front and back covers having the sizes suitable for the size of the cover sheet, the backbone cover width (corresponding to the thickness of the text original) and the like to prevent the image defectiveness and unnecessary blank on the cover sheet.

Further, if the thickness of the text original to be interposed in the cover sheet changes because, e.g., the number of output pages of the text original changes or the material of the sheet onto which the image of the text original is to be formed changes, the width of the backbone cover is changed. In this case, the size of the area on the cover sheet in which the original for the front cover or the original for the back cover is formed necessarily becomes different from that before the change of the backbone cover width. However, even if the original for the front cover or the original for the back cover used before the change is used as it is after the change, the problems of the image defectiveness and the unnecessary blank on the cover sheet do not occur in the present embodiment.

It is thought the case where the backbone cover width differs before and after the change, but the cover sheet size, the contents of the image data to be formed on the cover sheet, and the like do not respectively change before and after the change. Even in this case, it is possible in the present embodiment to prevent the conventional drawback that the user troublesomely reprepares the original for the front cover and/or the original for the back cover every time the backbone cover width is changed, thereby reducing the load of the user in the bookbinding processing.

In the third data processing procedure of FIG. 22, the magnifying power in the calculated main-scan direction is compared with that in the calculated sub-scan direction, and the magnifying power having the larger value is adopted to be able to formed the cover sheet including no unwilled blank. However, it is needless to say that the present invention is applicable to a case where the magnifying power having the smaller value is used to print the image onto cover sheet without image defectiveness. Further, if the calculated magnifying power in the main-scan direction is different from that in the sub-scan direction, it is possible to perform the magnification change processing in each direction at the differently calculated magnifying power. In this case, the images each subjected to the magnification change processing at the different magnifying power are formed to the respective areas.

In the case which has been explained as above with reference to the flow chart of the third data processing procedure shown in FIG. 22, the magnifying factor of the original image is automatically calculated on the basis of the size of the user-designated sheet onto which the image is to be formed, the width of the backbone cover, and the original size which is detected by the image processing apparatus 1000. Then the input original image is subjected to the magnification change processing on the basis of the calculated magnifying power, whereby the cover sheet from which the input original image is not defected is formed. However, it is possible to form the image onto the cover sheet without image defectiveness in another manner. In this manner, the size of the sheet onto which the image is to be formed is first detected on the basis of the obtained backbone cover width data and the detected original size data, and then the input image is formed onto the sheet the size of which corresponds to the detected size. It should be noted that, in this manner, any magnification change processing is not performed. Further, if there are the plural kinds of sheets from which the input original image is not defected, it is possible to select the minimum-sized sheet from among these plural kinds of sheets and form the input image onto the selected sheet. In other words, it is possible to select the sheet from which the image is not defected and which has no unnecessary blank.

Hereinafter, such the operation as above will be explained with reference to FIGS. 23 and 24.

Figure 23:
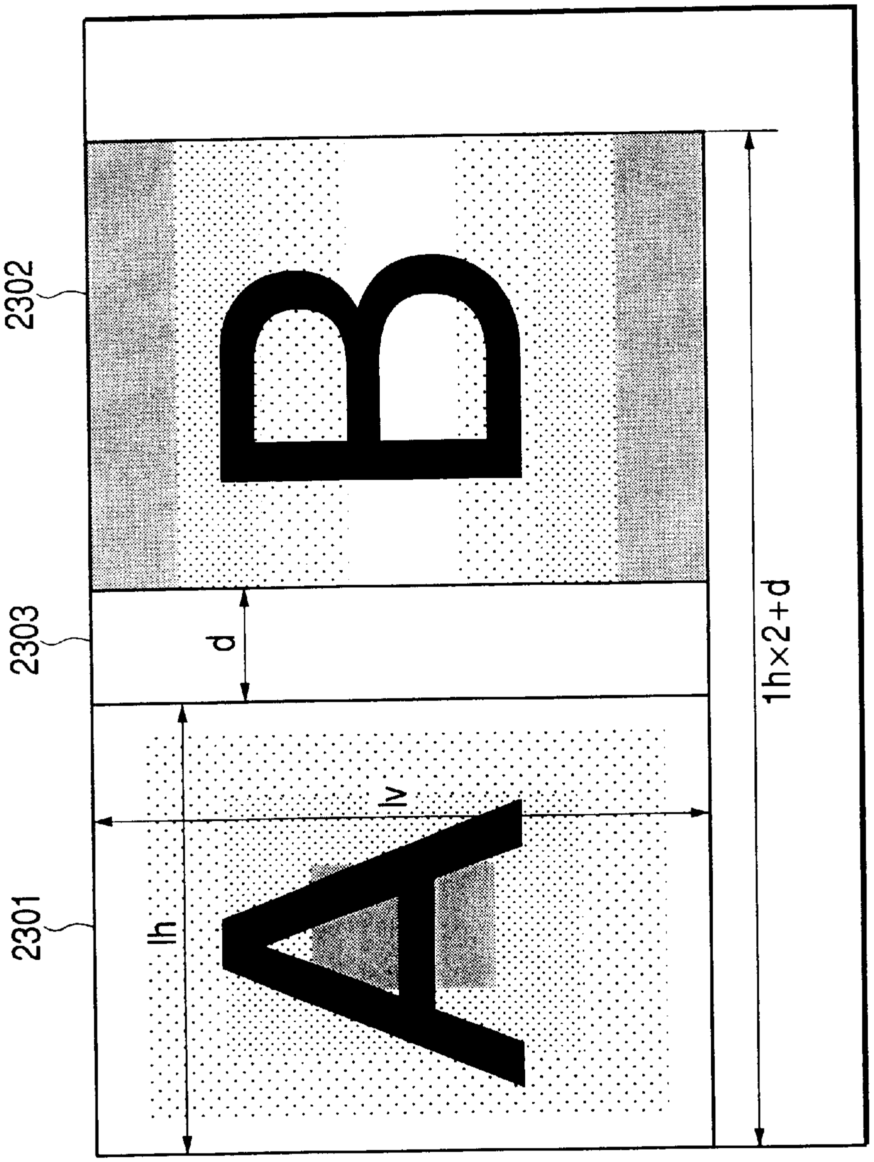
FIG. 23 is a view for explaining a cover sheet formation mode in the embodiment.

FIG. 23 is a view for explaining the output result of the cover sheet formation mode in the present embodiment. In FIG. 23, numeral 2300 denotes a cover sheet which is formed according to the flow chart (FIG. 24) of the processing in the cover sheet formation mode. Numeral 2301 denotes an area to which the image of the original for the front cover (e.g., the original 1601 of FIG. 14A) is to be formed on the basis of the later-described flow chart of FIG. 24. In the area 2301, the image of the original 1601 is printed with the same size (i.e., without being subjected to the magnification change processing). It should be noted that, like the first embodiment, the size of the original 1601 is "lh×lv". Numeral 2302 denotes an area to which the image of the original for the back cover (e.g., the original 1602 of FIG. 14A) is to be formed on the basis of the later-described flow chart of FIG. 24. In the area 2302, the image of the original 1602 is printed with the same size (i.e., without being subjected to the magnification change processing). It should be noted that, like the first embodiment, the size of the original 1602 is "lh×lv". Numeral 2303 denotes a backbone cover area which is secured based on the width d being the obtained information. The backbone cover area 2303 isolates the front cover area 2301 and the back cover area 2302 from each other, and the images for the front and back covers are not formed in the area 2303. It should be noted that the lateral size of the area composed of the areas 2301, 2303 and 2302 is "lh×2+d", and the longitudinal size thereof is "lv".

In the present embodiment, the feeder which holds therein the sheet corresponding to the minimum size to which the image to be formed onto the cover sheet can be printed without image defectiveness is automatically selected, and the image is actually formed onto the selected sheet, thereby forming the cover sheet.

(Operation of Cover Sheet Formation Mode)

Hereinafter, the processing procedure of the cover sheet formation mode in the present embodiment will be explained with reference to the flow chart shown in FIG. 24.

Figure 24:
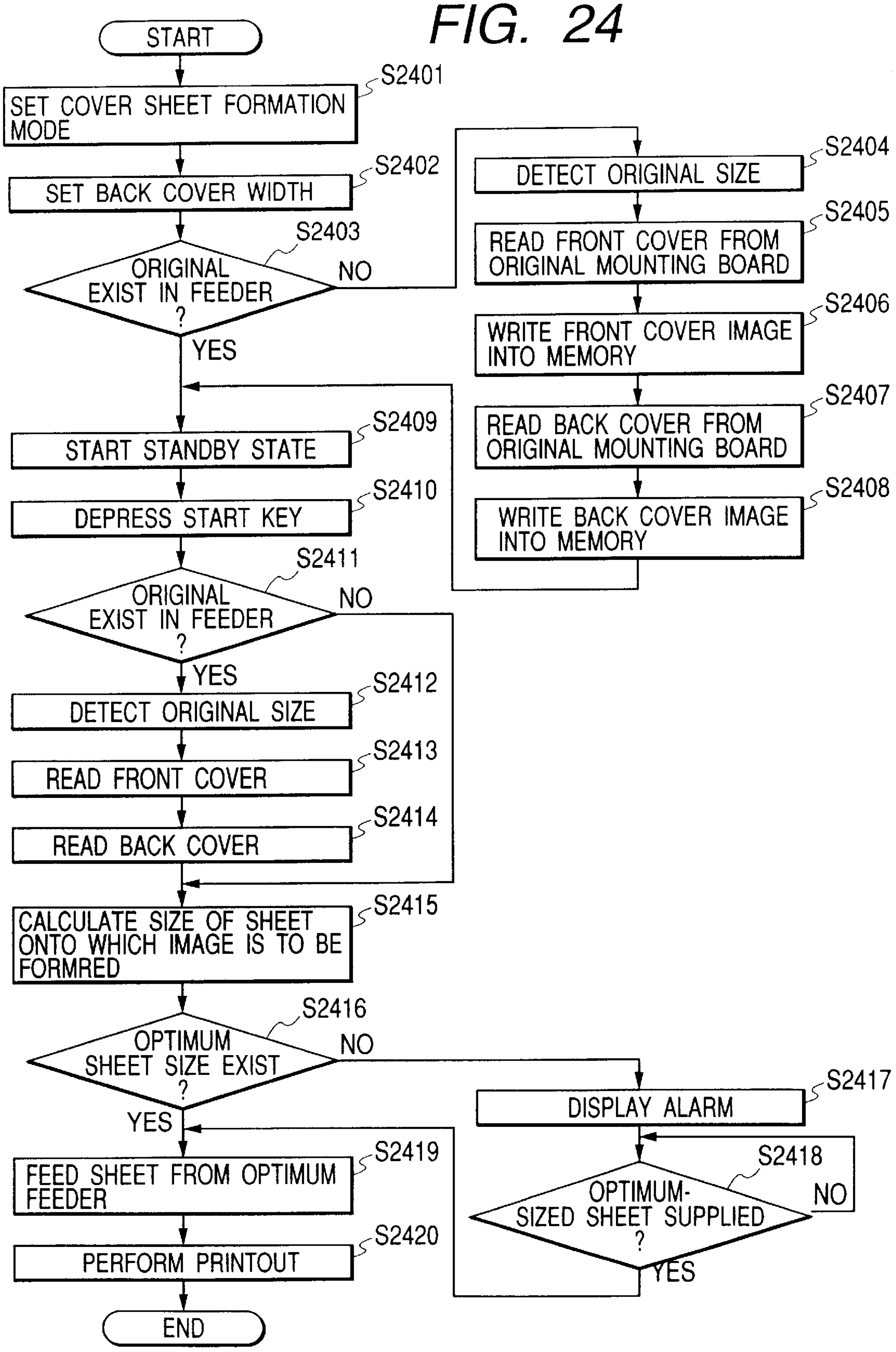
FIG. 24 is a flow chart for explaining an example of a fourth data processing procedure in the embodiment.

FIG. 24 is the flow chart for explaining an example of a fourth data processing procedure in the image processing apparatus 1000 of the present embodiment. It should be noted that this operation is performed by the CPU 321 of FIGS. 2A and 2B on the basis of the control program stored in the ROM 322, and that numerals S2401, S2402, S2403, S2404, S2405, S2406, S2407, S2408, S2409, S2410, S2411, S2412, S2413, S2414, S2415, S2416, S2417, S2418, S2419 and S2420 denote respective steps.

In the present embodiment, it is assumed that the size of each of the original 1601 for the front cover and the original 1602 for the back cover is "lh×lv" with reference to FIG. 14A, and that the image of the original 1601 for the front cover is formed in the area 2301 of the cover sheet 2300 with the same size (i.e., without the magnification change processing), and the image of the original 1602 for the back cover is formed in the area 2302 with the same size with reference to FIG. 23. Further, it is assumed that these images are arranged at the interval "d" corresponding to the backbone cover area 2303.

First, the operator sets the image formation operation mode by using the operation unit 237 shown in FIG. 11 (S2401). In this case, the cover sheet formation mode key 124*a* is selected from among the mode setting keys 124.

If the cover sheet formation mode is selected in the step S2401, the screen on the display unit 125 is changed to the backbone cover width input screen 1700 of FIG. 17. If the backbone cover width input keys 1701 are handled by the operator on the screen 1700 to set the backbone cover width (corresponding to the thickness of the text original, i.e., interval between the image for the front cover and the image for the back cover) and the OK key 1703 is depressed (S2402), it is judged whether or not the original has been set to the not-shown feeder (S2403). It should be noted that the operator can select one of two methods to read the originals for the front cover and back cover, i.e., one to read the originals from the not-shown feeder and the other to read the originals from the original mounting board glass 201.

If judged in the step S2403 that at least the two or more originals for the front and back covers have been set to the feeder, the image processing apparatus 1000 considers that the original is fed and read from the feeder, and the flow advances to the step S2409. Conversely, if judged in the step S2403 that there is no original in the feeder, the image processing apparatus 1000 considers that the original is fed and read from the original mounting board glass 201, and the flow advances to the step S2404.

In the present embodiment, if at least the two originals for the front and back covers are set to the feeder, these originals are fed and read. However, it is possible to use the circular feeder. In this case, even if one original is set to the circular feeder, the feeder sequentially reads the circularly fed original.

In the step S2404, the screen on the display unit 125 is changed from the screen 1700 to the front cover original reading screen of FIG. 19. If the original for the front cover is set onto the original mounting board glass 201 and the reading key 1901 is depressed by the operator, the original for the front cover is scanned to detect its size, whereby the original size "lv" in the main-scan direction and the original size "lh" in the sub-scan direction are obtained. Then the CPU 321 of FIGS. 2A and 2B sets the start value of the writing address to the registers WR0 and WR1 of the writing counter (Y counter) 502 in the address controller 318, and the image of the original 1601 for the front cover put on the original mounting board glass 201 is read (S2405). The read image is stored into the memory 309 (S2406).

With respect to the steps S2405 and S2406, in the present embodiment, the image data input/output to/from the image memory 309 is performed in the unit of 4×4 pixels. The value "0000h" is set to the register WR0 as the writing address start value of the image of the original 1601 for the front cover. Similarly, the headmost address "0000h" of the image memory 309 is set to the registers WR0 and WR1 of the Y (reading) counters 503, 504, 505 and 506.

Before the original is scanned, the signal "L" is transferred from the CPU 321 to the F/F 603 (FIG. 8) in the address controller 318, whereby the F/F 603 is preset. By presetting the F/F 603, its output is "L", the original is again read. Then, at the instant that the writing sub-scan interval signal WPE becomes "H", the value of register output WR0 is loaded to the address counter 607, and the original image for the front cover is written at the predetermined position on the image memory 309.

If the image reading processing to the original 1601 for the front cover ends in the step S2406, the flow advances to the step S2407. In the step S2407, the screen on the display unit 125 is changed from the front cover original reading screen of FIG. 19 to the back cover original reading screen of FIG. 20. Then if the original 1602 for the back cover is set onto the original mounting board glass 201 and the reading key 2202 is depressed by the operator, the original for the back cover is scanned to detect the original size, whereby the original size "lv" in the main-scan direction and the original size "lh" in the sub-scan direction are obtained. Then the CPU 321 of FIGS. 2A and 2B sets the value of ¼ of the pixel corresponding to "lh+d" to the register WR1 as the writing address start value.

Next, in the step S2408, the image of the original for the back cover is again read. At the instant that the F/F 603 becomes "H", the value of register output WR1 is loaded to the address counter 607, and the original image for the back cover is written at the predetermined position on the image memory 309.

Next, the cover sheet formation mode standby screen 1400 of FIG. 12 is displayed on the display unit 125, and the cover sheet formation mode standby state is displayed (S2409). If the start key 121 of the operation unit 237 is depressed by the operator (S2410), it is judged whether or not the original has been set in the not-shown feeder (S2411). If judged that the original is not set, the flow advances to the step S2415.

Conversely, if judged in the step S2411 that the original has been set in the feeder, the processing same as in the steps S2404 to S2407 is performed. Concretely, the feeder is driven to feed the original for the front cover to the original mounting board glass 201, and the original for the front cover is scanned to detect its size (S2412). Then the original for the front cover is again scanned, and the image of the original is stored into the memory 309 (S2413). Next, the not-shown feeder is driven to discharge the original for the front cover from the original mounting board glass 201 and also feed the original for the back cover onto the glass 201. If the original for the back cover is set onto the original mounting board glass 201, the original for the back cover is scanned to detect its size. Then the image of the scanned original is stored into the image memory 309 (S2414). As above, while the originals are being set in the not-shown feeder, the original image for the front cover and the original image for the back cover are sequentially stored into the image memory 309 according to the above-described procedure.

Next, according as the reading processing for each of the originals for the front and back covers ends, the size of the sheet which is optimum for the cover sheet and onto which the image is to be formed is calculated by the CPU 321 on the basis of the original size data obtained in the steps S2404 and S2407 (or obtained in the steps S2412 and S2414) and the backbone cover width data obtained in the step S2402 (S2415).

On the basis of the calculated result in the step S2415, the CPU 321 considers that the sheet optimum for the cover sheet at least satisfies the sub-scan direction size "lh×2+d" and the main-scan direction size "lv". Then, in order to search the feeder which holds therein the sheet satisfying such a condition as above, the CPU 321 compares the sizes of the sheets held in the cassettes 229 and 230 and the manual feeding tray 232 with the sheet size obtained from the calculated result in the step S2415.

When the size of the sheet held in each feeder is obtained, such the size may be obtained on the basis of the detection result of a not-shown sensor in the feeder which detects whether or not the original exists. Further, such the size may be obtained by an input operation at the operation unit 237. Further, the size of the sheet to be held may be previously determined for each feeder.

The sheet which has the sub-scan direction size equal to or larger than "lh×2+d" and the main-scan direction size equal to or larger than "lv" is determined as the optimum-sized sheet. If there are the plural kinds of sheets which satisfy the above condition, the minimum-sized sheet is selected from among these plural kinds of sheets as the optimum-sized sheet.

Next, it is judged whether or not the optimum-sized sheet determined in the step S2415 has been held in either of the cassette 229 or the cassette 230 or set in the manual feeding tray 232 (S2416). If judged that the optimum-sized sheet exists, the flow advances to the step S2419. Conversely, if judged that the optimum-sized sheet does not exist, a message such as "supply optimum-sized sheet" is displayed on the display unit 125 as an alarm to the user (S2417). Then the flow waits for the user to supply the optimum-sized sheet (S2418). If the optimum-sized sheet is supplied, the flow advances to the step S2419.

In the step S2419, the sheet is fed from the feeder (selected from among the cassettes 229 and 230 and the manual feeding tray 232) which holds therein the optimum-sized sheet.

In the step S2420, the CPU 321 sets the reading interval signal to be output to the printer unit. It should be noted that the sub-scan interval signal for each color transferred from the printer unit is "H" during the time Tl corresponding to the length of the fed sheet.

In FIG. 10, each of the signals MPE, CPE, YPE and KPE is the sub-scan interval signal which is transferred from the printer unit and is "H" during the time Tl corresponding to the length of sheet onto which the image is to be formed. The signals MPE1, CPE1, YPE1 and KPE1 are the signals which are output from the circuit 1110 of FIG. 9 in the interval signal generation unit 320. The signals MPE1, CPE1, YPE1 and KPE1 are delayed from rises of the signals MPE, CPE, YPE and KPE by the internal delay time Td and come to be "H". Then the signals MPE1, CPE1, YPE1 and KPE1 are "H" during the time Tl corresponding to the original length.

If the setting of the interval signal ends, the CPU 321 notifies the printer unit of the printable state, whereby the printer unit starts the image printing. If the printing ends, the processing ends.

Hereinafter, a concrete example of the above-described processing will be explained. For example, it is assumed that the sheets of A4 size (297 mm×210 mm) have been held in the cassette 229 and the sheets of A3 size (420 mm×297 mm) have been held in the cassette 230, and that the sheet size calculated in the step S2415 is larger than the A4 size but smaller than the B4 size (364 mm×257 mm). In this case, since the minimum sheet size which does not require any magnification change processing of the input image and onto which the image can be output without image defectiveness is "A3", the optimum size at that time is "A3". Therefore, the cassette 230 holding therein the A3-sized sheet is selected, the sheet is fed from the cassette 230, and the image for the cover sheet is printed to the fed sheet. If the sheet the size of which is equal to or larger than the sheet size calculated in the step S2415 is not held in the cassette 299 or 230 (e.g., there is no sheet in the cassette 230 for holding the A3-sized sheet, there is essentially no sheet the size of which is equal to or larger than the calculated size in the cassette 299 or 230, or the like), the message "supply B4-sized sheet" is displayed on the display unit 125 to urge the user to supply the B4-sized sheet.

According to the present embodiment, it is possible to arrange and output the plural input images for the cover sheet at the interval based on the obtained backbone cover width data. In this case, the backbone cover width data may be obtained by the input operation of the operator such as the second data processing procedure of FIG. 21, the third data processing procedure of FIG. 22 or the fourth data processing procedure of FIG. 24, or may be automatically calculated by the image processing apparatus 1000 such as the first data processing procedure of FIG. 15. Further, it is possible to print the data (i.e., the data not subjected to the magnification change processing) the size of which is the same as that of the input original onto the automatically selected sheet without image defectiveness.

By the above-described fourth data processing procedure of FIG. 24, for example, it is possible to eliminate the conventional drawback that the user himself troublesomely thinks the size of the sheet onto which the image is to be formed, in consideration of the size of the input original, the backbone cover width and the like, searches for the feeder holding therein the suitable sheet from among the plural feeders, and designates the searched feeder.

Further, for example, in the case where the thickness of the text original (corresponding to the backbone cover width) is changed if the number of output pages of the text original changes, or if the material of the sheet onto which the image of the text original is to be formed changes, or in the case where the original size for the front or back cover, it is possible to obviate conventional troublesome operation that the user calculates the optimum cover sheet size every time the setting is changed, searches for the feeder holding the suitable sheet from among the plural feeders, and designates the searched feeder to prevent occurrence of the image defectiveness and the unnecessary blank on the cover sheet. Thus, the above-described effect can be more heightened.

It has been explained in the fourth data processing procedure shown in FIG. 24 that the read original image is printed onto the sheet at the same size. However, it may be structured to combine the third data processing procedure of FIG. 22 and the fourth data processing procedure of FIG. 24 with each other. In this case, the read original image is magnification-changed at the predetermined or designated magnifying power, and the image the size of which is magnification-changed is formed onto the sheet the size of which is based on the obtained backbone cover width data.

Further, it has been explained in each of the above-described embodiments that the images on the two or more originals are read by using the feeder. However, it may be structured to read the images on the front and back faces of one original, and print the these images as the image for the front cover and the image for the back cover on the identical face of the cover sheet at the interval corresponding to the backbone cover width.

Further, in the first data processing procedure of FIG. 15, the second data processing procedure of FIG. 21, the third data processing procedure of FIG. 22, and the fourth data processing procedure of FIG. 24 of the above-described embodiments, the image processing apparatus capable of performing the color printing is used by way of example. However, the present invention is applicable to an image processing apparatus which performs monochrome printing.

Further, in the present embodiment, the image data is input by optically reading the image information of the original with the image scanner of the image processing apparatus 1000. However, it may be structured to input the image data for the front and back covers and the image data for the text original from an information processing apparatus such as a personal computer (PC) or the like which can communicates with the image processing apparatus 1000 through a predetermined communication medium, and performs the operation in such a cover sheet formation mode as described above. Hereinafter, this operation will be explained with reference to FIG. 25.

Figure 25:
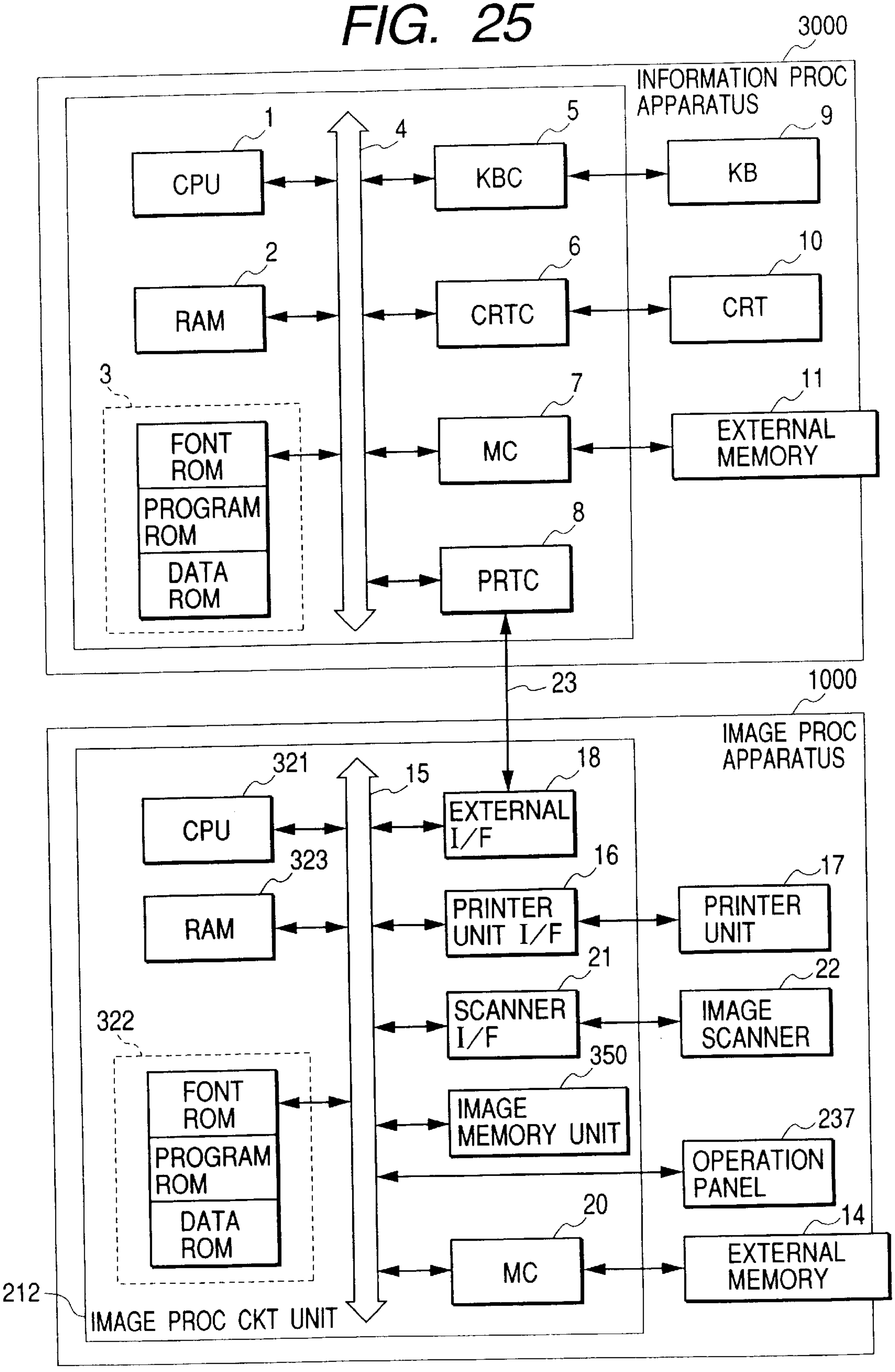
FIG. 25 is a view for explaining an example of an image formation system in the embodiment.

FIG. 25 is a block diagram for explaining an example of an image formation system to which the image processing apparatus 1000 of FIG. 1 is applicable.

In FIG. 25, numeral 3000 denotes an information processing apparatus such as a personal computer (PC) or the like. In the apparatus 3000, a CPU 1 performs data communication to the image processing apparatus 1000 on the basis of a driver stored in a program ROM of a ROM 3, and also controls each part connected to a system bus 4 entirely.

Further, a control program or the like for the CPU 1 is stored in the program ROM of the ROM 3, font data or the like is stored in a font ROM of the ROM 3, and other various data are stored in data ROM of the ROM 3. Numeral 2 denotes a RAM which functions as the main memory, the working area and the like of the CPU 1.

Numeral 5 denotes a keyboard controller (KBC) which controls key inputting from a keyboard (KB) 9 or a not-shown pointing device. Numeral 6 denotes a CRT controller (CRTC) which controls displaying of a CRT display (CRT) 10. Numeral 7 denotes a memory controller (MC) which controls accessing to an external memory 11 such as a hard disk (HD), a floppy disk (FD) or the like for storing font data, a user file, an editing file and the like.

Numeral 8 denotes a printer unit controller (PRTC) which is connected to the image processing apparatus 1000 through a predetermined two-way interface 23 and thus controls the communication with the apparatus 1000.

It should be noted that the CPU 1 performs expansion processing of outline font to, e.g., a display information RAM set on the RAM 2, whereby a WYSIWYG (what you see is what you get) operation can be performed on the CRT 10.

Further, the CPU 1 opens various windows which have been registered based on commands indicated by a not-shown mouse cursor or the like displayed on the CRT 10 and thus performs various data processing.

In the image processing apparatus 1000, as described above, the CPU 321 entirely controls accessing to various devices or units connected to a system bus 15, on the basis of a control program stored in the program ROM of the ROM 322, a control program stored in an external memory 14 such as a hard disk, or the like. Thus, image data is input from an image scanner 22 connected through a scanner I/F 21, and the image signal is output as output information to a printer unit 17 connected through a printer unit I/F 16.

Font data which is used to generate the output information is stored in the font ROM of the ROM 322. If the external memory 14 such as a hard disk or the like is not connected, the information which is used in the information processing apparatus 3000 is stored in the data ROM of the ROM 322. The CPU 321 can perform the communication processing with the information processing apparatus 3000 through the external I/F (i.e., input unit), and thus can notify the apparatus 3000 of the information of the program or the like.

Numeral 323 denotes the RAM which functions as the main memory, the working area and the like of the CPU 321. It is structured to be able to expand the memory capacity of the RAM 323 by means of an optional RAM connected to a not-shown expansion port. Incidentally, the RAM 323 is used as an output information expansion area, an environment data storage area, an NVRAM (nonvolatile RAM) or the like. Accessing to the external memory 14 such as the hard disk, an IC card or the like is controlled by a memory controller (MC) 20.

The printer unit 17 includes the semiconductor lasers 213 to 216, the polygonal mirror 217, the development units 221 to 224, the photosensitive drum 225 to 228, the cassettes 229 and 230, the manual feeding tray 232, the registration roller 233, the transfer belt 234, the fixing unit 235, the discharge tray 236 and the like, shown in FIG. 1. Further, the image scanner 22 includes the original mounting board glass 201, the optical system 207, the CCD 208, the motor 209, the first and second mirror units 210 and 211 and the like, shown in FIG. 1.

As explained in FIGS. 2A and 2B, the image processing circuit unit 212 includes the CPU 321, the ROM 322, the system bus 15, the printer unit I/F 16, the external I/F (input unit) 18, the RAM 323, the scanner I/F 21 and the like. Since the details of these units were explained with reference to FIGS. 2A and 2B, the explanation thereof will be omitted.

In such an image formation system as described above, the image data for the text original, the image data for the front cover, the image data for the back cover and the like can be input from the information processing apparatus 3000 to the image processing apparatus 1000 through the predetermined two-way interface (or the communication medium) 23, and the operation screen shown in each of FIGS. 12, 13, 16, 17, 18, 19 and 20 can be displayed on the CRT 10 of the information processing apparatus 3000. Further, it may be structured to perform the operation in the cover sheet formation mode explained with reference to FIGS. 15, 21, 22 and 24, on the basis of the instruction data (the backbone cover width data, the size data of the sheet on which the image is to be formed, the size data of the image for the front cover, etc.) input from the KB 9 or the like of the information processing apparatus.

Further, in the present embodiment, it was explained that the two images are arranged at the desired image interval. However, the images to be arranged are not limited to two. Namely, it is needless to say that the present invention is applicable to a case where three or more images are arranged at desired interval. Further, it may be structured to insert another image (e.g., a title image of the generated data, etc.) into the area (corresponding to the backbone cover) isolating the plural images from others.

Further, in the present embodiment, the plural (i.e., two) images are arranged in parallel at the desired image interval in the sub-scan direction (i.e., the sheet feeding direction). However, it is possible to arrange the images in parallel at the desired image interval in the main-scan direction (i.e., the direction perpendicular to the sheet feeding direction). In this case, it may be structured to be able to designate the image arrangement direction on the operation panel 237.

Further, if the size "lv" of the original image in the main-scan direction is smaller than the size "Lv" of the sheet on which the image is to be formed in the main-scan direction, it may be structured to adjust (i.e., centering in the main-scan direction) the position of each image to be formed on the cover sheet and then arrange the images on the image memory 309. Further, if the sum of the image widths of the two images and the image interval (e.g., "lh×2+d") is smaller than the length "Lh" of the sheet on which the image is to be formed (e.g., "lh×2+d <Lh"), it may be structured to adjust (i.e., centering in the sub-scan direction) the position of each image to be formed on the cover sheet and then arrange the images on the image memory 309.

Further, if the image interval (i.e., the backbone cover width) of which size is extremely larger than the size of the sheet on which the image is to be formed or the original size, it may be structured to give the alarm to the user through the display unit 125 (or the CRT 10 of the information processing apparatus 3000).

In the above description, it has been explained the case where the area (i.e., backbone cover area) for isolating the two images from each other is disposed at the center part of the sheet and the image formation is performed centering on the backbone cover area. However, it is unnecessary to always secure the backbone cover area at the center part of the sheet. Further, it may be structured to be able to designate the area for isolating the two images from each other by using the operation panel 237 (or the keyboard 9 of the information processing apparatus 3000).

Further, it may be structured to be able to input the image data taken by a digital camera to the image processing apparatus 1000. In the embodiments, it has been explained the case where the image size of the original for the front cover is the same as the image size of the original for the back cover. However, it is needless to say that the present invention is applicable to a case where the image size of the original for the front cover is different from the image size of the original for the back cover.

Further, it is needless to say that the function of the present invention can be realized also in a case where a storage medium which stores a program code of software for realizing the functions (especially the first data processing procedure in FIG. 15, the second data processing procedure in FIG. 21, the third data processing procedure in FIG. 22, the fourth data processing procedure in FIG. 24, etc.) in the above-described embodiments is supplied to a system or an apparatus and then the program code is read out and executed by a computer (CPU or MPU) provided in the system or the apparatus.

In this case, the program code itself read out of the storage medium is to realize a new function of the present invention and the recording medium which stores the program code constructs the present invention. As the storage medium for supplying the program code, it is possible to use, e.g., a floppy disk, a hard disk, an optical disk, a magneto-optical disk, a CD-ROM, a CD-R, a magnetic tape, a non-volatile memory card, a ROM, an EEPROM or the like.

It is needless to say that the present invention includes not only the case where the functions of the above-described embodiments are realized by executing the program code read with the computer, but also a case where an OS (operating system) or the like running on the computer executes a part or all of the actual processing according to the instruction of the read program code and thus the functions of the above-described embodiments are realized by such the processing.

Further, it is needless to say that the present invention includes a case where the program code read out of the storage medium is written into a memory provided in a function expansion board inserted in the computer or a function expansion unit connected to the computer, thereafter, on the basis of an instruction of the program code, a CPU or the like provided in the function expansion board or the function expansion unit executes a part or all of the actual processing, and thus the functions of the above-described embodiments are realized.

The present invention may be applied to such a system as shown in FIG. 25 structured by the plural apparatuses or to an apparatus including only one device. It is needless to say that the present invention is applicable to a case where the above functions are realized by supplying a program to such the system or the apparatus. In this case, if the storage medium which stores the program expressed by software for realizing the present invention is read out on the system or the apparatus, it becomes possible that the system or the apparatus obtains the effects of the present invention.

Further, if the program expressed by the software for realizing the present invention is downloaded and read out of a data base on a network by using a communication program, it becomes possible that the system or the apparatus obtains the effects of the present invention.

The present invention can be modified in various manner, within the scope of the following claims.

What is claimed is:

1. An image processing apparatus comprising:

read means capable of reading plural original images of a first type and an original image of a second type;

storage means for storing the image read by said read means;

image formation means capable of forming the original image of said first type stored in said storage means onto a recording medium of a first type, and capable of forming the original image of said second type stored in said storage means onto a recording medium of a second type;

detection means for detecting a thickness of the recording medium of said first type onto which the original image of said first type is to be formed;

calculation means for accumulating the thickness of the recording medium of said first type detected by said detection means to calculate a width of a backbone cover; and control means for disposing the plural original images of said second type read by said read means and to be formed on the recording medium of said second type, in said storage means at an interval based on the width of the backbone cover calculated by said calculation means.

2. An apparatus according to claim 1, further comprising image formation control means for causing said image formation means to form the plural original images of said second type disposed in said storage means at the interval based on the width of the backbone cover onto the recording medium of said second type.

3. An apparatus according to claim 1, wherein the read image is divided into pixel blocks each consisting of a first predetermined number of pixels in a main-scan direction and a second predetermined number of pixels in a sub-scan direction, and the image is encoded and decoded for each of the equally divided pixel blocks.

4. An apparatus according to claim 1, further comprising a main-scan address control unit for designating and controlling a main-scan direction address of said storage means, and a sub-scan address control unit for designating and controlling a sub-scan direction address of said storage means.

5. An apparatus according to claim 4, wherein said main-scan address control unit includes a writing main-scan address control unit for designating and controlling the main-scan direction address when the image is written into said storage means, and a reading main-scan address control unit for designating and controlling the main-scan direction address when the image is read from said storage means.

6. An apparatus according to claim 4, wherein said sub-scan address control unit includes a writing sub-scan address control unit for designating and controlling the sub-scan direction address when the image is written into said storage means, and plural reading sub-scan address control units respectively for designating and controlling the sub-scan direction addresses when the image is read from said storage means.

7. An image processing method comprising:

a read step capable of reading plural original images of a first type and an original image of a second type;

a storage step of storing the read image into a storage medium;

an image formation step capable of forming the original image of said first type stored in said storage medium onto a recording medium of a first type, and capable of forming the original image of said second type stored in said storage medium onto a recording medium of a second type;

a detection step of detecting a thickness of the recording medium of said first type onto which the the original image of said first type is to be formed;

a calculation step of accumulating the thickness of the recording medium of said first type detected in said detection step to calculate a width of a backbone cover; and a control step of disposing the plural original images of said second type read in said read step and to be formed on the recording medium of said second type, in the storage medium at an interval based on the width of the backbone cover calculated in said calculation step.

8. An image processing apparatus comprising:

read means capable of reading plural original images of a first type to be recorded on each of plural recording media of a first type, and capable of reading an original image of a second type to be recorded on a recording medium of a second type suitable for covering the plural recording media of said first type;

storage means for storing the image read by said read means;

setting means for setting an image interval to dispose the plural original images of said second type apart from others on an identical face of the recording medium of said second type, the plural original images being read by said read means; and control means for performing expansion processing of the original image to said storage means so that the plural original images of said second type read by said read means are disposed apart from others by a predetermined width on the basis of the image interval set by said setting means.

9. An apparatus according to claim 8, further comprising:

designation means for designating a size of the recording medium of said second type from among the recording medium of said first type and the recording medium of said second type; and input means for inputting a size of the original image of said second type from among the original image of said first type and the original image of said second type, and wherein said control means performs the expansion processing to said storage means so that the plural original images of said second type read by said read means are disposed, at predetermined positions on the recording medium of said second type, apart from others by the predetermined width on the basis of the image interval set by said setting means, the size of the recording medium of said second type designated by said designation means and the size of the original image of said second type input by said input means.

10. An apparatus according to claim 8, further comprising output means for outputting image information stored in said storage means.

11. An apparatus according to claim 10, wherein said output means includes plural image formation units and a carrying unit for sequentially carrying recording media to said plural image formation units.

12. An apparatus according to claim 8, wherein said read means sequentially feeds the plural originals put on an original mounting board and reads the image from each original.

13. An apparatus according to claim 8, wherein said control means performs the expansion processing of the image to said storage means so that the plural original images of said second type read by said read means are disposed apart from others by the predetermined width and alongside a sub-scan direction.

14. An apparatus according to claim 8, wherein said control means divides the read image information into pixel blocks each consisting of a first predetermined number of pixels in a main-scan direction and a second predetermined number of pixels in a sub-scan direction, and encodes and decodes the image information for each pixel block.

15. An apparatus according to claim 8, wherein said control means can perform one input address controlling and plural output address controlling in a sub-scan direction of said storage means.

16. An apparatus according to claim 8, wherein said read means optically reads the original image.

17. An apparatus according to claim 8, further comprising setting means for setting an operation mode for said control means to perform the image expansion processing to said storage means.

18. An image processing method comprising:

a setting step of setting an image interval to be used in case of disposing plural original images of a second type on an identical face of a recording medium of a second type for covering plural recording media of a first type on which plural original images of a first type have been recorded; and a control step of causing to perform layout processing for disposing the plural original images of said second type from among the original images of said first type and the original images of said second type on the identical face of the recording medium of said second type from among the recording media of said first type and the recording medium of said second type, at the image intervals set by said setting step.

19. An image processing apparatus comprising:

read means capable of reading image information of an original image of a first type to be formed on a recording medium of a first type, and capable of reading image information of an original image of a second type to be formed on a recording medium of a second type used to cover the plural recording media of said first type;

image processing means for performing predetermined processing to the image information read by said read means, and expanding the processed image information to storage means;

image formation means capable of performing image formation based on the image information of the original image of said first type from among the image information of the original image of said first type and the image information of the original image of said second type on the recording medium of said first type, and capable of performing image formation based on the image information of the original image of said second type on the recording medium of said second type;

first setting means for setting a size of the recording medium of said second type onto which the image formation is to be performed by said image formation means;

second setting means for setting an image interval to dispose the plural original images of said second type apart from others on an identical face of the recording medium of said second type, the plural original images of said second type being read by said read means;

detection means for detecting a size of the original image of said second type;

calculation means for calculating magnifying power of the original image of said second type on the basis of the size of the recording medium of said second type set by said first setting means, the image interval set by said second setting means and the size of the original image of said second type detected by said detection means; and magnification change processing control means for controlling said read means on the basis of the magnifying power calculated by said calculation means.

20. An apparatus according to claim 19, wherein said image processing means performs magnification change processing on the basis of the magnifying power calculated by said calculation means.

21. An apparatus according to claim 19, wherein said image processing means expands, apart from others, the image information of the plural original images of said second type subjected to the predetermined processing to said storage means on the basis of the image interval set by said second setting means.

22. An apparatus according to claim 19, wherein said image processing means divides the read image information into pixel blocks each consisting of a first predetermined number of pixels in a main-scan direction and a second predetermined number of pixels in a sub-scan direction, and encodes and decodes the image information for each of the divided pixel blocks.

23. An apparatus according to claim 19, wherein said image processing means includes a main-scan address control unit for designating and controlling a main-scan direction address of said storage means, and a sub-scan address control unit for designating and controlling a sub-scan direction address of said storage means.

24. An apparatus according to claim 23, wherein said main-scan address control unit includes a writing main-scan address control unit for designating and controlling the main-scan direction address when the image information is written into said storage means, and a reading main-scan address control unit for designating and controlling the main-scan direction address when the image information is read from said storage means, and said sub-scan address control unit includes a writing sub-scan address control unit for designating and controlling the sub-scan direction address when the image information is written into said storage means, and plural reading sub-scan address control units respectively for designating and controlling the sub-scan direction addresses when the image information is read from said storage means.

25. An apparatus according to claim 19, wherein said image formation means includes plural image formation units and carrying means for sequentially carrying the recording media to said plural image formation units.

26. An image processing apparatus comprising:

read means capable of reading image information of an original image of a first type to be formed on a recording medium of a first type, and capable of reading image information of an original image of a second type to be formed on a recording medium of a second type used to cover the plural recording media of said first type;

image processing means for performing predetermined processing to the image information read by said read means, and expanding the processed image information to storage means;

image formation means capable of performing image formation based on the image information of the original image of said first type from among the image information of the original image of said first type and the image information of the original image of said second type on the recording medium of said first type, and capable of performing image formation based on the image information of the original image of said second type on the recording medium of said second type;

plural feeding means each for feeding the recording medium of said first type and the recording medium of said second type to said image formation means;

first setting means for setting an image interval to dispose the image information of the plural original images of said second type apart from others on an identical face of the recording medium of said second type, the image information of the plural original images of said second type being read by said read means;

detection means for detecting a size of the original image of said second type read by said read means;

calculation means for calculating a size of the optimum recording medium having the identical face of the recording medium of said second type to which the image information of the plural original images of said second type disposed at the image interval set by said first setting means can be output, on the basis of the image interval set by said first setting means and the size of the original image of said second type detected by said detection means; and control means for feeding the recording medium to said image formation means from either of said plural feeding means on the basis of the calculated result of said calculation means.

27. An apparatus according to claim 26, wherein said image processing means expands, apart from others, the image information of the plural original images of said second type subjected to the predetermined processing to said storage means on the basis of the image interval set by said first setting means.

28. An apparatus according to claim 26, wherein said control means performs controlling to feed the recording medium of the size calculated by said calculation means, to said image formation means from either of said plural feeding means.

29. An apparatus according to claim 26, wherein, in a case where the recording medium of the size calculated by said calculation means can not be fed to said image formation means from any of said plural feeding means, said control means performs controlling to display on a display unit an instruction to supply the recording medium of the size calculated by said calculation means.

30. An apparatus according to claim 26, wherein said image processing means divides the read image information into pixel blocks each consisting of a first predetermined number of pixels in a main-scan direction and a second predetermined number of pixels in a sub-scan direction, and encodes and decodes the image information for each of the divided pixel blocks.

31. An apparatus according to claim 26, wherein said image processing means includes a main-scan address control unit for designating and controlling a main-scan direction address of said storage means, and a sub-scan address control unit for designating and controlling a sub-scan direction address of said storage means.

32. An apparatus according to claim 31, wherein said main-scan address control unit includes a writing main-scan address control unit for designating and controlling the main-scan direction address when the image information is written into said storage means, and a reading main-scan address control unit for designating and controlling the main-scan direction address when the image information is read from said storage means, and said sub-scan address control unit includes a writing sub-scan address control unit for designating and controlling the sub-scan direction address when the image information is written into said storage means, and plural reading sub-scan address control units respectively for designating and controlling the sub-scan direction addresses when the image information is read from said storage means.

33. An apparatus according to claim 26, wherein said image formation means includes plural image formation units and carrying means for sequentially carrying the recording media to said plural image formation units.

34. A control method for an image processing apparatus which includes a read unit capable of reading image information of an original image of a first type to be formed on a recording medium of a first type and capable of reading image information of an original image of a second type to be formed on a recording medium of a second type used to cover the plural recording media of said first type, an image processing unit for performing predetermined processing to the image information read by the read means and expanding the processed image information to a memory, and an image formation unit capable of performing image formation based on the image information of the original image of said first type from among the image information of the original image of said first type and the image information of the original image of said second type on the recording medium of said first type and capable of performing image formation based on the image information of the original image of said second type on the recording medium of said second type, said method comprising:

a selection step of selecting a size of the recording medium of said second type;

a setting step of setting an image interval to dispose the plural original images of said second type apart from others on an identical face of the recording medium of said second type, the plural original images of said second type being read by the read unit;

a detection step of detecting a size of the original image of said second type;

a calculation step of calculating magnifying power of the image information of the original image of said second type on the basis of the size of the recording medium of said second type selected in said selection step, the image interval set in said setting step and the size of the original image of the said second type detected in said detection step;

an expansion step of causing the read unit to read the plural original images of said second type on the basis of the magnifying power calculated in said calculation step, and expanding the read original images of said second type to the memory on the basis of the image interval set in said setting step; and an image formation step of causing the image formation unit to form the image information of the original image of said second type expanded to the memory, onto the recording medium of said second type.

35. A control method for an image processing apparatus which includes a read unit capable of reading image information of an original image of a first type to be formed on a recording medium of a first type and capable of reading image information of an original image of a second type to be formed on a recording medium of a second type used to cover the plural recording media of said first type, a memory for capable of storing the image information of the original image of said first type and the image information of the original image of said second type read by the read unit, an image formation unit capable of performing image formation based on the image information of the original image of said first type from among the image information of the original image of said first type and the image information of the original image of said second type stored in the memory on the recording medium of said first type and capable of performing image formation based on the image information of the original image of said second type on the recording medium of said second type, and plural feeding units each for feeding the recording medium of said first type and the recording medium of said second type to the image formation unit, said method comprising:

a setting step of setting an image interval to dispose the image information of the plural original images of said second type apart from others on an identical face of the recording medium of said second type, the image information of the plural original images of said second type being read by the read unit;

a detection step of detecting a size of the original image of said second type;

an expansion step of reading the plural original images of said second type from the read unit and expanding the read original images to the memory;

a calculation step of calculating a size of the optimum recording medium of said second type having the identical face to which the image information of the plural original images of said second type disposed at the image interval set in said second setting step can be output, on the basis of the image interval set in said setting step and the size of the original image of said second type detected in said detection step; and a feeding step of feeding the recording medium to the image formation unit from either of the plural feeding units on the basis of the calculated result in said calculation step.

36. An image processing apparatus which includes input means for inputting an image and can input by said input means plural images of a second type to be formed on an identical face of a cover sheet for covering a sheaf of plural sheets of a first type on which an image of a first type has been formed, said apparatus comprising:

obtaining means for obtaining first information concerning a thickness of the sheaf of the plural sheets of said first type; and control means for causing layout processing so that the plural images of said second type input by said input means from among the image of said first type and the image of said second type are disposed at an interval based on the first information obtained by said obtaining means, on an identical face of the cover sheet from among the sheet of said first type and the cover sheet.

37. An apparatus according to claim 36, further comprising storage means for storing the image of said second type input by said input means, wherein said control means performs the controlling so that the plural images of said second type are disposed on said storage means at the interval based on the first information, and outputs as one image data the plural images of said second type stored in said storage means to an image formation apparatus for forming the image on the identical face of the cover sheet.

38. An apparatus according to claim 36, wherein the plural images of said second type to be formed onto the identical face of the cover sheet include at least two images one for a front cover and the other for a back cover, and said control means disposes the image for the front cover and the image for the back cover to be aligned at the interval based on the first information on the identical face of the cover sheet.

39. An apparatus according to claim 38, wherein the cover sheet is at least twice the size of the sheet of said first type and folded in half along its center part so that the cover sheet wraps the sheaf of the plural sheets of said first type.

40. An apparatus according to claim 36, wherein said image processing apparatus can output the image input by said input means to an image formation apparatus for forming the image onto the sheet, said image processing apparatus further comprises thickness detection means for detecting a thickness of the sheet of said first type onto which the image of said first type input by said input means is to be formed, and accumulation means for accumulating the thicknesses of the sheets of said first type detected by said thickness detection means until an image formation operation of one job ends, and said obtaining means obtains the accumulated result of the thicknesses of the sheets of said first type by said accumulation means as the first information for the cover sheet.

41. An apparatus according to claim 36, further comprising image interval setting means for adjusting the interval of the plural images of said second type, wherein said obtaining means obtains image interval setting information set by said image interval setting means as the first information.

42. An apparatus according to claim 36, wherein said input means includes read means for reading the image of an original.

43. An apparatus according to claim 36, wherein said obtaining means can obtain second information concerning a size of the cover sheet onto which the plural images are to be formed and third information concerning a size of the image of said second type input by said input means, said image processing apparatus further comprises magnification change means for performing magnification change processing of the image to be formed onto the cover sheet, on the basis of the first information, the second information and the third information obtained by said obtaining means, and said control means disposes the images of said second type subjected to the magnification change processing by said magnification change means, at the interval based on the first information on the cover sheet.

44. An apparatus according to claim 43, further comprising:

first setting means for setting the size of the cover sheet onto which the plural images of said second type are to be formed;

second setting means for adjusting the interval of the plural images of said second type; and size detection means for detecting the size of the image of said second type input by said input means, wherein said obtaining means obtains the size set by said first setting means as the second information, obtains the image interval setting information set by said second setting means as the first information, and obtains the detection result of said size detection means as the third information.

45. An apparatus according to claim 43, further comprising storage means for storing the image, wherein said control means performs the controlling so that the plural images of said second type subjected to the magnification change processing by said magnification change means are disposed on said storage means at the interval based on the first information, and outputs as one image data the plural images of said second type stored in said storage means to an image formation apparatus for forming the image onto the sheet.

46. An apparatus according to claim 36, wherein said obtaining means can obtain second information concerning a size of the image of said second type input by said input means, and said image processing apparatus further comprises calculation means for calculating a size of the sheet acting as the cover sheet onto which the plural images of said second type are to be formed, on the basis of the first information and the second information obtained by said obtaining means.

47. An apparatus according to claim 46, wherein said image processing apparatus outputs as one image data the plural images of said second type disposed at the interval based on the first information, to an image formation apparatus for forming the image onto the sheet fed from either of plural holders holding the sheets of said first type and the cover sheets, and said image formation apparatus forms the plural images of said second type at the interval based on the first information, onto the identical face of the sheet fed from the holder holding the sheet corresponding to the size based on the calculation result of said calculation means.

48. An apparatus according to claim 47, further comprising display control means for causing, if the holder holding the sheet corresponding to the size based on the calculation result of said calculation means does not exist, a display unit to display an instruction to supply the sheet corresponding to the size based on the calculation result of said calculation means.

49. An apparatus according to claim 47, wherein, if the plural holders each holding the sheet corresponding to the size based on the calculation result of said calculation means exist, said image processing apparatus selects the holder holding the minimum-sized sheet from among the plural holders.

50. An apparatus according to claim 36, wherein said control means outputs as one image data the plural images of said second type disposed at the interval based on the first information, to an image formation apparatus for forming the image onto the sheet.

51. An image processing method which includes an input step of inputting an image and can input in said input step plural images of a second type to be formed on an identical face of a cover sheet for covering a sheaf of plural sheets of a first type on which an image of a first type has been formed, said method comprising:

an obtaining step of obtaining first information concerning a thickness of the sheaf of the plural sheets of said first type; and a control step of causing layout processing so that the plural images of said second type input by said input step from among the image of said first type and the image of said second type are disposed at an interval based on the first information obtained by said obtaining means, on an identical face of the cover sheet from among the sheet of said first type and the cover sheet.

52. A method according to claim 51, further comprising an output step of outputting as one image data the plural images of said second type disposed at the interval based on the first information, to an image formation apparatus for forming the image onto the sheet.

53. A method according to claim 51, further comprising:

an output step of outputting the image input in said input step to an image formation apparatus for forming the image onto the sheet;

a thickness detection step of detecting a thickness of the sheet of the first type onto which the image of said first type is to be formed; and an accumulation step of accumulating the thicknesses of the sheets of said first type detected in said thickness detection step until the image formation apparatus ends an image formation operation of one job, and wherein said obtaining step obtains the accumulated result of the thicknesses of the sheets of said first type by said accumulation step as the first information for the cover sheet.

54. A method according to claim 51, further comprising an image interval setting step of adjusting the interval of the plural images of said second type, wherein said obtaining step obtains image interval setting information set in said image interval setting step as the first information.

55. A method according to claim 51, wherein said obtaining step can obtain second information concerning a size of the cover sheet onto which the plural images are to be formed and third information concerning a size of the image of said second type input in said input step, said image processing method further comprises a magnification change step of performing magnification change processing of the image to be formed onto the cover sheet, on the basis of the first information, the second information and the third information obtained in said obtaining means, and said control step performs the controlling such that the images of said second type subjected to the magnification change processing in said magnification change step are disposed at the interval based on the first information on the cover sheet.

56. A method according to claim 51, wherein said obtaining step can obtain second information concerning a size of the image of said second type input in said input step, and said image processing method further comprises a calculation step of calculating a size of the sheet acting as the cover sheet onto which the plural images of said second type are to be formed, on the basis of the first information and the second information obtained in said obtaining step.

57. A method according to claim 56, further comprising an output step of outputting as one image data the plural images of said second type disposed at the interval based on the first information, to an image formation apparatus for forming the image onto the sheet fed from either of plural holders holding the sheets of said first type and the cover sheets, and wherein the image formation apparatus forms the plural images of said second type at the interval based on the first information, onto the identical face of the sheet fed from the holder holding the sheet corresponding to the size based on the calculation result of said calculation step.

58. A method according to claim 57, further comprising a display control step of causing, if the holder holding the sheet corresponding to the size based on the calculation result of said calculation step does not exist, a display unit to display an instruction to supply the sheet corresponding to the size based on the calculation result of said calculation step.

59. A method according to claim 57, further comprising a selection step of selecting, if the plural holders each holding the sheet corresponding to the size based on the calculation result of said calculation step exist, the holder holding the minimum-sized sheet from among the plural holders.

60. A method for determining disposing positions of plural images of a second type to be formed on an identical face of a cover sheet for covering a sheaf of plural sheets of a first type on which an image of a first type has been formed, said method comprising:

an obtaining step of obtaining data concerning a thickness of the sheaf of the plural sheets of said first type; and a determination step of determining the disposing positions of the plural images of said second type so that the plural images of said second type are disposed at an interval based on the data obtained in said obtaining step.

61. A method according to claim 60, wherein the plural images of said second type to be formed onto the identical face of the cover sheet include at least two images one for a front cover and the other for a back cover, and the image for the front cover and the image for the back cover are disposed to be aligned at the interval based on the data obtained in said obtaining step.

62. A method according to claim 61, wherein the cover sheet is folded in half along its center part so that the cover sheet wraps the sheaf of the plural sheets of said first type.

63. A storage medium for storing a computer-readable program to realize an image processing method which includes an input step of inputting an image and can input in said input step plural images of said second type to be formed on an identical face of a cover sheet for covering a sheaf of plural sheets of a first type on which an image of a first type has been formed, said method comprising:

an obtaining step of obtaining first information concerning a thickness of the sheaf of the plural sheets of said first type; and a control step of causing layout processing so that the plural images of said second type input by said input step from among the image of said first type and the image of said second type are disposed at an interval based on the first information obtained by said obtaining means, on an identical face of the cover sheet from among the sheet of said first type and the cover sheet.

64. A medium according to claim 63, further comprising an output step of outputting as one image data the plural images of said second type disposed at the interval based on the first information, to an image formation apparatus for forming the image onto the sheet.

65. A medium according to claim 63, further comprising:

an output step of outputting the image input in said input step to an image formation apparatus for forming the image onto the sheet;

a thickness detection step of detecting a thickness of the sheet of said first type onto which the image of said first type is to be formed; and an accumulation step of accumulating the thicknesses of the sheets of said first type detected in said thickness detection step until the image formation apparatus ends an image formation operation of one job, and wherein said obtaining step obtains the accumulated result of the thicknesses of the sheets of said first type by said accumulation step as the first information for the cover sheet.

66. A medium according to claim 63, further comprising an image interval setting step of adjusting the interval of the plural images of said second type, wherein said obtaining step obtains image interval setting information set in said image interval setting step as the first information.

67. A medium according to claim 63, wherein said obtaining step can obtain second information concerning a size of the cover sheet onto which the plural images are to be formed and third information concerning a size of the image input in said input step, said image processing method further comprises a magnification change step of performing magnification change processing of the image to be formed onto the cover sheet, on the basis of the first information, the second information and the third information obtained in said obtaining means, and said control step performs the controlling such that the images of said second type subjected to the magnification change processing in said magnification change step are disposed at the interval based on the first information on the cover sheet.

68. A medium according to claim 63, wherein said obtaining step can obtain second information concerning a size of the image of said second type input in said input step, and said image processing method further comprises a calculation step of calculating a size of the sheet acting as the cover sheet onto which the plural images of said second type are to be formed, on the basis of the first information and the second information obtained in said obtaining step.

69. A medium according to claim 68, further comprising an output step of outputting as one image data the plural images of said second type disposed at the interval based on the first information, to an image formation apparatus for forming the image onto the sheet fed from either of plural holders holding the sheets of said first type and the cover sheets, and wherein the image formation apparatus forms the plural images of said second type at the interval based on the first information, onto the identical face of the sheet fed from the holder holding the sheet corresponding to the size based on the calculation result of said calculation step.

70. A medium according to claim 69, further comprising a display control step of causing, if the holder holding the sheet corresponding to the size based on the calculation result of said calculation step does not exist, a display unit to display an instruction to supply the sheet corresponding to the size based on the calculation result of said calculation step.

71. A medium according to claim 69, further comprising a selection step of selecting, if the plural holders each holding the sheet corresponding to the size based on the calculation result of said calculation step exist, the holder holding the minimum-sized sheet from among the plural holders.

72. A storage medium for storing a computer-readable program to realize a method for determining disposing positions of plural images of a second type to be formed on an identical face of a cover sheet for covering a sheaf of plural sheets of a first type on which an image of a first type has been formed, said method comprising:

an obtaining step of obtaining data concerning a thickness of the sheaf of the plural sheets of said first type; and a determination step of determining the disposing positions of the plural images of said second type so that the plural images of said second type are disposed at an interval based on the data obtained in said obtaining step.

73. A medium according to claim 72, wherein the plural images of a second type to be formed onto the identical face of the cover sheet include at least two images one for a front cover and the other for a back cover, and the image for the front cover and the image for the back cover are disposed to be aligned at the interval based on the data obtained in said obtaining step.

74. A medium according to claim 73, wherein the cover sheet is folded in half along its center part so that the cover sheet wraps the sheaf of the plural sheets of said first type.

* * * * *

UNITED STATES PATENT AND TRADEMARK OFFICE

CERTIFICATE OF CORRECTION

PATENT NO. : 6,825,949 B1
DATED : November 30, 2004
INVENTOR(S) : Tatsuhiko Hirai It is certified that error appears in the above-identified patent and that said Letters Patent is hereby corrected as shown below:

Drawing
Sheet 25 of 27,
FIGURE 24, "FORMRED" should read -- FORMED --.

Column 4,
Line 45, "CCD's." should read -- CCDs. --.
Line 53, "CCD's" should read -- CCDs --.

Column 5,
Line 19, "ZO" should read -- Z0 --.

Column 8,
Line 24, "denotes" should read -- denote --.

Column 11,
Line 67, "being executing." should read -- being executed. --.

Column 13,
Line 11, "the of which corresponds" should read -- that correspond --.
Line 14, "such the" should read -- to such --.

Column 14,
Line 14, "exist" should read -- exists --.

Column 16,
Line 43, "a "11x17" key, a" should read -- an "11x17" key, an --.
Line 44, "a "STMTR" key" should read -- an "STMTR" key --.

Column 18,
Line 36, "point O" should read -- point 0 --.

Column 21,
Line 33, "such the" should read -- such --.

Column 25,
Line 52, "to formed" should read -- to form --.

UNITED STATES PATENT AND TRADEMARK OFFICE
CERTIFICATE OF CORRECTION

PATENT NO. : 6,825,949 B1
DATED : November 30, 2004
INVENTOR(S) : Tatsuhiko Hirai It is certified that error appears in the above-identified patent and that said Letters Patent is hereby corrected as shown below:

Column 31,
Line 16, “communicates” should read -- communicate --.

Column 34,
Line 23, “manner,” should read -- manners, --.

Column 35,
Line 27, “which the” should read -- which --.

Column 40,
Line 27, “for” should be deleted.

Signed and Sealed this

Third Day of May, 2005

JON W. DUDAS
*Director of the United States Patent and Trademark Office*